(12) United States Patent
Yasui et al.

(10) Patent No.: US 6,377,885 B2
(45) Date of Patent: Apr. 23, 2002

(54) BRAKING FORCE CONTROL DEVICE

(75) Inventors: Yoshiyuki Yasui, Kariya; Kenji Asano, Toyota; Shoji Ito, Susono; Akira Tanaka, Anjyo; Hiroaki Yoshida, Mishima; Mamoru Sawada, Yokkaichi; Yuji Muragishi, Aichi-ken; Michio Ishiguro, Toyota; Tsugiharu Matsunaga; Eiichi Ono, both of Aichi-ken, all of (JP)

(73) Assignees: Aisin Seiki Kabushiki Kaisha, Kariya; Toyota Jidosha Kabushiki Kaisha, Toyota; Denso Corporation, Kariya, all of (JP)

( * ) Notice: Subject to any disclaimer, the term of this patent is extended or adjusted under 35 U.S.C. 154(b) by 0 days.

(21) Appl. No.: 09/824,131

(22) Filed: Apr. 3, 2001

(30) Foreign Application Priority Data

Apr. 3, 2000 (JP) ........................ 2000-101618
Apr. 5, 2000 (JP) ........................ 2000-103964
May 29, 2000 (JP) ........................ 2000-159234

(51) Int. Cl.[7] ............................ B60T 8/00
(52) U.S. Cl. .................... 701/80; 701/78; 303/150
(58) Field of Search ...................... 701/80, 71, 78, 701/82, 83; 180/197; 303/150, 177

(56) References Cited

U.S. PATENT DOCUMENTS 6,125,319 A * 9/2000 Hau et al. ................ 701/80
6,203,121 B1 * 3/2001 Kato et al. ................ 303/150
6,266,600 B1 * 7/2001 Migazaky ................ 701/71
6,266,602 B1 * 7/2001 Yamaura ................ 701/80
6,272,417 B1 * 8/2001 Ross et al. ................ 701/80
6,324,461 B1 * 11/2001 Yamaguchi et al. .......... 701/80

FOREIGN PATENT DOCUMENTS

| JP | 8-324414 | 12/1986 |
| JP | 7-165053 | 6/1995 |
| JP | 10-114263 | 5/1998 |
| JP | 11-78843 | 3/1999 |
| JP | 11-321617 | 11/1999 |
| JP | 11-334637 | 12/1999 |
| JP | 2000-108863 A | 4/2000 |
| JP | 2000-118375 | 4/2000 |

* cited by examiner

*Primary Examiner*—Richard M. Camby
(74) *Attorney, Agent, or Firm*—Burns, Doane, Swecker & Mathis, LLP

(57) ABSTRACT

A braking force control device is provided in which wheel speeds of respective wheels of a vehicle are detected. On the basis of detected wheel speeds, a road surface $\mu$ slope, which is a slope of a coefficient of friction $\mu$ between a wheel and a road surface, is estimated for each wheel. On the basis of the road surface $\mu$ slope estimated for each wheel, a braking force of each wheel is controlled such that the braking force of each wheel is adjusted.

25 Claims, 37 Drawing Sheets

F I G. 1
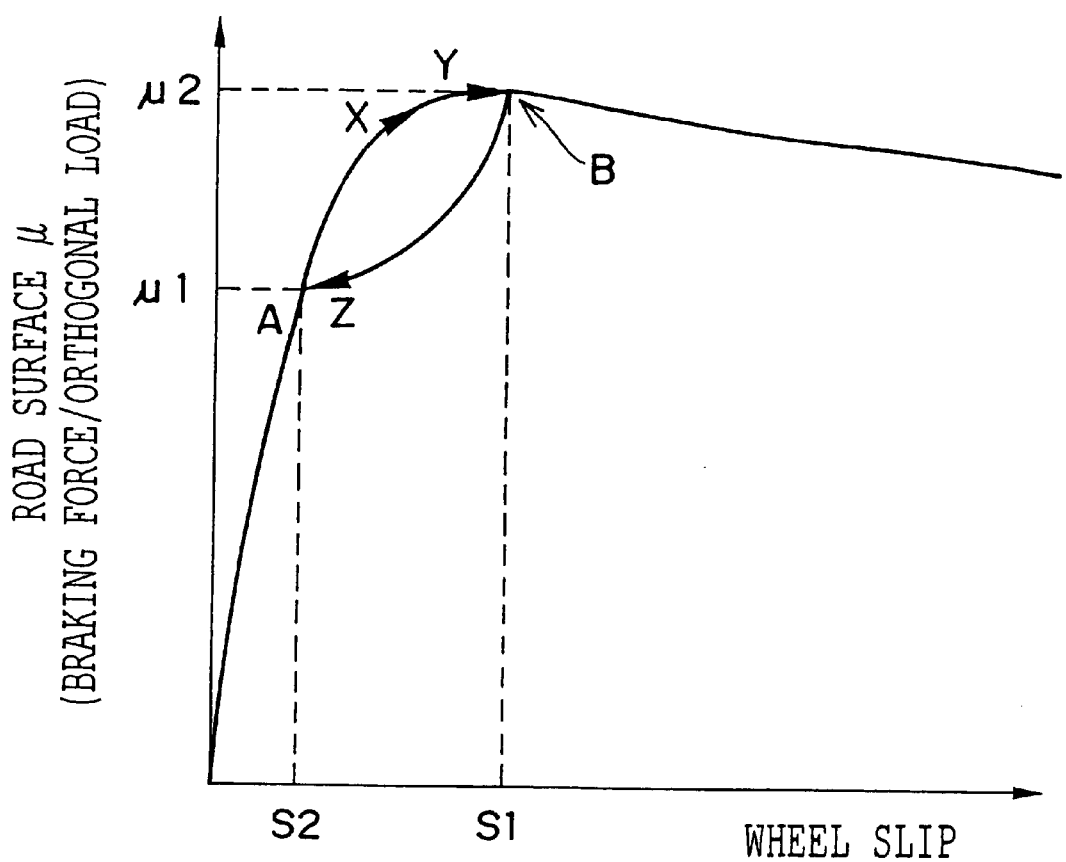

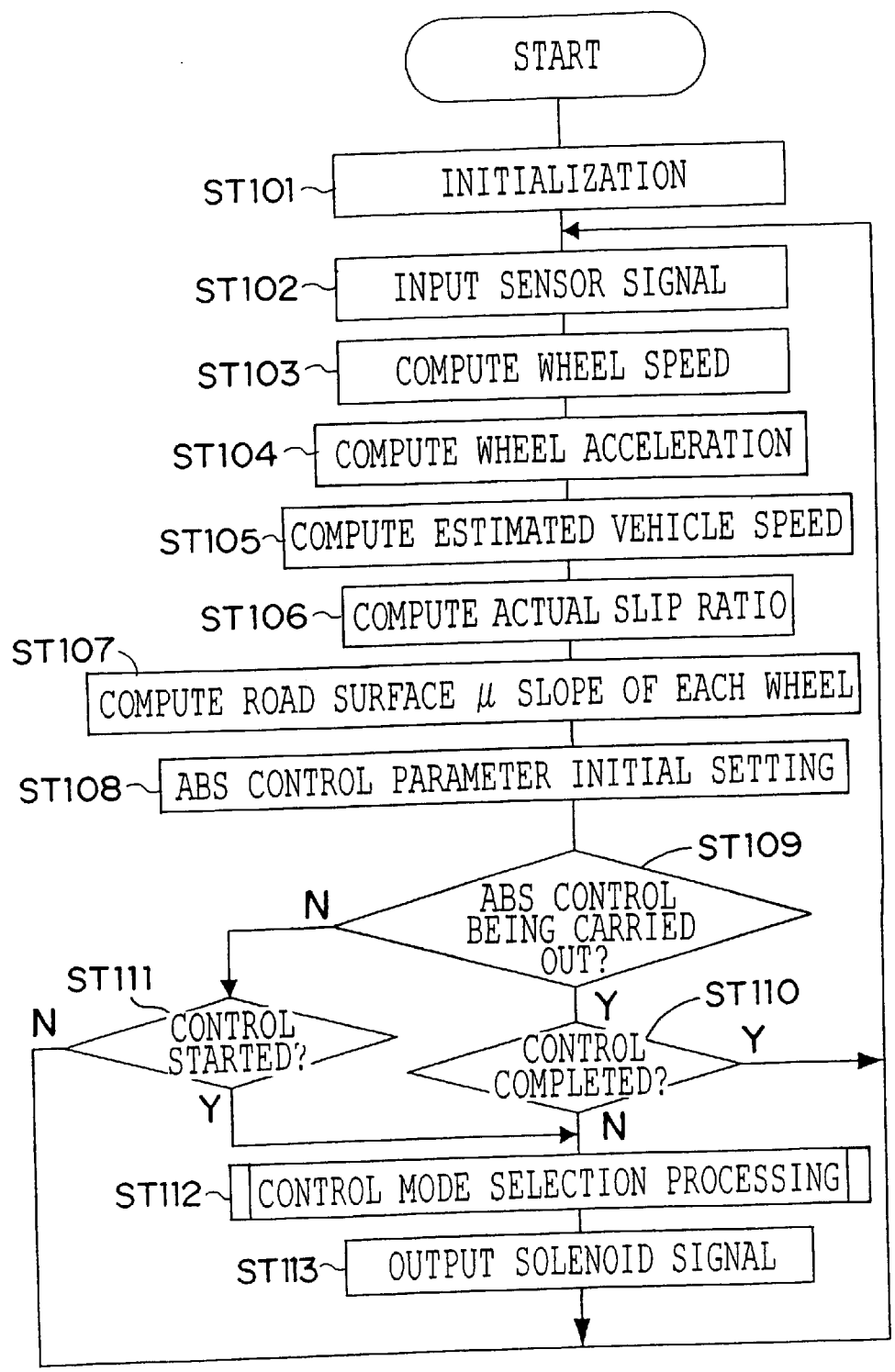

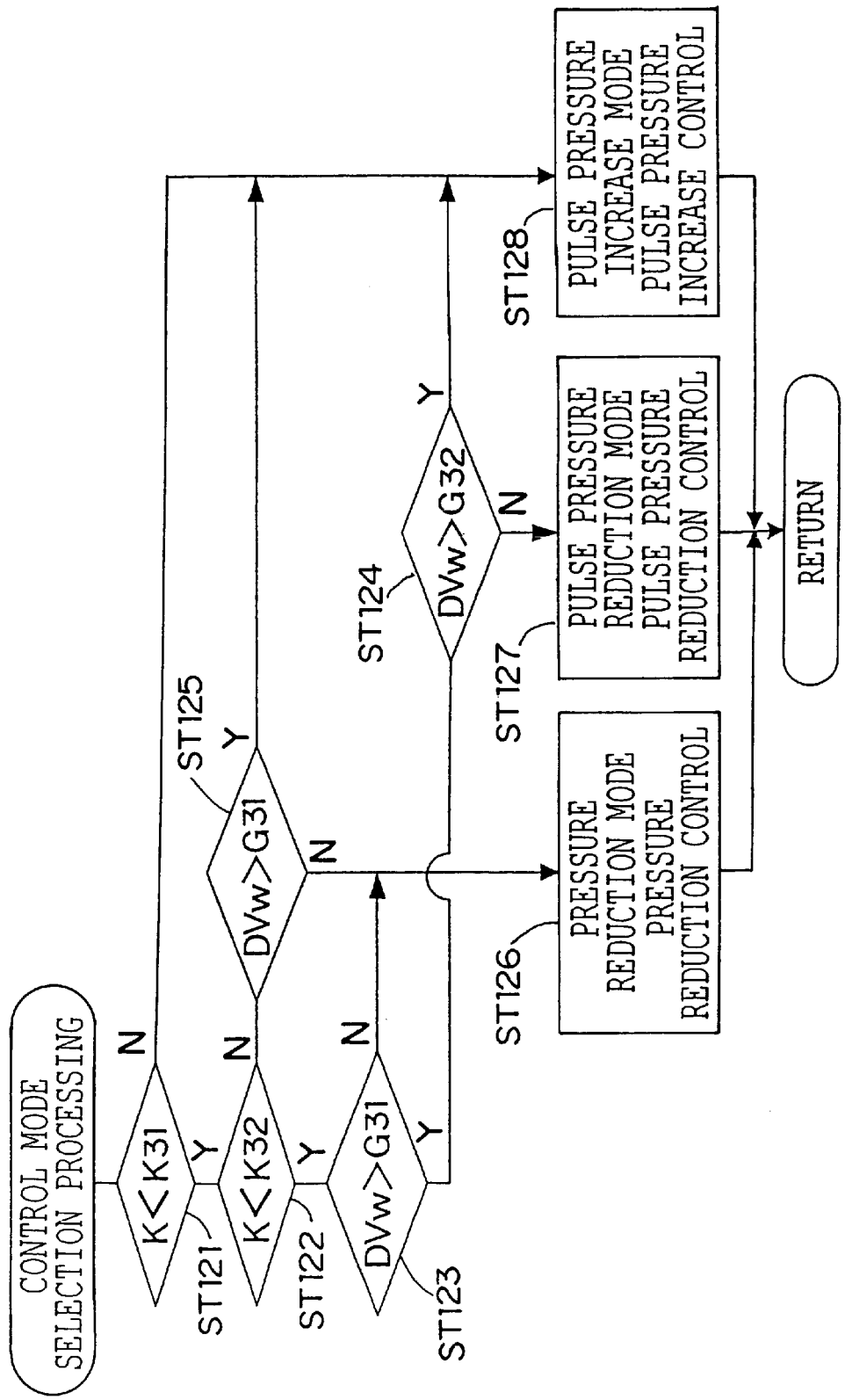

FIG. 31

WHEEL ACCELERATION

|  | G31 | | G32 | |
|---|---|---|---|---|
| ROAD SURFACE μ SLOPE | | PULSE PRESSURE REDUCTION | PULSE PRESSURE REDUCTION | PULSE PRESSURE REDUCTION |
| K31 | | | | |
| | | PRESSURE REDUCTION | PULSE PRESSURE REDUCTION | PULSE PRESSURE REDUCTION |
| K32 | | | | |
| | | PRESSURE REDUCTION | PULSE PRESSURE REDUCTION | PULSE PRESSURE REDUCTION |

FIG. 32

|  | G31 | G32 | |
|---|---|---|---|
| | PULSE PRESSURE REDUCTION | PULSE PRESSURE REDUCTION | PULSE PRESSURE REDUCTION |
| K31 | | | |
| | PRESSURE REDUCTION | PULSE PRESSURE REDUCTION | PULSE PRESSURE REDUCTION |
| K32 | | | |
| | PRESSURE REDUCTION | PRESSURE REDUCTION | PULSE PRESSURE REDUCTION |

FIG. 33

|  | G31 | G32 |
|---|---|---|
| PULSE PRESSURE REDUCTION | PULSE PRESSURE REDUCTION | PULSE PRESSURE REDUCTION |
| PULSE PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |

Rows from top to bottom labeled: S31, K31, K32, S32, O

FIG. 34

|  | G31 | G32 |
|---|---|---|
| PULSE PRESSURE REDUCTION | PULSE PRESSURE REDUCTION | PULSE PRESSURE REDUCTION |
| PULSE PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |

Rows from top to bottom labeled: K31, S31, S32, K32, O

FIG. 35

|  | G31 | G32 |
|---|---|---|
| PULSE PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |

|  | G1 | G2 |
|---|---|---|
| PULSE PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |
| PRESSURE REDUCTION | PULSE PRESSURE REDUCTION | PULSE PRESSURE REDUCTION |

K1, S2, O

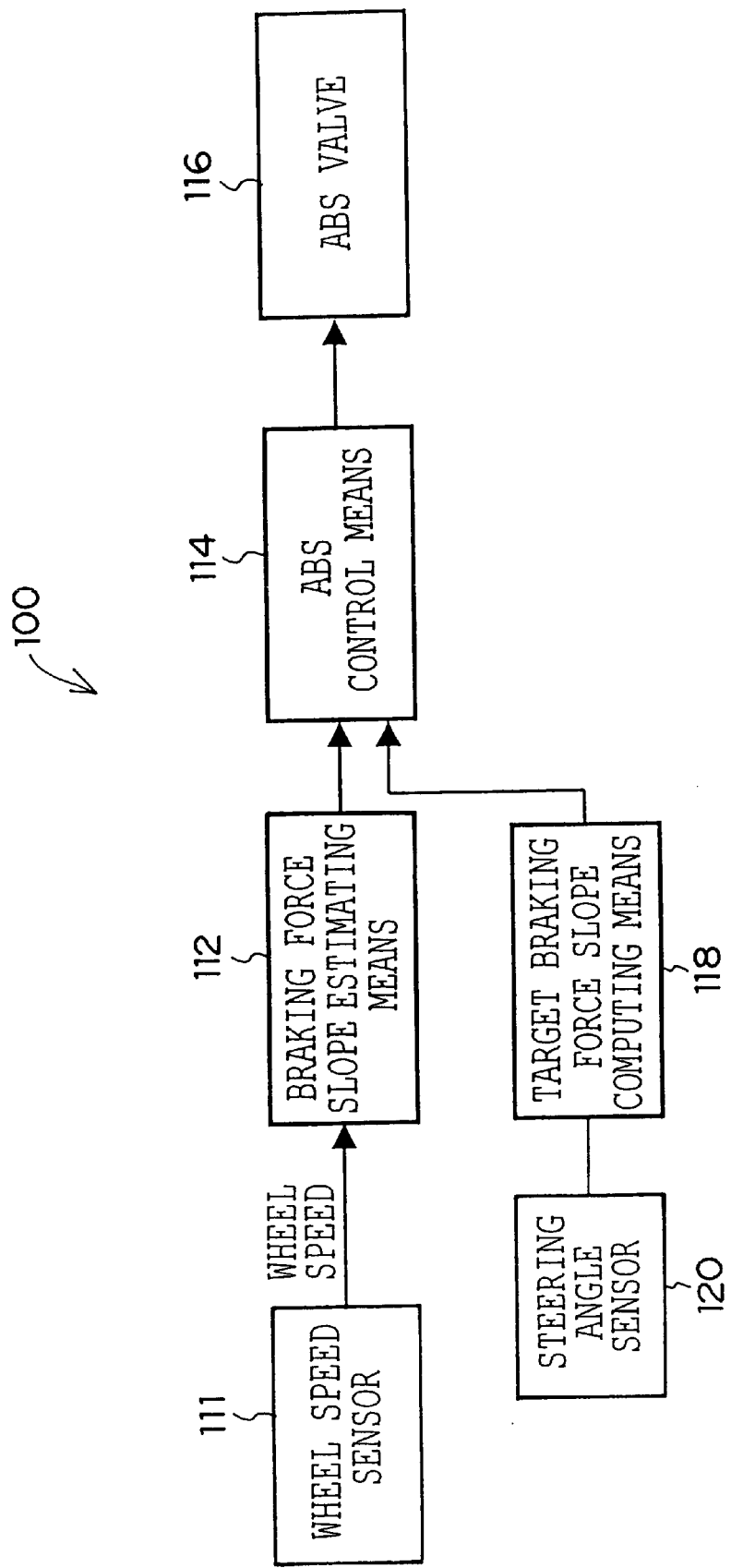

F I G. 3 8 A
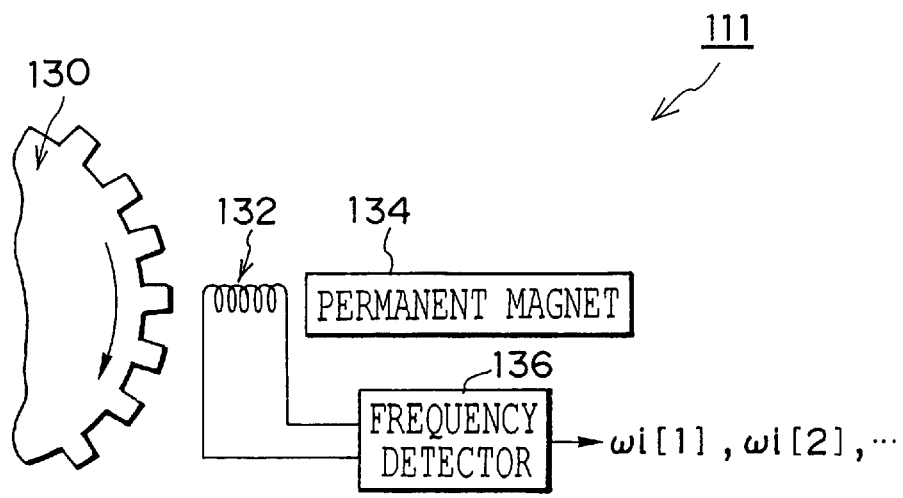
F I G. 3 8 B
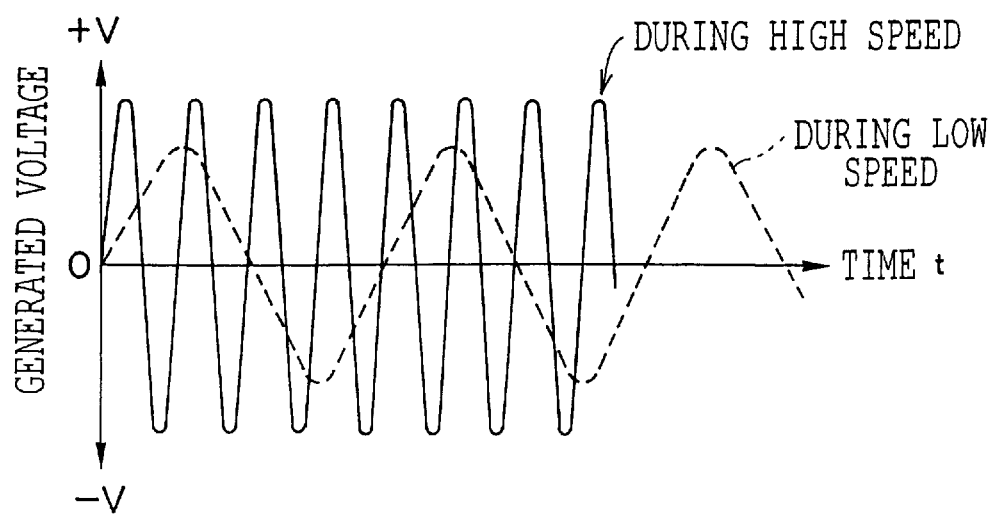

SA1, SA2, SA3 } SWITCHING SOLENOID VALVES

SRL, SRR, SFL, SFR } CONTROL SOLENOID VALVES

F I G. 4 6 A
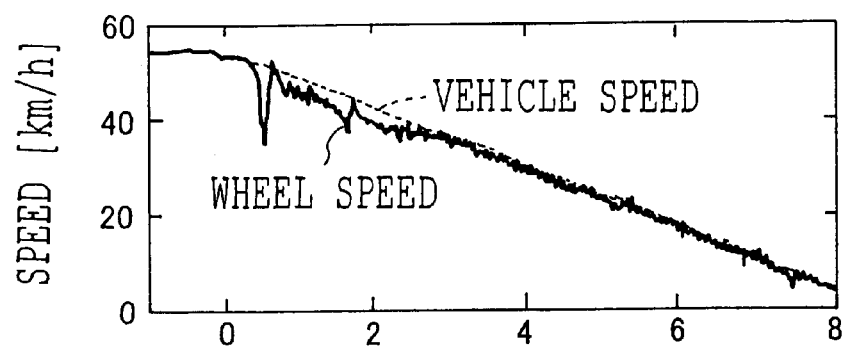
F I G. 4 6 B
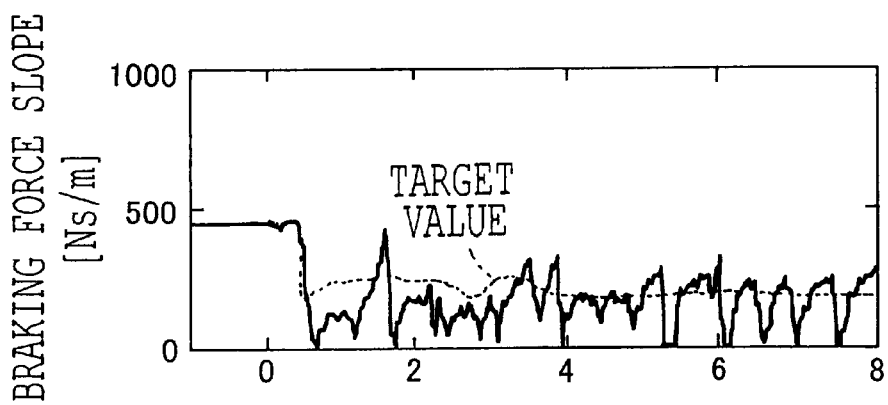
F I G. 4 6 C
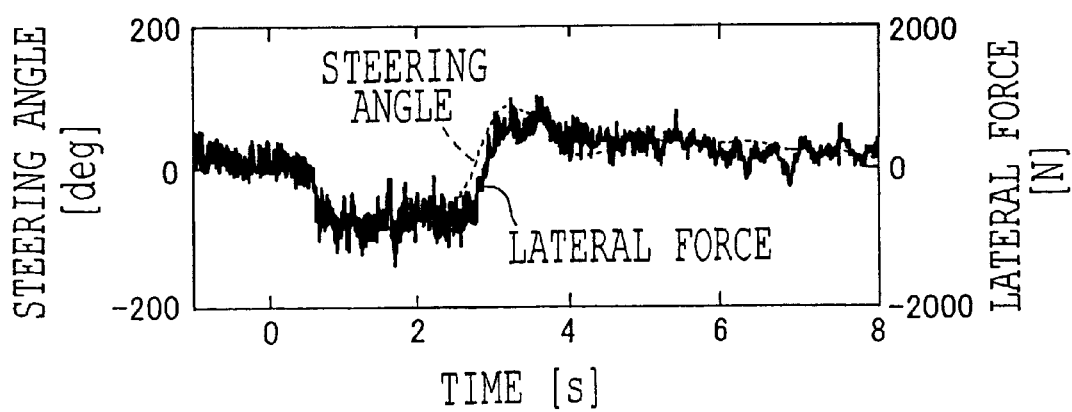

BRAKING FORCE CONTROL DEVICE

BACKGROUND OF THE INVENTION

1. Field of the Invention

The present invention relates to a braking force control device, and in particular, to a braking force control device which controls the braking force applied to a wheel on the basis of the road surface $\mu$ slope or a physical value equivalent thereto.

2. Description of the Related Art

Conventionally, antilock brake (ABS) control devices as follows have been proposed. Time series data of wheel speed is detected each time a predetermined sampling cycle occurs. On the basis of the detected time series data of the wheel speed, the history of changes of the wheel speed and the history of changes of the wheel acceleration are computed. On the basis of these computed values, a braking force slope (the slope of the braking force with respect to the slip speed) is estimated. The braking force applied to the wheel is controlled on the basis of the estimated braking force slope.

Braking force of a tire is generated by the slip between the tire and the road surface. In other words, the braking force of the tire is generated by the difference between the speed at which the tire advances (the advancing speed of the vehicle body) and the circumferential speed of the tire. Usually, an ABS control device computes the wheel slip and the wheel deceleration on the basis of a wheel speed signal, controls the increase, maintenance and decrease of the brake fluid pressure in accordance therewith, and prevents locking of the wheel.

As shown in FIG. 1, the characteristic of the frictional force between a tire and the road surface (the so-called $\mu$-S characteristic) varies in the direction of arrow X and the direction of arrow Y along the $\mu$-S characteristic at the time of pressure increase of ABS control. At the time of pressure reduction, the $\mu$-S characteristic cycles so as to fall in the $\mu$ direction (the direction of arrow Z).

In order to effectively carry out ABS control by utilizing the $\mu$-S characteristic of the tire, at the time of pressure god increase, when there is slippage which moves away from the $\mu$ peak, pressure is increased immediately (the direction of arrow X), and in a vicinity of the $\mu$ peak, the pressure increase amount is suppressed to a slight amount (the direction or arrow Y) or is maintained, such that the time of staying in the vicinity of the $\mu$ peak is as long as possible. On the other hand, at the time of pressure reduction, it is necessary to restore the slip immediately (the direction of arrow Z).

In a conventional ABS control device, the threshold value for carrying out pressure increase or pressure reduction is set so as to match the characteristic of a general tire. Accordingly, a problem arises in that this threshold value is not always the optimal value of a given tire for a given road surface.

In order to overcome this problem, for example, Japanese Patent Application Laid-Open (JP-A) No. 7-165053 discloses a technique in which a friction force characteristic between the tire and the road surface is estimated, such that the ABS control ability is improved. In this conventional art, by utilizing the fact that the wheel acceleration generates a difference between the braking torque and the depressing force reaction force (the braking force applied to the vehicle), a slip ratio is determined such that the difference between the wheel acceleration and the vehicle deceleration becomes a predetermined value, and a target slip ratio is determined in consideration of the offset.

However, a wheel speed signal includes noise, and further, the vehicle acceleration is estimated from the wheel speed which includes the wheel slip. Thus, it is difficult to accurately compute the vehicle acceleration or the wheel acceleration. As a result, a problem arises in that the tire frictional force characteristic with respect to tire road surface cannot be accurately known. Further, in conventional methods, it cannot be judged what type of conditions there are at the $\mu$-S characteristic at the time of ABS control. As a result, it is extremely difficult to judge whether pressure should be increased immediately or whether pressure should be increased slowly.

Further, in Japanese Patent Application Laid-Open (JP-A) No. 2000-118375, the applicant of the present application has proposed an antilock brake control device which realizes a maximization of the braking force by carrying out follow-up control such that an estimated braking force slope becomes a specific target value in a vicinity of zero.

In this conventional art, the braking force can be made to become substantially a maximum by effecting follow-up control such that the estimated braking force slope becomes a target value near zero at the time of braking while the vehicle is advancing god straight forward. However, in a case in which a slip angle arises, i.e., in a case in which lateral slip arises at the wheel due to braking while turning, when follow-up control is effected such that the braking force slope becomes a target value in a vicinity of zero, a problem arises in that there is the possibility that the limit of the tire generation force characteristic will be exceeded.

This problem will be described with reference to FIGS. 2 and 3. As shown in FIG. 2, for example, when a slip ratio $\kappa_x$ in the longitudinal direction (the vehicle longitudinal direction) and a slip ratio $\kappa_y$ in the lateral direction are greater than or equal to about 0.15, the tire generation force exceeds 100%. No further tire generation force can be obtained, and a total slip region is entered. Note that point A in FIGS. 2 and 3 is a point at which the braking $\mu$ slope (the braking force slope) $\alpha_x$ becomes 3 when the lateral direction slip ratio $\kappa_y$ is 0.13.

Further, FIG. 3A illustrates the relationship between the longitudinal direction slip ratio $\kappa_x$ and the braking $\mu$ (longitudinal direction braking force) at the time when the lateral direction slip ratio $\kappa_y$ is 0.13. FIG. 3B shows the relationship between the longitudinal direction slip ratio $\kappa_x$ and lateral $\mu$ (lateral force). FIG. 3C shows the relationship between the longitudinal direction slip ratio $\kappa_x$ and composite $\mu$ (composite force). Further, 3A also shows the braking $\mu$ slope, and shows point A where the braking $\mu$ slope a, $\alpha_x=3$.

In accordance with FIGS. 2 and 3, as the longitudinal direction slip ratio $\kappa_x$ increases, the braking $\mu$ increases and the lateral $\mu$ decreases. The composite $\mu$ which is the synthesis thereof is saturated before point A is reached.

Namely, when the target value of the braking force slope is fixed to a specific value at the time when a lateral slip exists, regardless of the fact that the braking $\mu$ slope is in a state before the peak, the composite $\mu$ may reach the peak. In such a region, the lateral force may be reduced unnecessarily and the total slip region may be entered, which is not preferable from the standpoint of control stability of the vehicle.

SUMMARY OF THE INVENTION

The present invention is proposed in order to overcome the above-described drawbacks, and an object of the present invention is to provide a braking force control device which correctly grasps the road surface state and can carry out optimal control which is appropriate for the road surface state. Further, an object of the present invention is to provide a braking force control device which can improve control stability at the time of limit braking during turning.

In order to overcome the above-described problems, a first aspect of the present invention is a braking force control device comprising: wheel speed detecting means for detecting a wheel speed of each wheel of a vehicle; road surface $\mu$ slope estimating means for, on the basis of the detected wheel speed, estimating, for each wheel a slope of a coefficient of friction $\mu$ between the wheel and a road surface as a road surface $\mu$ slope; and control means for, on the basis of the road surface $\mu$ slope estimated for each wheel by the road surface $\mu$ slope estimating means, adjusting a braking force for each wheel by controlling the braking force of each wheel.

In accordance with the first aspect of the present invention, the road surface $\mu$ slope estimating means estimates the road surface $\mu$ slope of each wheel on the basis of the wheel speed of each wheel. Note that the road surface $\mu$ slope estimating means may estimate a physical amount which is equivalent to the road surfaced $\mu$ slope, e.g., the braking force slope, drive force slope, braking torque slope, drive torque slope, or the like. The control means adjusts the braking force between the respective wheels by controlling the braking force of each wheel on the basis of the road surface $\mu$ slope. Accordingly, the braking force is controlled while the state between the respective wheels and the road surface is estimated. Thus, appropriate braking can always be carried out in accordance with the state of the wheels and the road surface which is always changing.

In a second aspect of the present invention, the first aspect further comprises: control parameter generating means for generating a control parameter for braking force control; and control parameter correcting means for correcting the control parameter generated by the control parameter generating means, wherein the control means controls the braking force of each wheel on the basis of the control parameter corrected by the control sly parameter correcting means.

In accordance with the second aspect, on the basis of the road surface $\mu$ slope, the control parameter correcting means judges what position of the $\mu$-S characteristic the tire is at, and corrects the control parameter such that the grip force of the tire is on the $\mu$ peak of the most exhibited $\mu$-S characteristic. Note that when the tire is at the $\mu$ peak, it suffices to not correct the control parameter. Further, the control means effects control of the braking force by using the corrected control parameter, In this way, the control parameter can be set appropriately, and as a result, the control responsiveness and the vehicle stability at the time of braking force control can be improved.

At a time of increasing brake fluid pressure, in a case in which the road surface $\mu$ slope estimated by the road surface $\mu$ slope estimating means is greater than a first predetermined value, the control parameter correcting means can correct the control parameter to make a pressure increase amount of the brake fluid pressure large. Further, at a time of increasing brake fluid pressure, in a case in which the road surface $\mu$ slope estimated by the road surface $\mu$ slope estimating means is smaller than a second predetermined value, the control parameter correcting means can correct the control parameter to make a pressure increase amount of the brake fluid pressure small.

The control parameter correcting means can correct the control parameter such that the brake fluid pressure is maintained in a case in which the road surface $\mu$ slope estimated by the road surface $\mu$ slope estimating means is smaller than a third predetermined value.

At a time of reducing brake fluid pressure, in a case in which the road surface $\mu$ slope at a start of pressure reduction estimated by the road surface $\mu$ slope estimating means is greater than a predetermined value, the control parameter correcting means can correct the control parameter to make a pressure reduction amount of the brake fluid pressure small or to make a pressure reduction time short. Further, at a time of reducing brake fluid pressure, in a case in which the road surface $\mu$ slope at a start of pressure reduction estimated by the road surface $\mu$ slope estimating means is smaller than a predetermined value, the control parameter correcting means can correct the control parameter to make a pressure reduction amount of the brake fluid pressure large or to make a pressure reduction time long.

On the basis of the road surface $\mu$ slope at a start of pressure reduction estimated by the road surface $\mu$ slope estimating means, the control parameter correcting means can correct a slip threshold value which expresses a start of pressure reduction of the brake fluid pressure. At this time, when the road surface $\mu$ slope at a start of pressure reduction estimated by the road surface $\mu$ slope estimating means is larger than a predetermined value, the control parameter correcting means can effect correction such that the slip threshold value which expresses a start of pressure reduction of the brake fluid pressure is made large, and when the road surface $\mu$ slope at a start of pressure reduction estimated by the road surface $\mu$ slope estimating means is smaller than a predetermined value, the control parameter correcting means can effect correction such that the slip threshold value which expresses a start of pressure reduction of the brake fluid pressure is made small. Moreover, the control parameter correcting means can correct the slip threshold value which expresses a start of pressure reduction of the brake fluid pressure, and on the basis of this correction amount, can correct a slip threshold value which expresses a start of pressure increase of the brake fluid pressure.

The control parameter correcting means can correct a slip threshold value which expresses a start of pressure increase of the brake fluid pressure, on the basis of the road surface $\mu$ slope at a start of pressure increase estimated by the road surface $\mu$ slope estimating means. At this time, when the road surface $\mu$ slope at a start of pressure increase estimated by the road surface $\mu$ slope estimating means is greater than a predetermined value, the control parameter correcting means can effect correction such that the slip threshold value which expresses a start of pressure increase of the brake fluid pressure is made large. Further, when the road surface $\mu$ slope at a start of pressure increase estimated by the road surface $\mu$ slope estimating means is less than a predetermined value, the control parameter correcting means can effect correction such that the slip threshold value which expresses a start of pressure increase of the brake fluid pressure is made small. Moreover, the control parameter correcting means can correct the slip threshold value which expresses a start of pressure increase of the brake fluid pressure, and on the basis of this correction amount, can correct a slip threshold value which expresses a start of pressure reduction of the brake fluid pressure.

On the basis of a road surface $\mu$ slope, which is before start of braking force control and which is estimated by the road surface $\mu$ slope estimating means, the control parameter correcting means can correct a control parameter generated at the control parameter generating means.

When the road surface $\mu$ slope, which is before start of braking force control and which is estimated by the road surface μ slope estimating means, is smaller than a predetermined value, the control parameter correcting means can make the pressure reduction amount of the brake fluid pressure large and/or make the pressure increase amount small, and when the road surface μ slope, which is before start of braking force control, is greater than a predetermined value, the control parameter correcting means can make the pressure reduction amount of the brake fluid pressure small and/or make the pressure increase amount large.

In a third aspect of the present invention, in the first aspect, the control means controls a braking torque amount of each wheel on the basis of the road surface μ slope estimated for each wheel by the road surface μ slope estimating means.

In accordance with the third aspect, the control means controls the braking torque amount by, for example, increasing or reducing the brake fluid pressure on the basis of the road surface μ slope. Namely, even if there is no G sensor or G switch, by utilizing the road surface μ slope, it can be judged whether the tire is tending toward locking. Thus, the system can be simplified.

The braking force control device of the third aspect can further comprise: wheel acceleration detecting means for detecting a wheel acceleration on the basis of the wheel speed detected by the wheel speed detecting means, wherein the control means controls a braking torque amount on the basis of a relationship between the road surface μ slope estimated by the road surface μ slope estimating means and the wheel acceleration detected by the wheel acceleration detecting means.

The control means can control at least one of an amount of increase in braking torque and an amount of decrease in braking torque, on the basis of one of a wheel slip speed and a wheel slip ratio. By using not only the road surface μ slope and the wheel acceleration, but also the wheel slip speed or wheel slip ratio, the braking torque can be controlled more reliably, and thus, stability during braking can be improved.

When the road surface μ slope estimated by the road surface μ slope estimating means is less than or equal to a predetermined value, the control means can effect control to decrease the braking torque. When the four wheels of a vehicle lock simultaneously, road surface μ slope is a predetermined value or less. Thus, due to the control means carrying out control to reduce the braking torque, the grip of the tire can be restored. Further, the tendency to lock of the four wheels can be detected even if no G sensor or G switch is provided, and thus, the system can be simplified.

In a fourth aspect of the present invention, the braking force control device of the first aspect further comprises: lateral slip information detecting means for detecting lateral slip information of the wheel, wherein the control means controls a braking force of each wheel on the basis of the road surface μ slope estimated for each wheel by the road surface μ slope estimating means and the lateral slip information detected by the lateral slip information detecting means.

In accordance with the fourth aspect, the lateral slip information detecting means detects lateral slip information of the wheel. This lateral slip information of the wheel may be, for example, the direction of generation force of the wheel or the slip angle. Further, the direction of tire generation force substantially corresponds to the steering angle of the steering wheel of the vehicle. Thus, the lateral slip information detecting means may detect the steering angle of the steering wheel of the vehicle. In this case, a steering angle sensor may be used as the lateral slip information detecting means. The control means controls the braking force of the wheel for each wheel on the basis of the estimated road surface μ slope and the lateral slip information. In this way, by controlling the braking forces of the respective wheels in consideration of the lateral slip information, even in a case in which there is lateral slip, the total slip region can be prevented from being reached, and the control stability at the time of braking while turning can be improved.

The control means may be formed by a target value computing means for computing a target value of a friction state on the basis of the lateral slip information, and a braking force control means for controlling the braking force of the wheel such that a frictional state detected by a frictional state estimating means follows the target value. At this time, as the lateral slip of the wheel increases, it is preferable for the target value computing means to make the target value larger, and as the lateral slip of the wheel decreases, it is preferable for the target value computing means to make the target value smaller.

BRIEF DESCRIPTION OF THE DRAWINGS

FIG. 1 is a graph showing a characteristic of a road surface μ with respect to wheel slip speed.

FIG. 29 is a flowchart of a main routine for explaining contents of operation of the ABS control device.

FIG. 30 is a flowchart for explaining contents of operation of control mode selection processing.

FIG. 31 is a graph for explaining control of brake fluid pressure corresponding to a road surface μ slope and wheel acceleration.

FIG. 32 is a graph for explaining control of brake fluid pressure corresponding to road surface μ slope and wheel acceleration.

FIG. 33 is a graph for explaining control of brake fluid pressure corresponding to wheel slip speed, road surface μ slope and wheel acceleration.

FIG. 34 is a graph for explaining control of brake fluid pressure corresponding to wheel slip speed, road surface μ slope and wheel acceleration.

FIG. 35 is a graph for explaining control of brake fluid pressure corresponding to wheel slip speed, road surface μ slope and wheel acceleration.

FIG. 36 is a graph for explaining control of brake fluid pressure corresponding to wheel slip speed, road surface μ slope and wheel acceleration.

FIG. 37 is a schematic structural view of an ABS control device.

FIGS. 38A and 38B are diagrams for explaining the structure of a wheel speed detecting means, wherein FIG. 38A is a structural view of a wheel speed detecting means and FIG. 38B is a diagram showing changes over time in an alternating current voltage generated at a pick up coil.

FIGS. 46A through 46C are diagrams at a time when a lane change test was carried out with the ABS control device relating to the present invention, wherein FIG. 46A is a graph showing the wheel speed, FIG. 46B is a graph showing the braking force slope, and FIG. 46C is a graph showing the steering angle.

FIGS. 47A through 47C are diagrams at a time when a lane change test was carried out with an ABS control device relating to a conventional art, wherein FIG. 47A is a graph showing the wheel speed, FIG. 47B is a graph showing the braking force slope, and FIG. 47C is a graph showing the steering angle.

DETAILED DESCRIPTION OF THE PREFERRED EMBODIMENTS

Hereinafter, embodiments of the present invention will be described in detail with reference to the drawings.

(First Embodiment)

Figure 4:
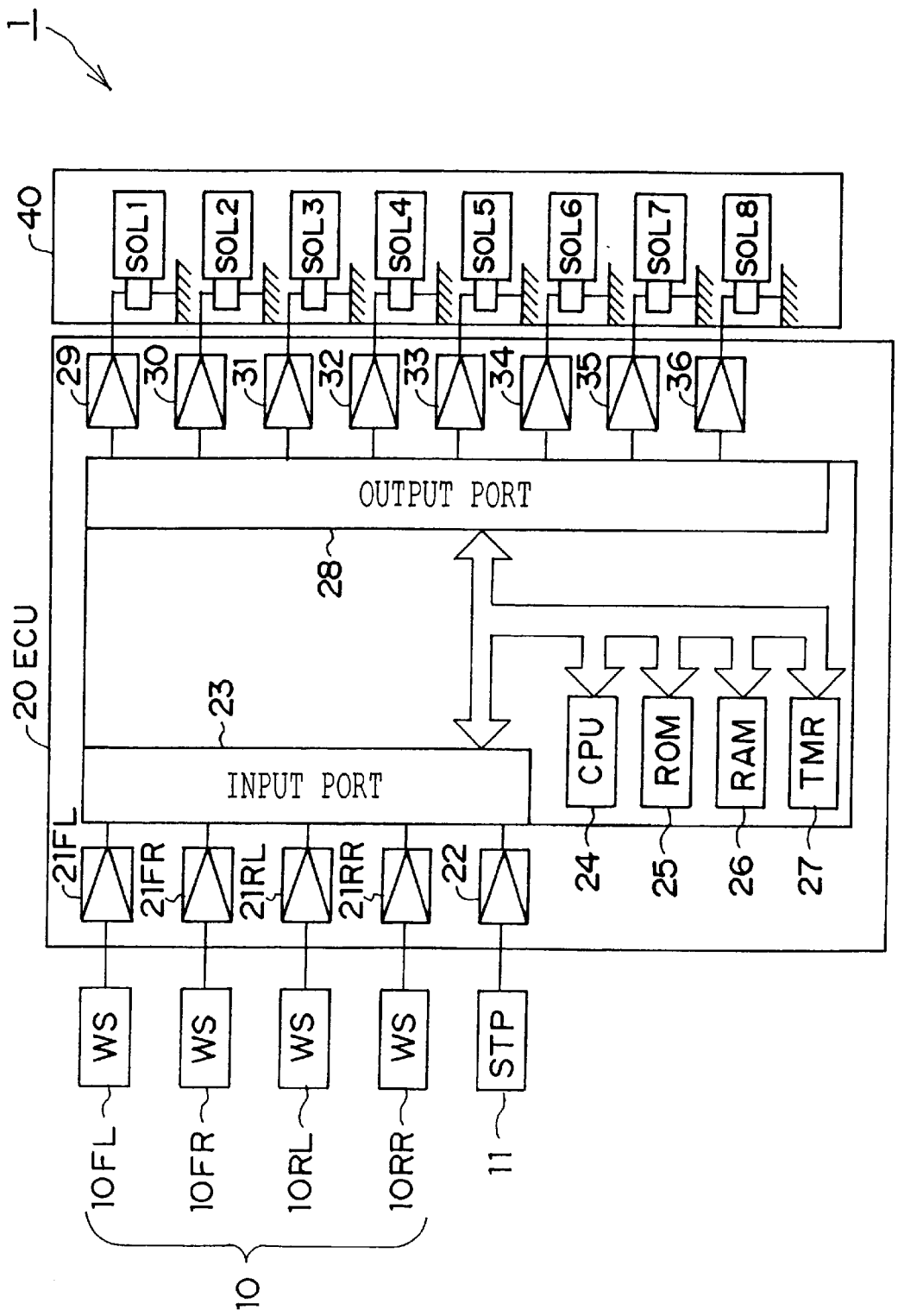
FIG. 4 is a block diagram showing a specific structure of an ABS control device relating to a first embodiment of the present invention.

The present invention can be applied to, for example, an ABS control device 1 having the structure illustrated in FIG. 4. The ABS control device 1 includes wheel speed sensors 10 (10FL, 10FR, 10RL, 10RR) which detect the wheel speeds of the respective wheels; a stop switch 11 which detects that the brake pedal has been depressed; an electronic control unit (hereinafter, "ECU") 20 which controls the entire device; and an ABS fluid pressure circuit 40 which carries out brake control in accordance with control of the ECU 20.

The ECU 20 includes amplifiers 21 (21FL, 21FR, 21RL, 21RR) which amplify signals from the wheel speed sensors 10; an amplifier 22 which amplifies a signal from the stop switch 11; an input port 23 which converts an inputted signal into a signal which can be processed internally; a CPU 24 which carries out a predetermined computation processing; an ROM 25 which stores a control program and the like; a RAM 26 in which signals are temporarily stored; a TMR 27; an output port 28 which converts an output signal into a predetermined form; and amplifiers 29 through 36 which amplify and output signals from the output port.

The CPU 24 operates in accordance with the control program stored in the ROM 25, and stores in the RAM 26 signals inputted via the input port 23. The CPU 24 estimates a road surface μ slope, and generates and corrects control parameters for ABS control. The CPU 24 supplies a signal, which is for effecting ABS control in accordance with the corrected control parameters, to the ABS fluid pressure circuit 40 via the output port 28 and the amplifiers 29 through 36.

Figure 5:
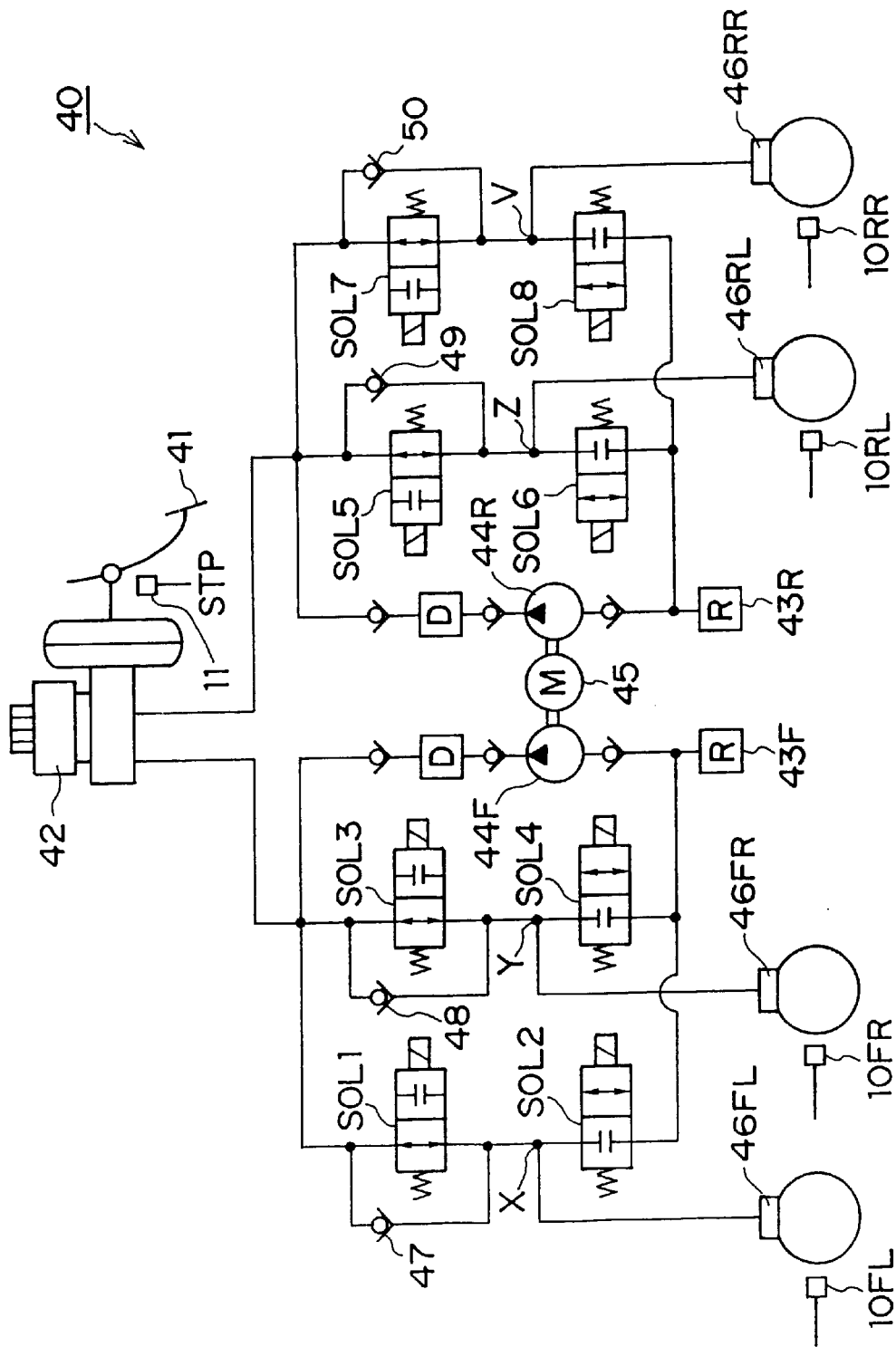
FIG. 5 is a circuit diagram showing a structure of an ABS fluid pressure circuit provided at the ABS control device.

The ABS fluid pressure circuit 40 is provided with an actuator which is formed from solenoids SOL1 through SOL8. Specifically, as shown in FIG. 5, the ABS fluid pressure circuit 40 is provided with a master cylinder 42 at which fluid pressure corresponding to the depressing force of the brake pedal 41 is generated; the ti solenoids SOL1 through SOL8 which increase, reduce, and maintain the fluid pressure of the brake fluid; reservoirs 43 (43F, 43R) which temporarily hold brake fluid; pumps 44 (44F, 44R) which draw-up the brake fluid stored in the reservoir 43; a motor 45 which is the motive power source of the pump 44; wheel cylinders 46 (46FL, 46FR, 46RL, 46RR) which control the wheel with a braking force corresponding to the liquid pressure; and check valves 47 through 50 which suppress flowing of the high pressure brake fluid in a predetermined direction.

The solenoid SOL1 and the solenoid SOL2, the solenoid SOL3 and the solenoid SOL4, the solenoid SOL5 and the solenoid SOL6, and the solenoid SOL7 and the solenoid SOL8, are connected in series via respective fluid pressure paths. At each group of solenoids SOL connected in series, one side thereof is connected to the master cylinder 42, whereas the other side thereof is connected to the reservoir 43.

A fluid pressure path for supplying brake fluid is provided at each of the regions between the respective ports of the solenoids SOL1, SOL3, SOL5, SOL7. The check valves 47 through 50, which are provided such that the high pressure brake fluid does not flow from the wheel cylinder 46 side port to the master cylinder 42 side port, are provided at these fluid pressure paths. The wheel cylinders 46FL, 46FR, 46RL, 46RR are connected via respective fluid pressure paths to connection points X, Y, Z, V of two solenoids SOL connected in series.

In a pressure reduction control mode, the reservoir 43 holds the brake fluid which has returned from the wheel cylinders 46. The pump 44 is driven by the motor 45 at the time when ABS control is carried out, and draws-up brake fluid which is stored in the reservoir 43, and supplies the brake fluid to the master cylinder 42 via the check valves.

The braking torque of a desired wheel can be controlled by the ECU 20 energizing an arbitrary solenoid SOL and adjusting (increasing, reducing, or maintaining) the fluid pressure of an arbitrary wheel cylinder 46, for the ABS fluid pressure circuit 40 having such a structure.

Figure 6:
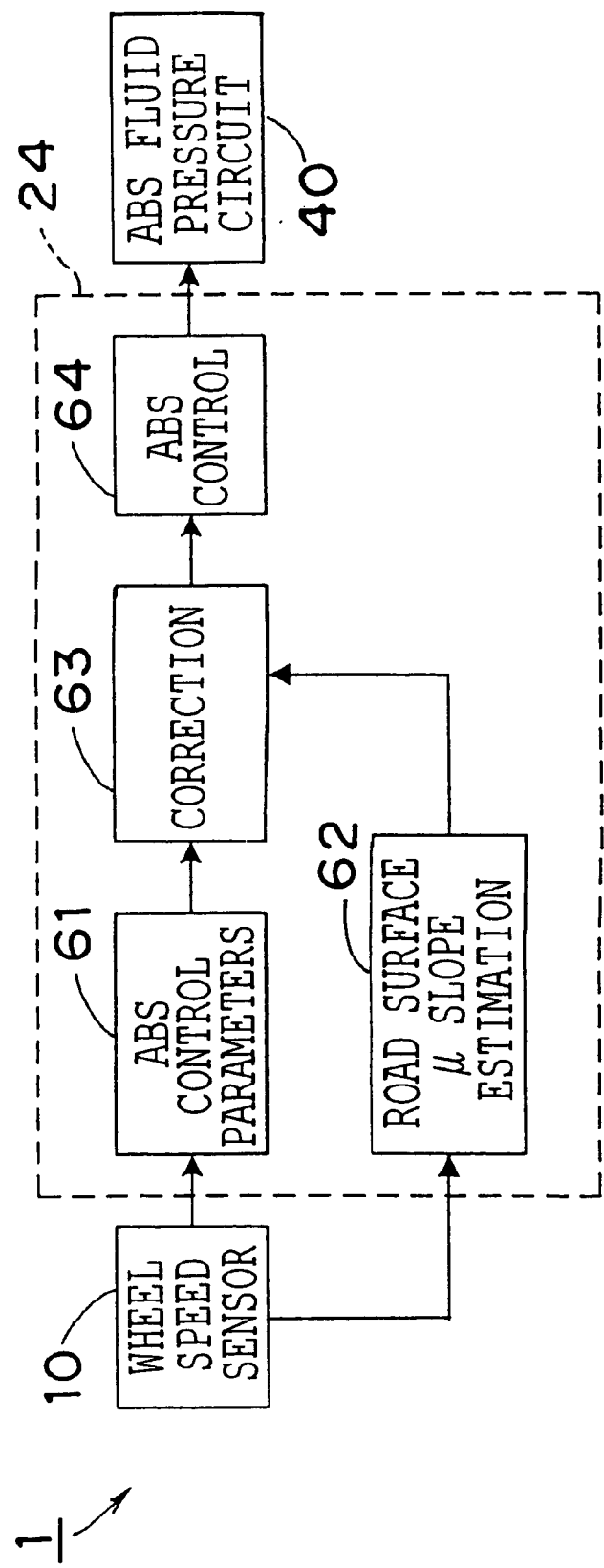
FIG. 6 is a block diagram showing a functional structure of the ABS control device.

Such an ABS control device 1 is functionally structured as shown in FIG. 6. Namely, the ABS control device 1 includes an ABS control parameter generating circuit 61 which generates parameters for ABS control on the basis of the wheel speeds from the wheel speed sensors 10; a road surface $\mu$ slope estimating circuit 62 which estimates the road surface $\mu$ slope of each wheel on the basis of the wheel speeds; a correction circuit 63 for correcting the parameters for ABS control on the basis of the road surface $\mu$ slope; and an ABS control circuit 64 which controls the ABS fluid pressure circuit 40 by using the corrected parameters. Note that the ABS control parameter generating circuit 61, the road surface $\mu$ slope estimating circuit 62, the try correction circuit 63, and the ABS control circuit 64 correspond to the aforementioned CPU 24. The road surface $\mu$ is a friction coefficient $\mu$ between the wheels and the road surface.

The ABS control parameter generating circuit 61 generates, as parameters for ABS control, a pressure reduction start slip threshold value S1_0, an pressure increase start slip threshold value S2_0, a pressure reduction start wheel acceleration threshold value G1_0, an pressure increase start wheel acceleration threshold value G2_0, a pressure reduction duty ratio D1_0, and pressure increase duty ratio D2_0, and a pressure reduction time T1_0. The ABS control parameter generating circuit 61 supplies these parameters to the correction circuit 63.

The road surface $\mu$ slope estimating circuit 62 estimates the road surface $\mu$ slope of each wheel on the basis of the wheel speed of each wheel detected by the wheel speed sensors 10, and supplies the road surface $\mu$ slopes to the correction circuit 63. Detailed explanation of the road surface $\mu$ slope estimating circuit 62 will be provided later.

The correction circuit 63 carries out initial setting of the parameters generated at the ABS control parameter generating circuit 61, corrects the control parameters on the basis of the road surface $\mu$ slopes, and then selects an operation mode. The ABS control circuit 64 carries out, on the ABS fluid pressure circuit 40, fluid pressure control of the brake fluid in accordance with any of operation modes which are a "pressure reduction mode", a "pulse pressure reduction mode", and a "pulse pressure increase mode".

Hereinafter, the road surface $\mu$ slope estimating circuit 62 will be described. The road surface $\mu$ slope estimating circuit 62 relating to the present embodiment computes the $\mu$ slope in a case in which only a road surface disturbance $\Delta Td$ is inputted to a wheel resonance system as an excitation input.

Figure 7:
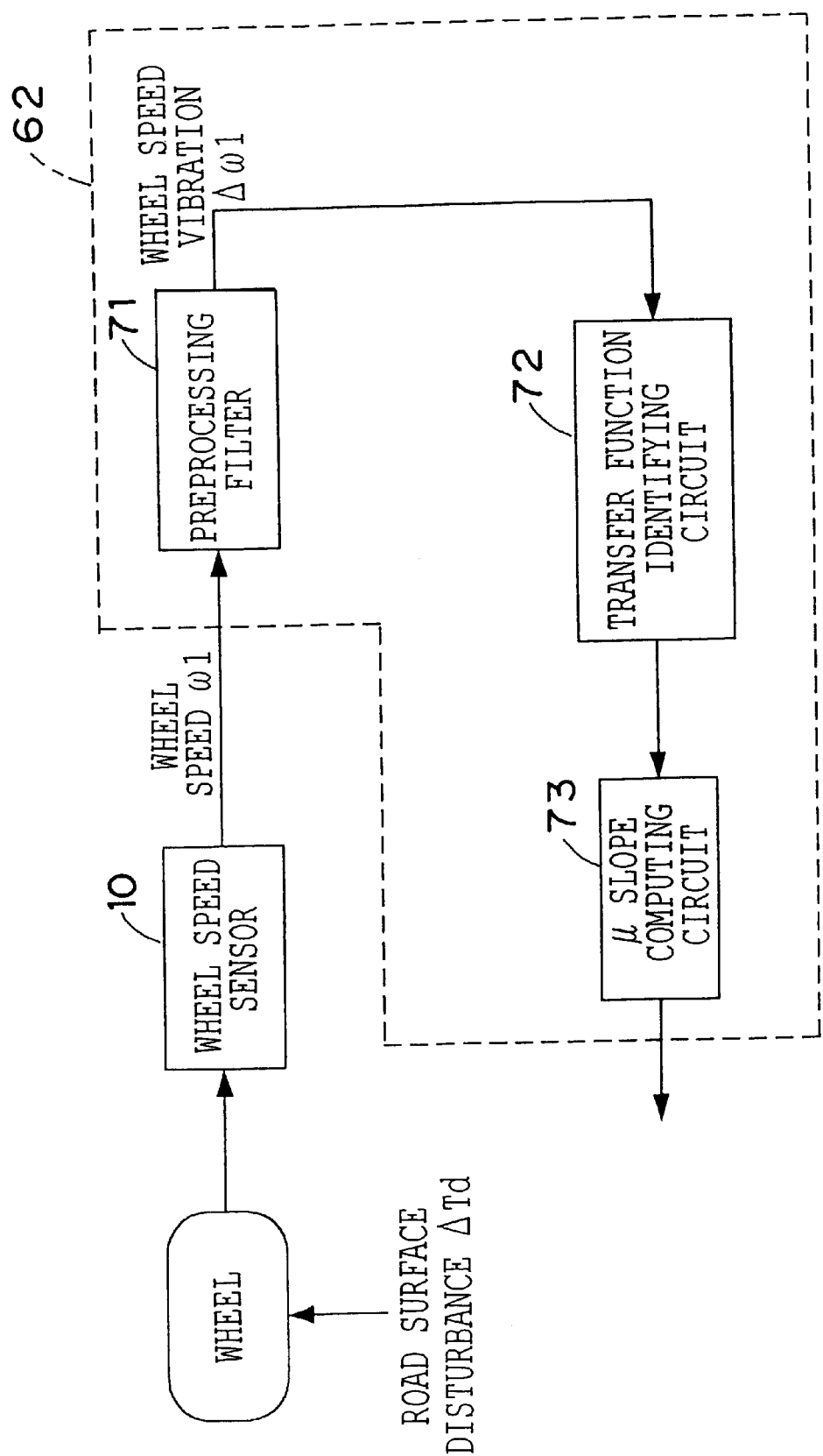
FIG. 7 is a block diagram showing a structure of a road surface slope estimating circuit.

As shown in FIG. 7, the road surface $\mu$ slope estimating circuit 62 is formed by a preprocessing filter 71, a transfer function identifying circuit 72, and a $\mu$ slope computing circuit 73. The preprocessing filter 71 detects, from a wheel speed $\omega1$ of the wheel detected by the wheel speed sensor 10, a wheel speed vibration $\Delta\omega1$ of the wheel which serves as a response output of a wheel resonance system which receives a road surface disturbance $\Delta Td$. The transfer function identifying circuit 72 uses the least squares method to identify the transfer function of the wheel which satisfies the wheel speed vibration $\Delta\omega1$. The $\mu$ slope computing circuit 73 computes for the wheel the slope of the friction coefficient $\mu$ between the tire and the road surface, on the basis of the identified transfer function.

The preprocessing filter 71 can be formed by a bandpass filter, through which only pass frequency components of a given band whose center is a frequency which is surmised to be the resonance frequency of the wheel resonance system, or by a bypass filter, through which only pass frequency components of a high band including the resonance frequency component. The bandpass filter or the bypass filter fixes the parameter, which regulates the frequency characteristic, to a fixed value.

The output of the preprocessing filter 71 is an output from which direct current components are removed. In other words, only the wheel speed vibration $\Delta\omega1$ around the wheel speed $\omega1$ is extracted.

Here, the transfer function F(s) of the preprocessing filter 71 is:

$$F(s) = \frac{1}{\sum_{i=0}^{m} c_i s^{m-1}} \tag{1}$$

wherein ci is a coefficient of the filter transfer function, and s is a Laplacean.

Next, the computational formula on which the transfer function identifying circuit 72 depends will be derived. Note that in the present embodiment, the computation of the preprocessing filter 71 is carried out included within the operation of the transfer function identifying circuit 72.

First, the transfer function which is to be identified is two-dimensionally modeled by using the road surface disturbance $\Delta Td$ as the excitation input, and the wheel speed vibration $\Delta\omega1$ detected by the preprocessing filter 71 at this time as the response output. Namely, the following vibration model is assumed.

$$\Delta\omega_1 = \frac{b_2}{\sum_{i=0}^{2} a_i s^{2-i}} \Delta T_d + v, \ a_0 = 1 \tag{2}$$

Here, v is the observed noise which is included at the time of observing the vehicle speed signal. By modifying formula (2), the following formula is obtained.

$$\sum_{i=0}^{2} a_i s^{2-i} \Delta\omega_1 = b_2 \Delta T_d + \sum_{i=0}^{2} a_i s^{2-i} v \tag{3}$$

First, the formula obtained by applying the preprocessing filter of formula (1) to formula (3) is digitized. At this time, $\Delta\omega 1$, $\Delta T d$, and v are expressed as digitized data $\Delta\omega 1(k)$, $\Delta T d(k)$, and $v(k)$ (k is a sampling number; k=1, 2, 3, ... ) which are sampled for each sampling cycle Ts. Further, the Laplacean s can be digitized by using a predetermined digitizing method. In the present embodiment, as one example, digitization is carried out by using the following bilinear conversion. Note that d is a one sample delay operator.

$$s = \frac{2}{T_s} \cdot \frac{1-d}{1+d}$$

Further, the degree m of the preprocessing filter is preferably 2 or more. Thus, in the present embodiment, in consideration of the computation time, m=2, and the following formula is thereby obtained.

$$\sum_{i=0}^{2} a_i \xi_{yi}(k) = b_2 \xi_{u2}(k) + \sum_{i=0}^{2} a_i \xi_{vi}(k) \tag{4}$$

wherein $$\xi_{yi}(k) = \left(\frac{T_s}{2}\right)^i (1+d)^i (1-d)^{2-i} F_0(d) \Delta\omega_1(k) \tag{5}$$

$$\xi_{u2}(k) = \left(\frac{T_s}{2}\right)^2 (1+d)^2 F_0(d) \Delta T_d(k) \tag{6}$$

$$\xi_{vi}(k) = \left(\frac{T_s}{2}\right)^i (1+d)^i (1-d)^{2-i} F_0(d) v(k) \tag{7}$$

$$F_0(d) = \frac{1}{\sum_{i=0}^{2} c_i \left(\frac{T_s}{2}\right)^i (1+d)^i (1-d)^{2-i}} \tag{8}$$

Further, in order to identify the transfer function from the respective data of the wheel speed vibrations $\Delta\omega 1$, formula (4) is converted, on the basis of the least squares method, into the following formula so as to become a linear function with respect to the parameter which is to be identified. Note that "T" transposes a matrix.

$$\xi_{yo}(k) = \zeta^T(k)\theta + r(k) \tag{9}$$

Here, $$\zeta(k) = [-\xi_{y1}(k) - \xi_{y2}(k)]^T$$

$$\theta = [a_1 a_2]^T \tag{10}$$

$$r(k) = b_2 \xi_{u2}(k) + \sum_{i=0}^{2} a_i \xi_{vi}(k)$$

In the above formulas, $\theta$ is a parameter of the transfer function to be identified.

At the transfer function identifying circuit 72, by applying the least squares method, the unknown parameter $\theta$ is estimated for the respective data which successively apply the digitized data of the detected wheel speed vibration $\Delta\omega 1$ to formula (9). In this way, the transfer function is identified.

Specifically, the detected wheel speed vibration $\Delta\omega 1$ is converted into digitized data $\Delta\omega(k)$ (k=1, 2, 3, ... ). The data are N point sampled, and by using the following least squares method computational formula, the parameter $\theta$ of the transfer function is estimated.

$$\hat{\theta}(N) = \left[\sum_{k=1}^{N} \rho^{N-k} \zeta(k) \zeta^T(k)\right]^{-1} \left[\sum_{k=1}^{N} \rho^{N-k} \zeta(k) \xi_{yo}(k)\right] \tag{11}$$

Here, the value capped by the carat ^ mark (i.e., the mark) is defined as being an estimated value.

Further, the least squares method may carry out computation as a successive type least squares method which determines the parameter $\theta$ by the following recurrence formula.

$$\hat{\theta}(N) = \hat{\theta}(N-1) + h(N)[\xi_{yo}(N) - \zeta^T(N)\hat{\theta}(N-1)] \tag{12}$$

$$h(N) = \frac{P(N-1)\zeta(N)}{\rho + \zeta^T(N)P(N-1)\zeta(N)} \tag{13}$$

$$P(N) = \frac{1}{\rho}\{I - h(N)\zeta^T(N)\}P(N-1) \tag{14}$$

Here, $\rho$ is a so-called forgetting coefficient, and is usually set to a value of 0.95 to 0.99. At this time, the initial value may be:

$$\hat{\theta}(-1) = 0, P(-1) = aI$$

wherein a is a sufficiently large positive number.

Further, as a method for reducing the estimation error of the least squares method, any of various correction least squares methods may be used. In the present embodiment, an example will be described which uses an auxiliary variable method, which is a least squares method into which an auxiliary variable is introduced. In accordance with this method, at the stage when the relation of formula (9) is obtained, the parameter of the transfer function is estimated by using the following formula, by using m(k) as the auxiliary variable.

$$\hat{\theta}(N) = \left[\sum_{k=1}^{N} \rho^{N-k} m(k) \zeta^T(k)\right]^{-1} \left[\sum_{k=1}^{N} \rho^{N-k} m(k) \xi_{yo}(k)\right] \tag{15}$$

Further, successive computation is carried out as follows.

$$\hat{\theta}(N) = \hat{\theta}(N-1) + h(N)[\xi_{yo}(N) - \zeta^T(N)\hat{\theta}(N-1)] \tag{16}$$

$$h(N) = \frac{P(N-1)m(N)}{\rho + \zeta^T(N)P(N-1)m(N)} \tag{17}$$

$$P(N) = \frac{1}{\rho}\{I - h(N)\zeta^T(N)\}P(N-1) \tag{18}$$

The principles of the auxiliary variable method are as follows. By substituting formula (9) into formula (15), the following formula is obtained.

$$\hat{\theta}(N) = \theta + \left[\left[\sum_{k=1}^{N} \rho^{N-k} m(k)\zeta^T(k)\right]\right]^{-1} \left[\sum_{k=1}^{N} \rho^{N-k} m(k)r(k)\right] \quad (19)$$

Thus, if the auxiliary variable is selected such that the second term at the right side of formula (19) becomes zero, the estimated value of θ matches the actual value of θ. Thus, in the present embodiment, as the auxiliary variable, a variable is used which is delayed to the extent that ζ(k)=[−ξy1(k)−ξy2(k)]T is not correlated with the formula error r(k). Namely, $$m(k) = [\zeta_{y1}(k-L) - \zeta_{y2}(k-L)]^T \quad (20)$$

wherein L is the delay time.

After the transfer function is identified as described above, at the μ slope computation circuit 73, a physical amount which relates to the μ slope $D_0$ is computed as:

$$\frac{\hat{a}_2}{\hat{a}_1} = \frac{D_0}{J_1 + J_2} \quad (21)$$

In this way, when a physical amount relating to the road surface μ slope $D_0$ can be computed from formula (21), it can easily be judged that the friction characteristic between the tire and the road surface is in a saturated state, for example, when the physical amount is small.

Figure 9:
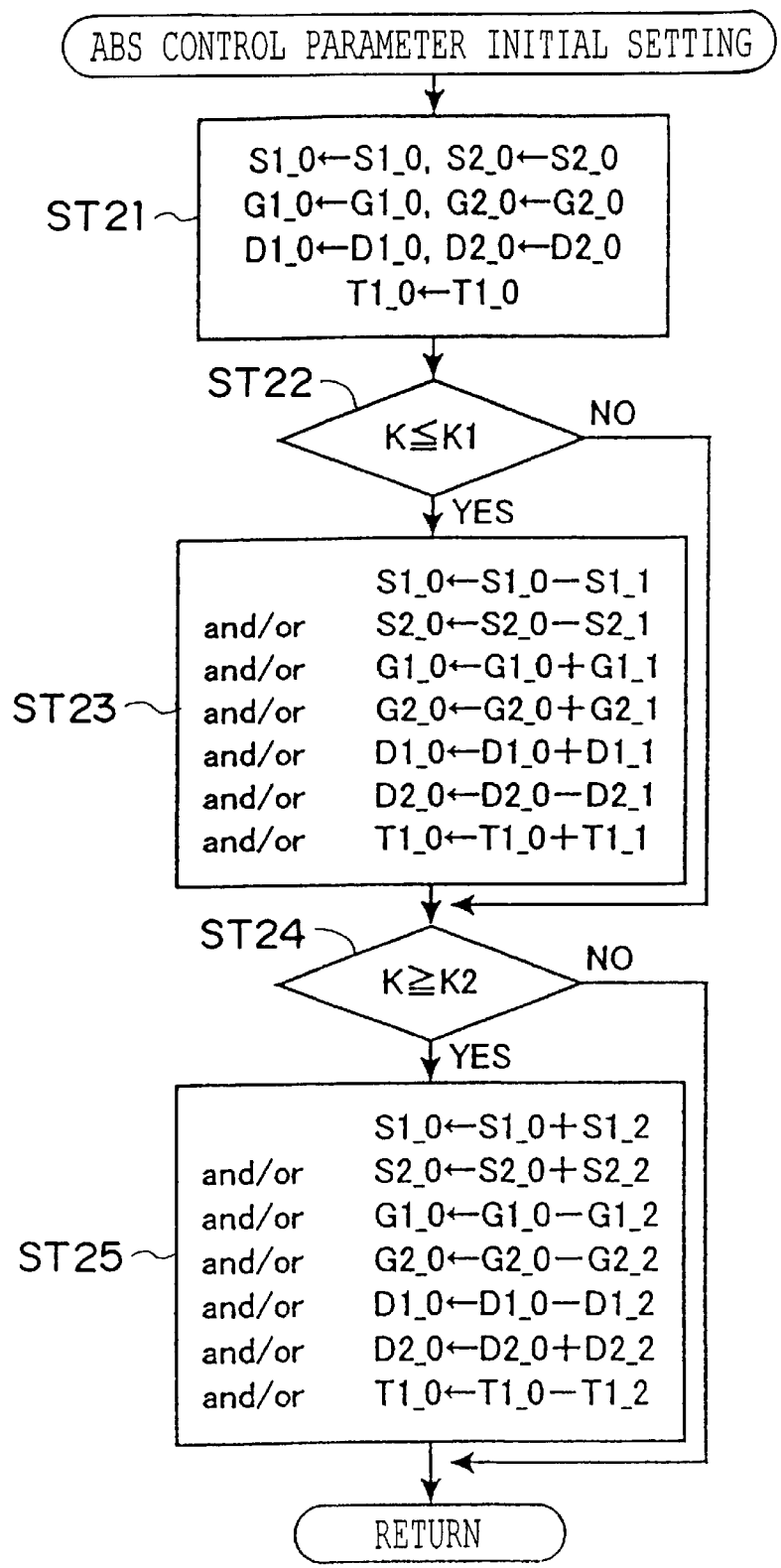
FIG. 9 is a flowchart explaining the contents of operation of ABS control parameter initial setting.

The above-described road surface μ slope estimating circuit 62 is a structure in which a parameter, which stipulates the frequency characteristic of the bandpass filter or the bypass filter, is fixed to a constant value at the preprocessing filter 71. However, this parameter may be varied in accordance with the parameter identified at the transfer function identifying circuit 72. Namely, an adaptation circuit, which varies the characteristic of the preprocessing filter 71 in accordance with the parameter identified at the transfer function identifying circuit 72, may be additionally provided (as in the second aspect of the first embodiment of JP-A No. 11-78843 (refer to FIG. 9 and the like)).

Further, in a case in which an excitation torque ΔT1 is inputted to the wheel resonance system as an excitation input, the road surface μ slope estimating circuit 62 may identify the transfer function of the wheel resonance system and compute the road surface μ slope (as in the first aspect of the third embodiment of JP-A No. 11-78843 (refer to FIG. 13 and the like)).

Moreover, in a case in which an excitation torque ΔT1 is inputted to the wheel resonance system as an excitation input, the road surface μ slope estimating circuit 62 may identify the transfer function of the wheel resonance system from the detected excitation input and response output (as in the first aspect of the fourth embodiment of JP-A No. 11-78843 (refer to FIG. 16 and the like)).

Figure 18:
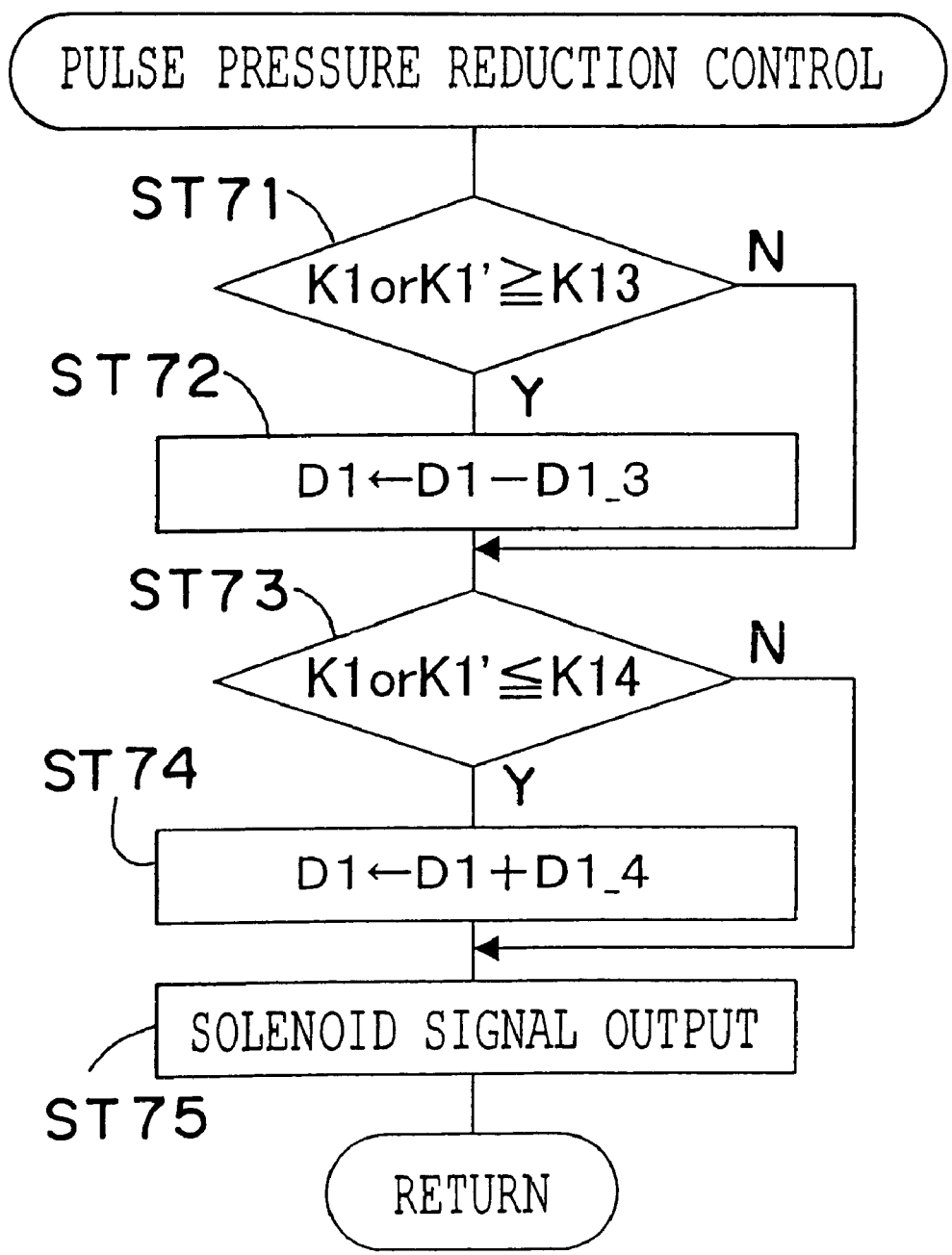
FIG. 18 is a flowchart explaining contents of operation of a pulse pressure reduction control mode.

In addition, the road surface μ slope estimating circuit 62 may select, from among the response outputs, only the response output which is a periodic signal, and identify the transfer function of the wheel resonance system on the basis of the selected response output, and compute the μ slope (as in the fifth embodiment of JP-A No. 11-78843 (refer to FIG. 18 and the like)).

In the above-described examples, the output response for the excitation input to the wheel resonance system including the friction characteristic between the tire and the road surface is detected. The transfer characteristic of the wheel resonance system from the excitation input to the response output is expressed as a vibration model which includes, as the unknown factor of the wheel state, at least a physical amount relating to the ease of slippage between the tire and the road surface. On the basis of the vibration model, the unknown factor is estimated such that at least the detected response output is substantially satisfied.

The present invention is not limited to the same, and the following is possible. A parameter of a physical model which expresses an unsprung resonance characteristic is identified from the wheel speed signal. The road surface μ slope is computed as a physical amount which estimates a physical amount relating to the ease of slippage between the road surface and the wheel from the identified parameter (refer to the description of the embodiments in Japanese Patent Application No. 10-281660).

In the above-described examples, the road surface μ slope is computed as the physical amount relating to the ease of slippage between the road surface and the wheel. However, the present invention is not limited to the same. A slope of braking torque with respect to slip speed (i.e., a braking torque slope), a slope of driving torque with respect to slip speed (i.e., a driving torque slope), a minute vibration, or the like may be determined.

Namely, the braking torque slope or the driving torque slope may be computed on the basis of time series data of wheel speed which is detected each time a predetermined sampling time elapses (refer to FIG. 1 and the like of Japanese Patent Application No. 10-114263).

Figure 2:
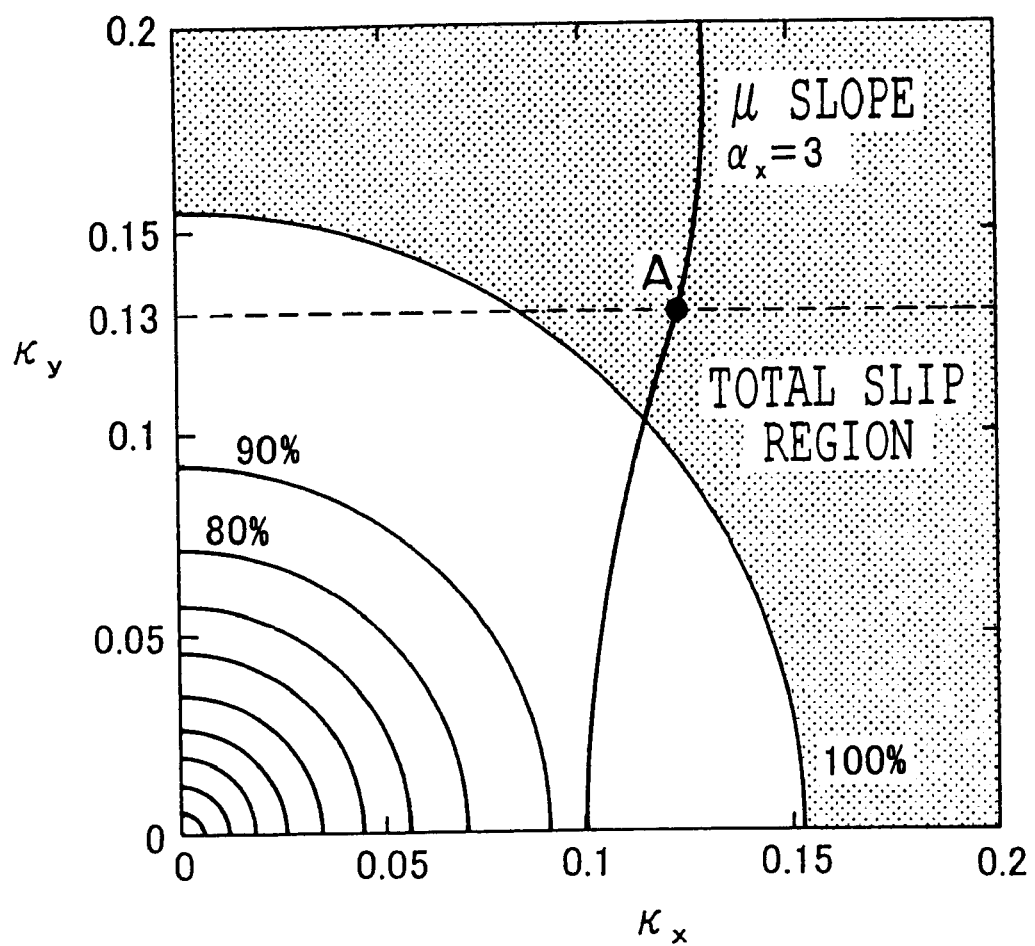
FIG. 2 is a graph for explaining a relationship between a slip ratio and a braking force slope.
Figure 3A:
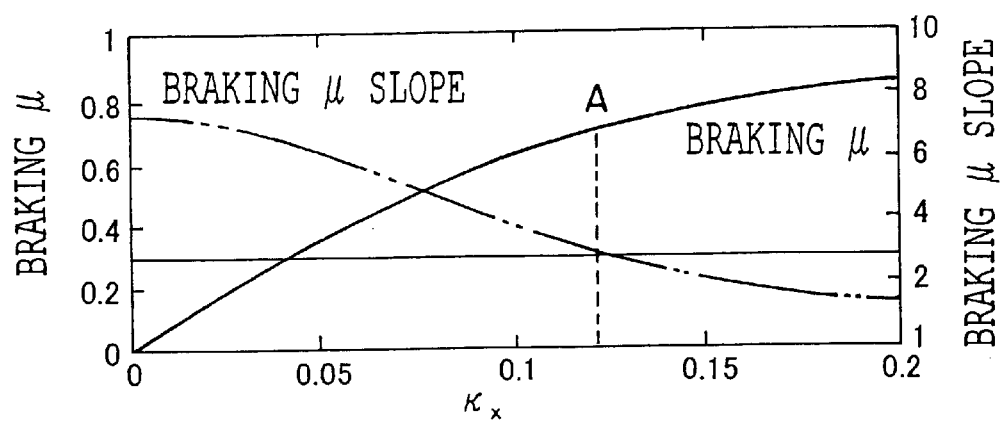
FIG. 3A is a graph showing a relationship between a longitudinal direction slip ratio $\kappa_x$ and braking μ.
Figure 3B:
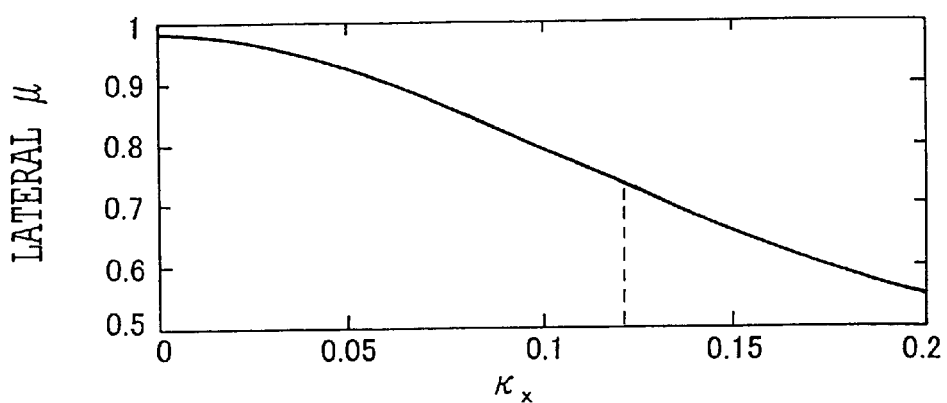
FIG. 3B is a graph showing a relationship between the longitudinal direction slip ratio $\kappa_x$ and lateral μ (lateral force)
Figure 3C:
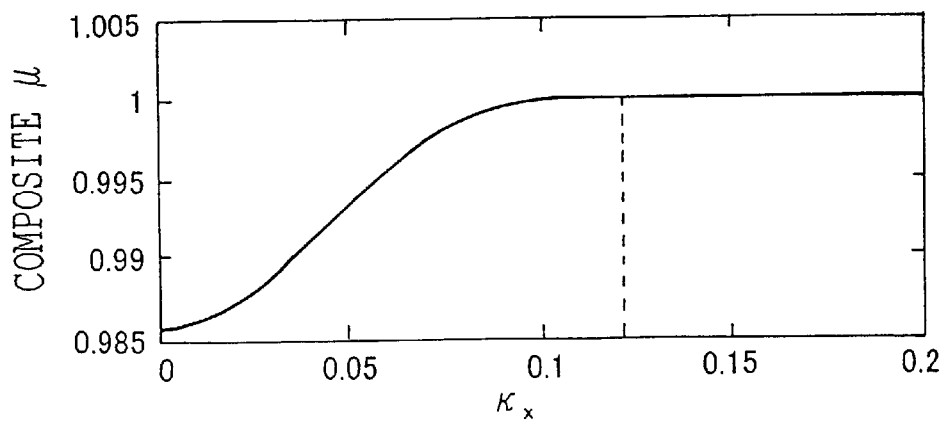
FIG. 3C is a graph showing a relationship between the longitudinal direction slip ratio $\kappa_x$ and composite μ.

Further, the braking torque slope may be computed on the basis of time series data of wheel deceleration which is detected each time a predetermined sampling time elapses, and on the basis of the braking torque detected each time a predetermined sampling time elapses or time series data of a physical amount which relates to this braking torque (refer to FIGS. 2, 3 and the like of Japanese Patent Application No. 10-114263).

Further, the braking force may be minutely excited at the resonance frequency of a vibration system formed from the vehicle and the wheel and the road surface, and a minute gain, which is the ratio of the extremely small amplitude of the resonance frequency component of the wheel speed with respect to the minute amplitude of the braking force at the time the braking force is minutely excited, may be computed (see FIG. 4 and the like of JP-A No. 10-114263).

Figure 8:
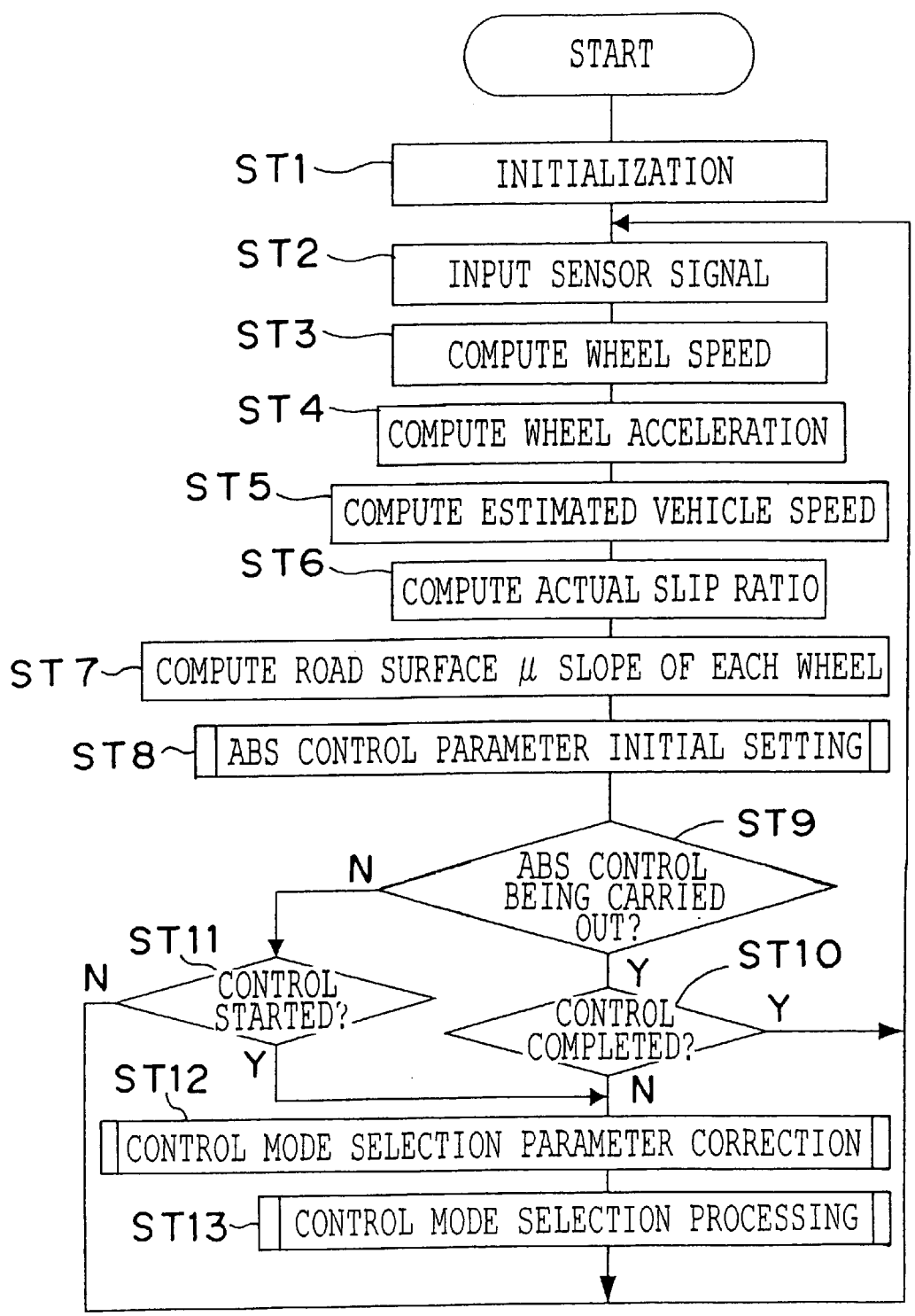
FIG. 8 is a flowchart of a main routine which explains contents of operation of the ABS control device.

At the time that ABS control is carried out, the ABS control device 1 having such a structure carries out the processings from step ST1 through step ST13 shown in FIG. 8.

As shown in FIG. 8, each circuit is first initialized (step ST1). Then, when signals are inputted to the respective sensors (step ST2), the wheel speed sensors 10 compute the wheel speeds (step ST3). On the basis of the wheel speeds, the ABS control parameter generating circuit 61 computes a wheel acceleration DVw (step ST4), an estimated vehicle speed (step ST5), and an actual slip ratio S (step ST6), and generates parameters for ABS control.

On the basis of the wheel speed of each wheel from the wheel speed sensors 10, the road surface μ slope estimating circuit 62 estimates the road surface μ slope of each wheel (step ST7), and supplies these road surface μ slopes to the correction circuit 63.

After the processing of step ST7, the correction circuit 63 carries out initial setting of the ABS control parameters (step ST8). Here, the correction circuit 63 implements the subroutine from step ST21 through step ST25 shown in FIG. 9.

For the wheel which is the object of control, the correction circuit 63 sets a pressure reduction start slip threshold value S1_0, an pressure increase start slip threshold value S2_0, a pressure reduction start wheel acceleration threshold value G1_0, an pressure increase start wheel acceleration threshold value G2_0, a pressure reduction duty ratio D1_0, and pressure increase duty ratio D2_0, and a pressure reduction time T1_0 (step ST21). If needed, it is possible to use only some of these parameters. Then, the correction circuit 63 judges whether or not the road surface $\mu$ slope of the wheel which is the object of control is less than or equal to a predetermined value K1 (K≦K1) (step ST22). The predetermined value K1 is a value expressing that the road surface is a low $\mu$ road. Namely, when (K≦K1), the road surface is a low $\mu$ road.

When the judgment in step ST22 as to whether (K≦K1) is affirmative, the correction circuit 63 carries out the following computations (step S23).

| | |
|---|---|
| S1_0 ← S1_0 − S1_1 | S2_0 ← S2_0 − S2_1 |
| G1_0 ← G1_0 + G1_1 | G2_0 ← G2_0 + G2_1 |
| D1_0 ← D1_0 + D1_1 | D2_0 ← D2_0 − D2_1 |
| T1_0 ← T1_0 + T1_1 | |

When the vehicle travels on a low $\mu$ road, the degree of grip of the wheel approaches the limit. Accordingly, by making the pressure reduction start slip threshold value S1_0 and the pressure increase start slip threshold value S2_0 small in this way, the wheel slip does not become excessively large, and the wheel grip can be maintained. For the same reason, by making the pressure reduction start wheel acceleration threshold value G1_0 and the pressure increase start wheel acceleration threshold value G2_0 large, the pressure reduction duty ratio D1_0 large, the pressure increase duty ratio D2_0 small, and the pressure reduction time T1_0 long, the wheel slip does not become large. Note that correction for all 7 of these parameters may be carried out, or correction of only arbitrary parameters may be carried out.

When the judgement in step ST22 as to whether (K≦K1) is negative, or when step ST23 is completed, the correction circuit 63 judges whether the road surface $\mu$ slope is greater than or equal to a predetermined value K2 (K≧K2) (step ST24). The predetermined value K2 is a value expressing whether the road surface is a high $\mu$ road. Namely, when (K≧K2), the road surface is a high $\mu$ road.

When the judgement in step ST22 as to whether (K≧K2) is affirmative, the correction circuit 63 carries out the following computations (step ST25).

| | |
|---|---|
| S1_0 ← S1_0 + S1_2 | S2_0 ← S2_0 + S2_2 |
| G1_0 ← G1_0 − G1_2 | G2_0 ← G2_0 − G2_2 |
| D1_0 ← D1_0 − D1_2 | D2_0 ← D2_0 + D2_2 |
| T1_0 ← T1_0 − T1_2 | |

When the vehicle travels on a high $\mu$ road, there is still much leeway until the degree of grip of the wheel approaches the limit. Accordingly, by making the values of the pressure reduction start slip threshold value S1_0 and the pressure increase start slip threshold value S2_0 large in this way, the gripping force of the wheel can be utilized to the maximum limit, and quick deceleration is possible. For the same reason, by making the pressure reduction start wheel acceleration threshold value G1_0 and the pressure increase start wheel acceleration threshold value G2_0 small, the pressure reduction duty ratio D1_0 small, the pressure increase duty ratio D2_0 large, and the pressure reduction time T1_0 short, the gripping force of the wheel can be utilized to the maximum limit.

Note that, in the same way as in step S23, correction for all 7 of these parameters may be carried out, or correction of only arbitrary parameters may be carried out.

When the judgement in step ST25 as to whether (K≧K2) is negative, or when the processing of step ST25 is completed, the correction circuit 63 exits the subroutine processing and proceeds to step ST9 of the main routine shown in FIG. 8.

Returning to the main routine, the ABS control circuit 64 judges whether or not ABS control is currently being carried out (step ST9). When ABS control is currently being carried out, it is judged whether ABS control has been completed (step ST10). When ABS control has been completed, the routine returns to step ST2. ABS control is not completed, the routine proceeds to step ST12.

Further, if it is determined in step ST9 that ABS control is currently not being carried out, the ABS control circuit 64 judges whether ABS control has been started (step ST11). When the ABS control circuit 64 judges that ABS control has been started, the routine proceeds to step ST12. If ABS control has not been started, the routine returns to step ST2.

The correction circuit 63 carries out correction processing of the parameters for selecting the control mode (step ST12). Specifically, the correction circuit 63 executes the processings from step ST31 to step ST38 in the subroutine shown in FIG. 10. Note that the road surface $\mu$ slope at the time of start of pressure reduction the previous time is K1, and the road surface $\mu$ slope at the time of start of pressure increase the previous time is K2.

Figure 11:
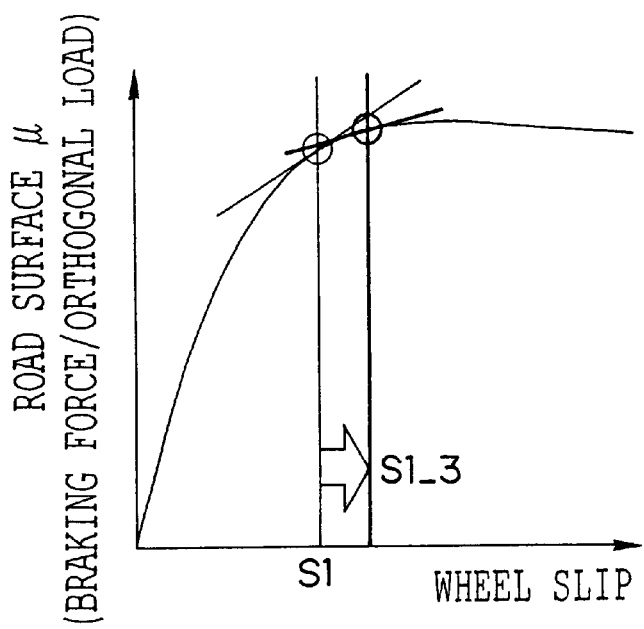
FIG. 11 is a graph showing a characteristic of a road surface μ with respect to wheel slip speed.

The correction circuit 63 judges whether or not the road surface $\mu$ slope K1 at the time of start of pressure reduction the previous time is greater than or equal to a predetermined value K3 (K1≧K3) (step ST31). When (K1≧K3), the correction circuit 63 corrects the pressure reduction start slip threshold value S1 so as to increase by S1_3 (step ST32). In this case, as shown in FIG. 11, the road surface $\mu$ slope at the time pressure reduction starts at the pressure reduction start slip threshold value S1 is high, and there is still leeway with respect to the gripping force of the wheel. Accordingly, by correcting the pressure reduction start slip threshold value S1 to become greater, the peak of the $\mu$-S characteristic is effectively utilized.

Figure 12:
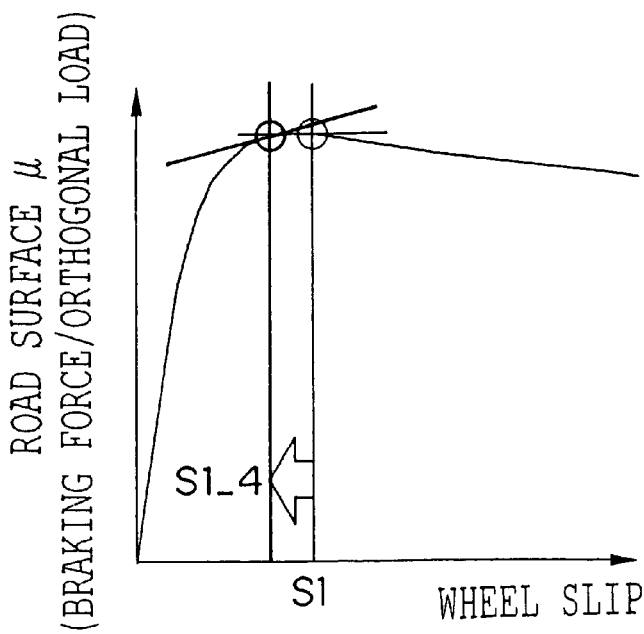
FIG. 12 is a graph showing a characteristic of a road surface μ with respect to wheel slip speed.

When the determination in step ST31 as to whether (K1≧K3) is negative, or when the processing of step ST32 is completed, the correction circuit 63 judges whether or not the road surface $\mu$ slope K1 at the time of start of pressure reduction the previous time is less than or equal to a predetermined value K4 (K1≦K4) (step ST33). When the judgement as to whether K1≦K4 is affirmative, the correction circuit 63 corrects the pressure reduction start slip threshold value S1 so as to decrease by S1_4 (step ST34). In this case, as shown in FIG. 12, the road surface $\mu$ slope at the time pressure reduction starts at the pressure reduction start slip threshold value S2 is low, and the peak of the $\mu$-S characteristic has arrived or has already been exceeded. Accordingly, by correcting the pressure reduction start slip threshold value S1 to become smaller, the peak of the $\mu$-S characteristic is not exceeded.

Figure 13:
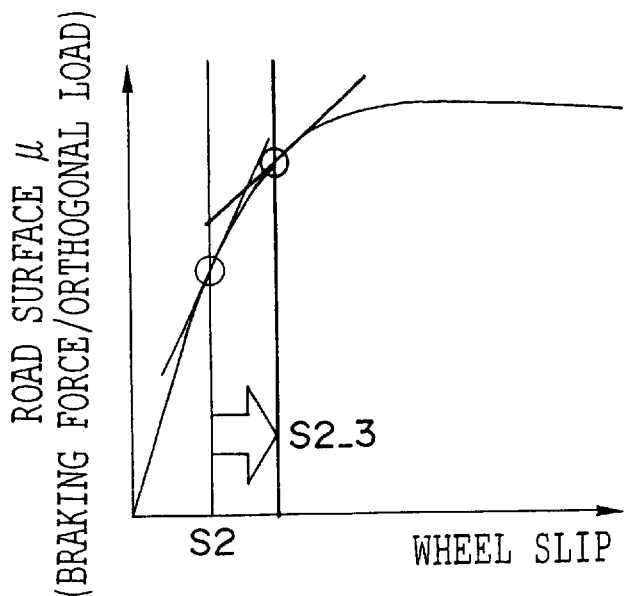
FIG. 13 is a graph showing a characteristic of a road surface μ with respect to wheel slip speed.

When the determination in step ST33 as to whether (K1≦K4) is negative, or when the processing of step ST34 has been completed, the correction circuit 63 judges whether the road surface $\mu$ slope K2 at the time of start of pressure increase the previous time is greater than or equal to a predetermined value K5 (K2≧K5) (step ST35). When (K2≧K5) is judged to be affirmative, the correction circuit 63 corrects the pressure increase start slip threshold value S2 so as to increase by S2_3 (step ST36). In this case, as shown in FIG. 13, the road surface $\mu$ slope at the time pressure increase starts at the pressure increase start slip threshold value S2 is high, and the wheel slip is restored to the necessary level or greater. Accordingly, by correcting the pressure increase start slip threshold value S2 to become larger, a decrease of the brake fluid pressure does not become unnecessarily large.

Figure 14:
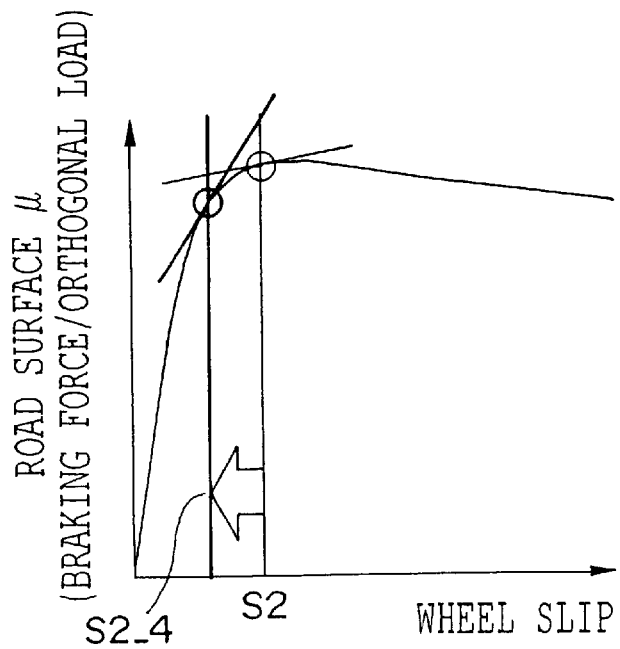
FIG. 14 is a graph showing a characteristic of a road surface μ with respect to wheel slip speed.

When the determination in step ST35 as to whether (K2≧K5) is negative, or when the processing of step ST36 has been completed, the correction circuit 63 judges whether the road surface $\mu$ slope K2 at the time of start of pressure increase the previous time is less than or equal to a predetermined value K6 (K2≦K6) (step ST36). When (K2≦K6) is judged to be affirmative, the correction circuit 63 corrects the pressure increase start slip threshold value S2 so as to decrease by S2_4 (step ST37). In this case, as shown in FIG. 14, the road surface $\mu$ slope at the time pressure increase starts at the pressure increase start slip threshold value S2 is low, and the wheel slip is not yet restored. Accordingly, by correcting the pressure increase start slip threshold value S2 to become smaller, the wheel slip can be reliably restored.

When the determination in step ST37 as to whether or not (K2≦K6) is negative, or when the processing of step ST37 is completed, the correction circuit 63 exits the subroutine, and proceeds onto step ST13 of the main routine shown in FIG. 8.

The values S1_3, S1_4, S2_3, S2_4 which are used at the time of correction are preferably values which correspond to K1 or K2. Further, when the pressure reduction start slip threshold value S1 or the pressure increase start slip threshold value S2 is corrected, it is preferable that the widths thereof are substantially constant. Accordingly, in a case in which the pressure reduction start slip threshold value S1 is corrected so as to become large with respect to the slip, it is preferable to also correct the pressure increase start slip threshold value S2 to become large with respect to the slip.

The correction circuit 63 may use a road surface $\mu$ slope K1' immediately before start of pressure reduction in place of the road surface $\mu$ slope K1 at the time of start of pressure reduction the previous time, and may use a road surface $\mu$ slope K2' immediately before start of pressure increase in place of the road surface $\mu$ slope K2 at the time of start of pressure increase the previous time. At this time, the correction circuit 63 implements the processings from ST41 through ST48 shown in FIG. 15. The specific contents of processing are similar to the processings from ST31 to ST38 in FIG. 10, and therefore, description thereof will be omitted. Here, K7, K8, K9, K10 are used in place of K3, K4, K5, K6, and S1_5, S1_6, S2_5, S2_6 are used in place of S1_3, S1_4, S2_3, S2_4.

Figure 10:
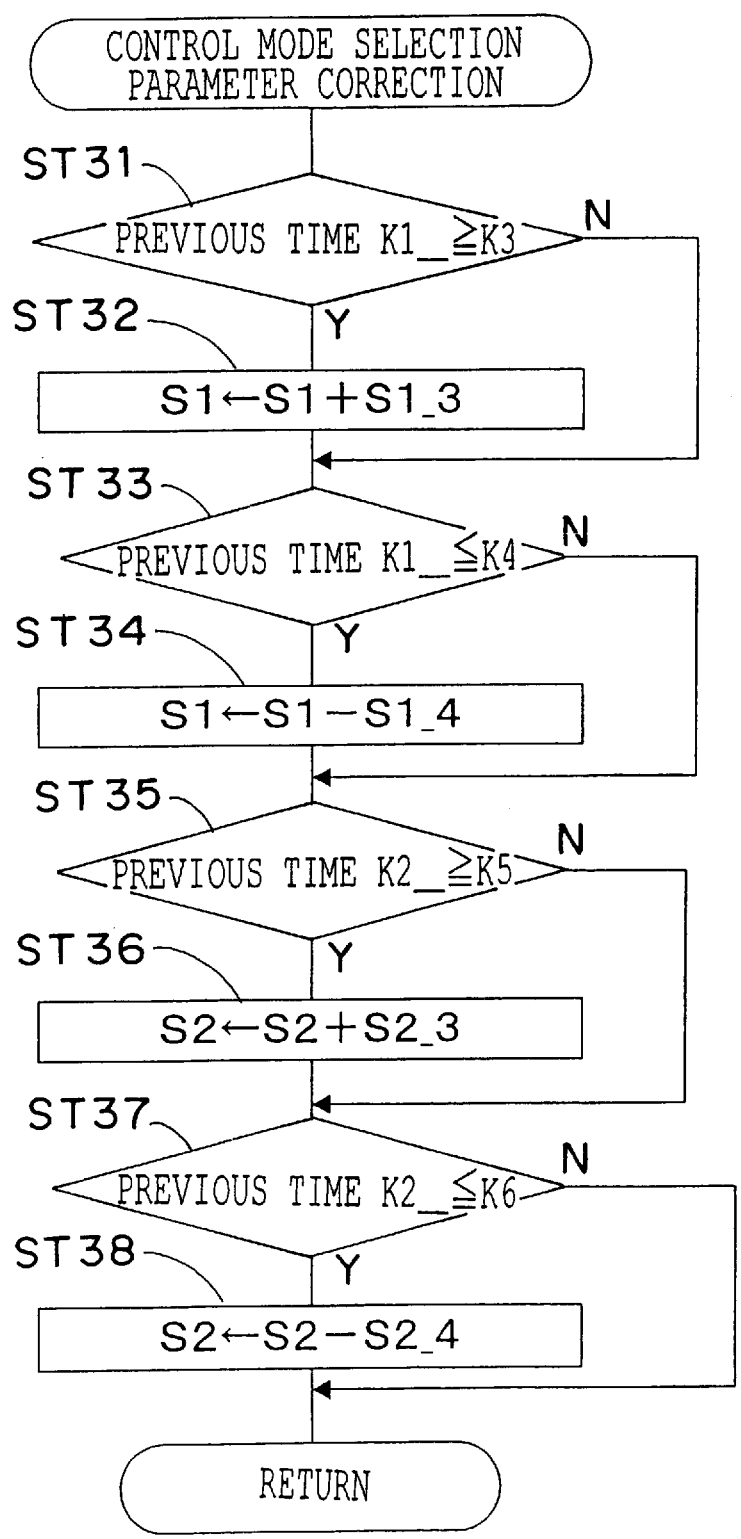
FIG. 10 is a flowchart explaining contents of operation of parameter correction for control mode selection.
Figure 15:
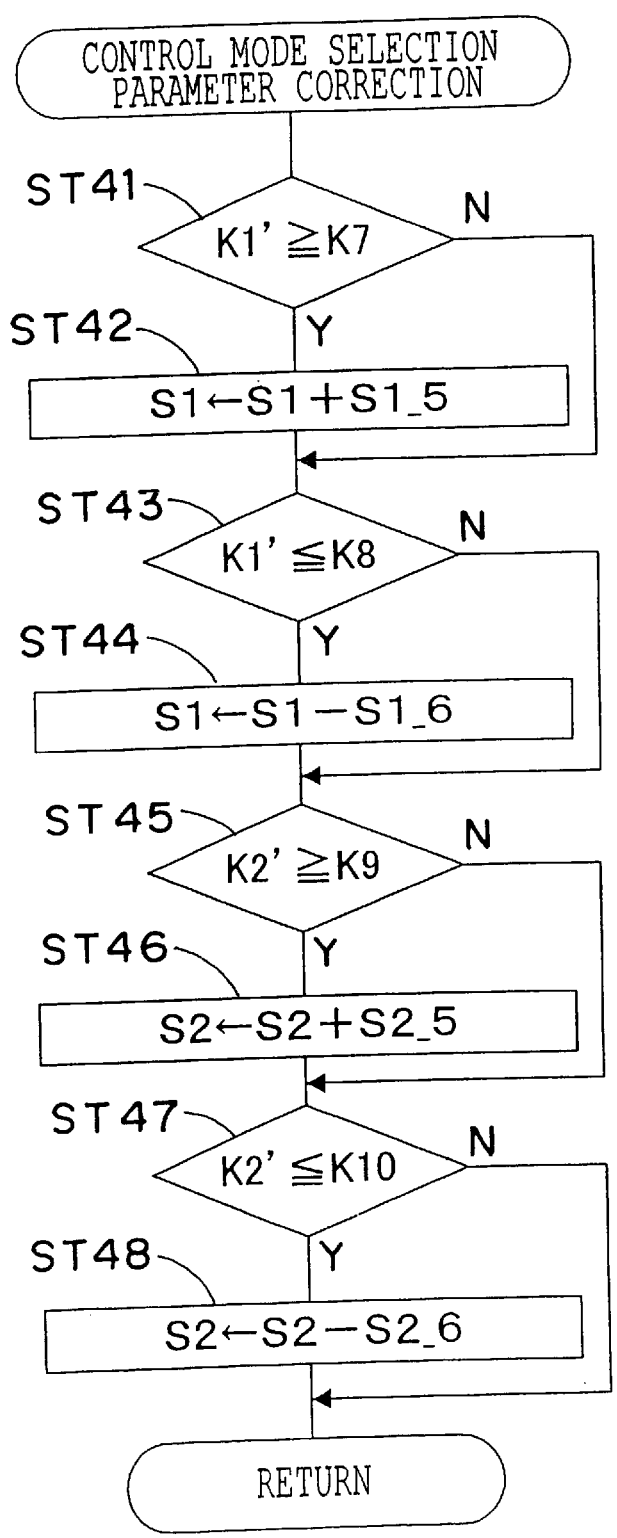
FIG. 15 is a flowchart explaining contents of other operations of parameter correction for control mode selection.

Due to the correction circuit 63 completing the processings from step ST31 to step ST38 shown in FIG. 10 as described above, or completing the processings from step ST41 to step ST48 shown in FIG. 15, step ST12 of the main routine shown in FIG. 8 is completed.

When correction of the parameters is completed, the correction circuit 63 carries out control mode selection processing (step ST13). Here, the correction circuit 63 executes the processings from step ST51 to step ST58 shown in FIG. 16.

The correction circuit 63 judges whether the actual slip ratio of the wheel which is the object of control is greater than the threshold value S2 (S>S2) (step ST51). When the determination as to whether (S>S2) is affirmative, a determination is made as to whether the actual slip ratio S is greater than a threshold value S1 (S>S1) (step ST52). When the judgement as to whether (S>S2) is negative, the routine proceeds to step ST58. When the judgement as to whether (S>S1) in step ST52 is affirmative, the correction circuit judges whether the wheel acceleration DVw is greater than a threshold value G1 (DVw>G1) (step ST53). When the judgement in step ST52 as to whether (S>S1) is negative, the routine moves on to step ST55.

When the judgement in step ST53 as to whether (DVw>G1) is affirmative, the correction circuit 63 judges whether the wheel acceleration DVw is greater than a threshold value G2 (DVw>G2) (step ST54). When the determination in step ST53 as to whether (DVw>G1) is negative, the routine moves on to step ST56. When the judgement of the correction circuit 63 in step ST54 as to whether (DVw>G2) is affirmative, the routine proceeds to step ST58. When the judgement of the correction circuit 63 in step ST54 as to whether (DVw>G2) is negative, the routine proceeds to step ST57.

On the other hand, when the judgement in step ST52 as to whether (S>S1) is negative, the correction circuit 63 judges whether (DVw>G1) (step ST55). If the judgement as to whether (DVw>G1) is affirmative, the routine moves on to step ST58, and when this judgement is negative, the routine proceeds to step ST56.

Figure 17:
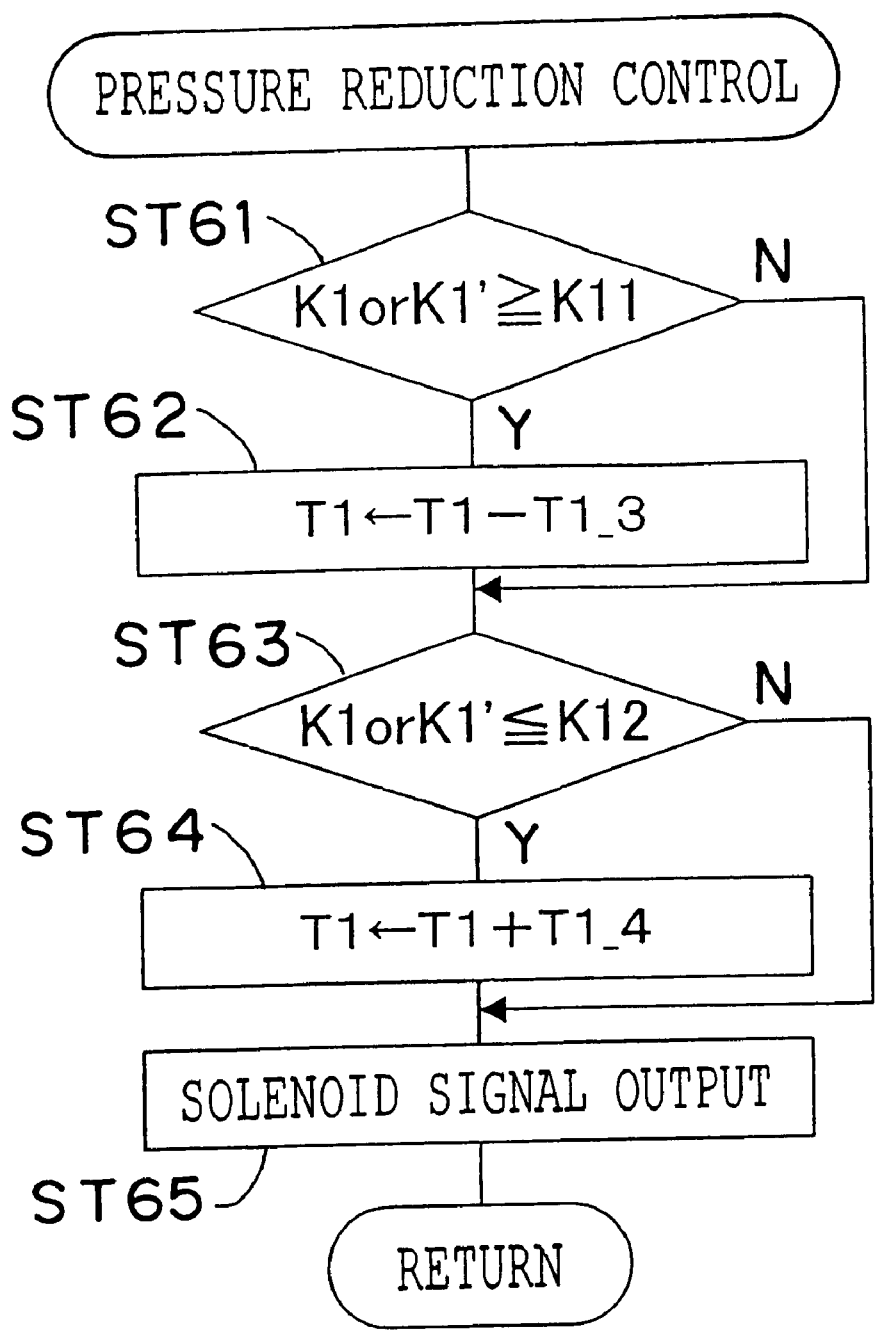
FIG. 17 is a flowchart explaining contents of operation of a pressure reduction control mode.

When the judgment in step ST53 or step ST55 as to whether DVw>G1 is negative, the correction circuit 63 selects the pressure reduction mode, and pressure reduction control is instructed to the ABS control circuit 64 (step ST56). At this time, specifically, the control circuit 63 carries out the processings from step ST61 to step ST65 of the subroutine shown in FIG. 17.

The correction circuit 63 judges whether the road surface $\mu$ slope K1 at the time of start of pressure reduction the previous time or the road surface $\mu$ slope K1' immediately before start of pressure reduction is greater than or equal to a predetermined value K11 (K1 or K1'≧K11) (step ST61). When the determination as to whether (K1 or K1'≧K11) is affirmative, the correction circuit 63 corrects the pressure reduction time T1 to become smaller by a predetermined value T1_3 (step ST62). When the value of K1 or K1' is large, there is leeway in the wheel grip, and because the wheel slip can be restored by a slight reduction in pressure, the pressure reduction time is set to be short.

When the determination in step ST61 as to whether (K1 or K1'≧K11) is negative, or when the processing of step ST62 is completed, the correction circuit 63 judges whether or not K1 or K11' is less than or equal to a predetermined value K12 (K1 or K1'≦K12) (step ST63). When the determination as to whether (K1 or K1'≦K12) is affirmative, the correction circuit corrects the pressure reduction time T1 to become greater by a predetermined value T1_4 (step ST64). When the value of K1 or K1' is small, there is no leeway in the wheel grip. By making the pressure reduction time long, the wheel grip is reliably restored.

When the determination in step ST63 as to whether (K1 or K1'≦K12) is negative, or when the processing of step ST64 is completed, the corrected pressure reduction time T1 is supplied to the ABS control circuit 64. The ABS control circuit 64 outputs a signal of the corrected pressure reduction time T1 to the respective solenoids SOL of the ABS fluid pressure circuit 40 (step ST65). Due to the correction circuit carrying out the processings from step ST61 to step ST65, the processing of step ST56 shown in FIG. 16 is completed.

Figure 16:
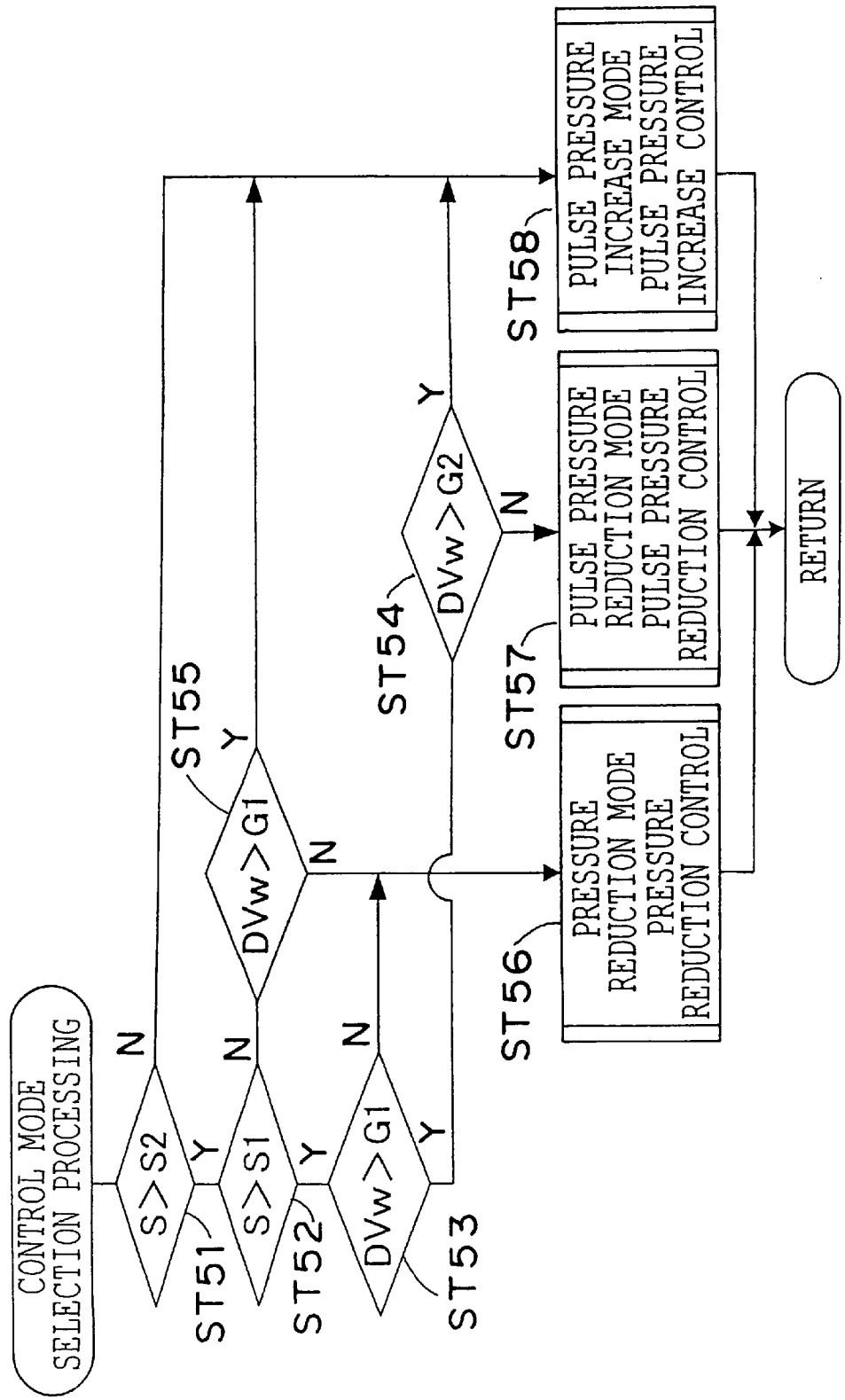
FIG. 16 is a flowchart explaining contents of operation of control mode selection processing.

When the determination as to whether DVw>G2 in step ST54 in FIG. 16 is negative, the correction circuit 63 selects pulse pressure reduction mode, and instructs pulse pressure reduction control to the ABS control circuit 64 (step ST57). At this time, the correction circuit 63 carries out the processings from step ST71 to step ST75 shown in FIG. 18.

Figure 19:
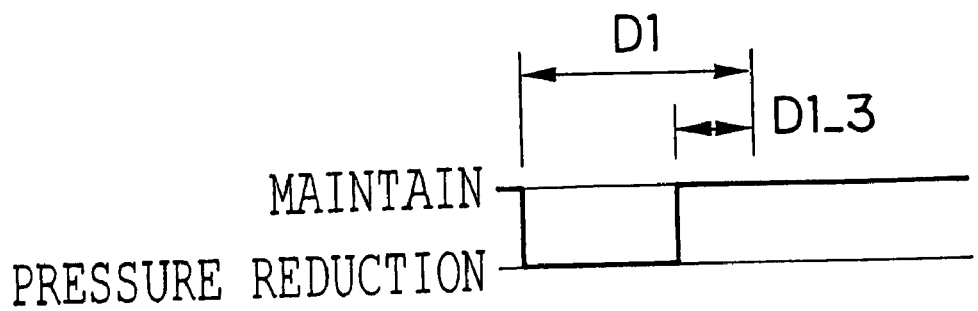
FIG. 19 is a diagram explaining that a pressure reduction duty ratio D1 is made smaller.

The correction circuit 63 judges whether the road surface $\mu$ slope K1 at the time of start of pressure reduction the previous time or the road surface $\mu$ slope K1' immediately before start of pressure reduction is greater than or equal to a predetermined value K13 (K1 or K1'≧K13) (step ST71). When the determination as to whether (K1 or K1'≧K13) is affirmative, the correction circuit 63 corrects the pressure reduction duty ratio D1 to become smaller by a predetermined value D1_3 (step ST72). When the value of K1 or K1' is large, there is leeway in the wheel grip. Because the wheel slip can be restored by a slight reduction in pressure, as shown in FIG. 19, the pressure reduction duty ratio D1 is made small and the pressure reduction amount is made small, and the pressure reduction amount is made small.

Figure 20:
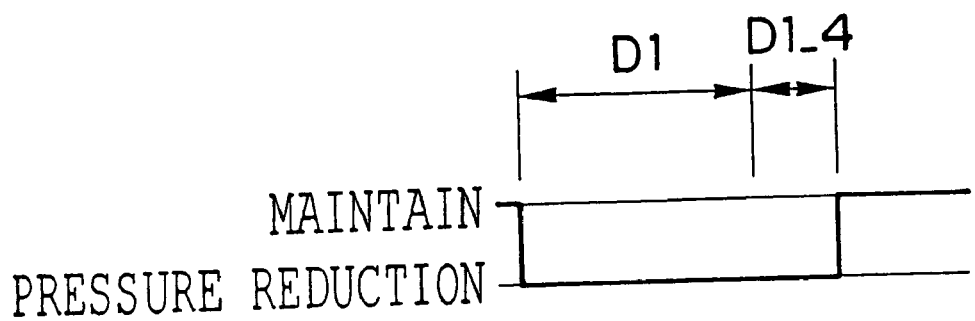
FIG. 20 is a diagram explaining that the pressure reduction duty ratio D1 is made larger.

When the determination in step ST71 as to whether (K1 or K1'≧K13) is negative, or when the processing of step ST72 is completed, the correction circuit 63 judges whether or not K1 or K1' is less than or equal to a predetermined value K14 (K1 or K1'≦K14) (step ST73). When the determination as to whether (K1 or K1'≦K14) is affirmative, the correction circuit 63 corrects the pressure reduction duty ratio D1 to become greater by a predetermined value D1_4 (step ST74). When the value of K1 or K1' is small, there is no leeway in the wheel grip. As shown in FIG. 20, by making the pressure reduction duty ratio D1 large, the amount of pressure reduction is made large, and the wheel grip can be reliably restored.

When the determination in step ST73 as to whether (K1 or K1'≦K14) is negative, or when the processing of step ST74 is completed, the corrected pressure reduction duty ratio D1 is supplied to the ABS control circuit 64. The ABS control circuit 64 outputs a signal of the corrected pressure reduction duty ratio D1 to the respective solenoids SOL of the ABS fluid pressure circuit 40 (step ST75). Due to the correction circuit 63 carrying out the processings from step ST71 to step ST75, the processing of step ST57 shown in FIG. 16 is completed.

Figure 21:
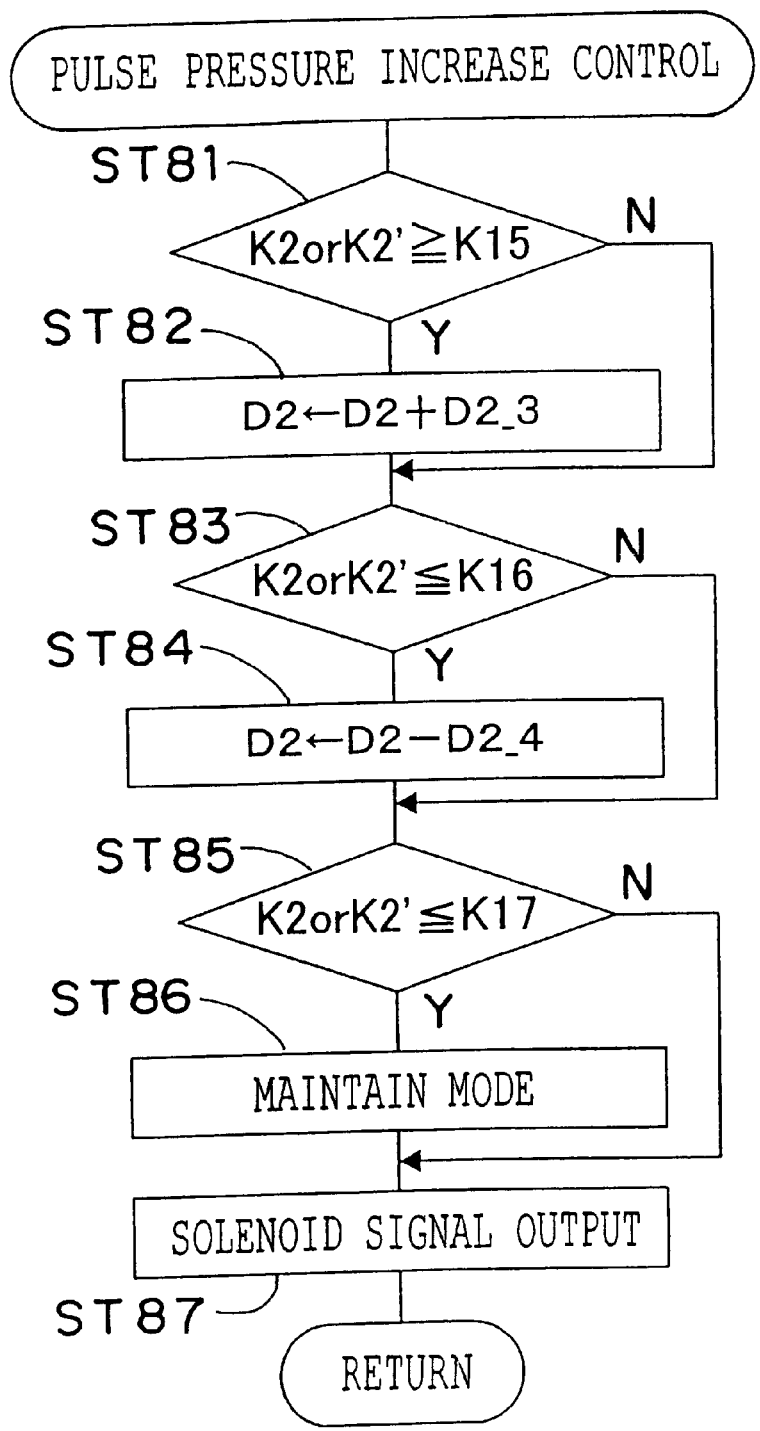
FIG. 21 is a flowchart explaining contents of operation of a pulse pressure increase control mode.

When the determination as to whether (S>S2) in step ST51 in FIG. 16 is negative, or when the determination as to whether (DVw>G2) in step ST54 is affirmative, or when the determination as to whether (DVw>G1) in step ST55 is affirmative, the correction circuit 63 selects pulse pressure increase mode, and instructs pulse pressure increase control to the ABS control circuit 64 (step ST58). At this time, the correction circuit 63 carries out the processings from step ST81 to step ST87 of the subroutine shown in FIG. 21. Note that the relation of the predetermined values K15, K16, K17 used hereinafter is such that K15>K16>K17.

Figure 22:
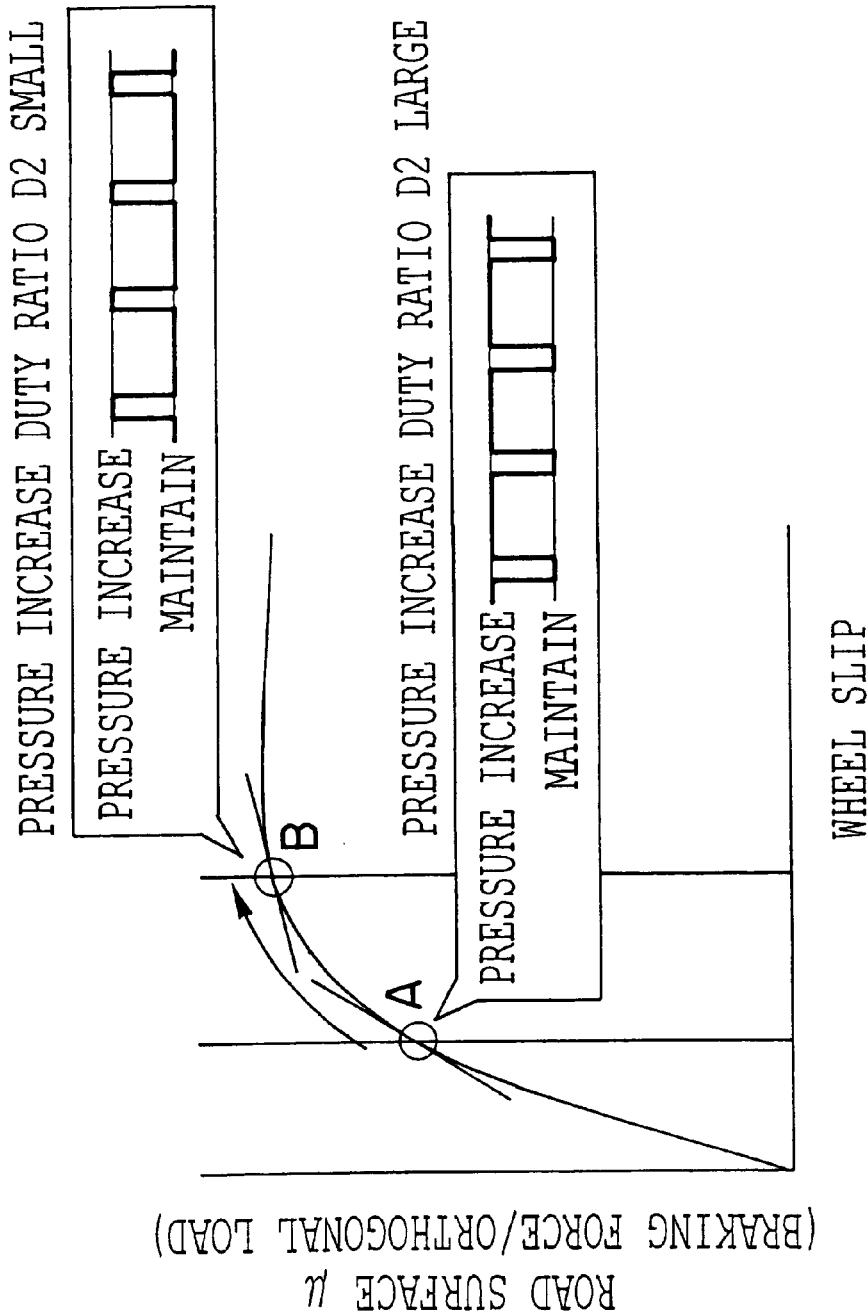
FIG. 22 is a graph showing the relationship between a characteristic of road surface μ with respect to wheel slip speed, and an pressure increase duty ratio D2.

The correction circuit 63 judges whether the road surface $\mu$ slope K2 at the time of start of pressure reduction the previous time or the road surface $\mu$ slope K2' immediately before start of pressure reduction is greater than or equal to a predetermined value K15 (K2 or K2'≧K15) (step ST81). When the determination as to whether (K2 or K2'≧K15) is affirmative, the correction circuit 63 corrects the pressure increase duty ratio D2 to become larger by a predetermined value D2_3 (step ST82). When the value of K2 or K2' is large, for example, at the point A shown in FIG. 22, there is leeway in the wheel grip. Accordingly, in order to utilize this grip, as shown in FIG. 22, by making the pressure increase duty ratio D2 greater, the pressure increase amount increases, and the $\mu$ peak (point B) of the $\mu$-S characteristic is reached quickly.

When the determination in step ST81 as to whether (K2 or K2'≧K15) is negative, or when the processing of step ST82 is completed, the correction circuit 63 judges whether or not K2 or K2' is less than or equal to a predetermined value K16 (K2 or K2'≧K16) (step ST83). When the determination as to whether (K2 or K2'≦K16) is affirmative, the correction circuit 63 corrects the pressure increase duty ratio D2 to become smaller by a predetermined value D2_4 (step ST84). When the value of K2 or K2' is small, the wheel grip is approaching the limit (point B) Accordingly, by making the pressure increase duty ratio D2 small and the pressure increase amount slight, a state before the vicinity of the $\mu$ peak of the $\mu$-S characteristic is maintained, and the wheel grip is utilized effectively.

When the determination in step ST83 as to whether (K2 or K2'≦K16) is negative, or when the processing of step ST84 is completed, the correction circuit 63 judges whether K2 or K2' is less than or equal to a predetermined value K17 (K2 or K2'≦K17) (step ST85). When the determination as to whether (K2 or K2'≦K17) is affirmative, a maintain mode is set by which the present state of the fluid pressure of the ABS fluid pressure circuit 40 is maintained as is (step ST86). In this case, because the $\mu$ peak has been reached, this state is maintained and the grip can be utilized to the maximum extent.

When the determination in step ST85 as to whether (K2 or K2'≦K17) is negative or when the processing of step ST86 is completed, the correction circuit 63 supplies the corrected pressure increase duty ratio D2 to the ABS control circuit 64. The ABS control circuit 64 outputs a signal of the corrected pressure increase duty ratio D2 to the respective solenoids SOL of the ABS fluid pressure circuit 40 (step ST87). Due to the correction circuit 63 carrying out the processings from step ST81 to step ST87, the processing of step ST58 shown in FIG. 16 is completed.

When the processing of any of steps ST56 through ST58 shown in FIG. 16 is completed, the processing of step ST13 of the main routine shown in FIG. 8 is completed, and the routine returns to step ST2.

As described above, the ABS control device 1 estimates a road surface $\mu$ slope at the time of ABS control, corrects threshold values of ABS control parameters, and always sets the state of the tire to the $\mu$ peak of the $\mu$-S characteristic. In this way, the grip of the tire can be utilized to the maximum extent. At this time, the consumed about of brake fluid during ABS control can be reduced. Therefore, the pump amount is decreased, and a system without a pump can be realized.

Further, the ABS control device 1 carries out ABS control by estimating the road surface $\mu$ slope of the tire which is actually used. Thus, the responsiveness improves as compared with a case in which ABS control is carried out in accordance with a general tire characteristic, and the state of the vehicle can be stabilized.

(Second Embodiment)

Next, a second embodiment of the present invention will be described. Circuits, processings and the like which are the same as those of the first embodiment are designated by the same reference numerals, and detailed description thereof is omitted.

Figure 23:
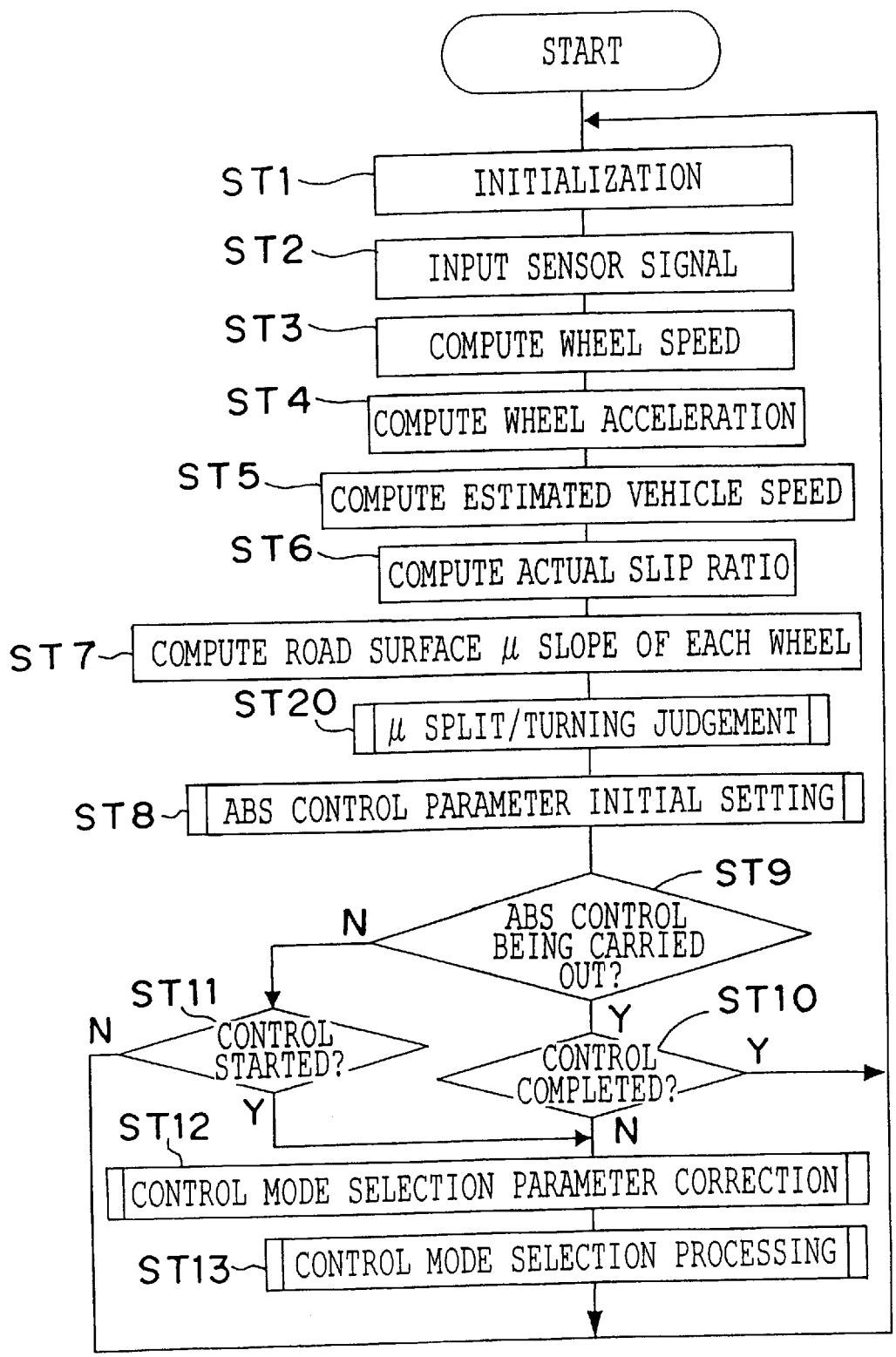
FIG. 23 is a flowchart of another main routine explaining contents of operation of the ABS control device.
Figure 24:
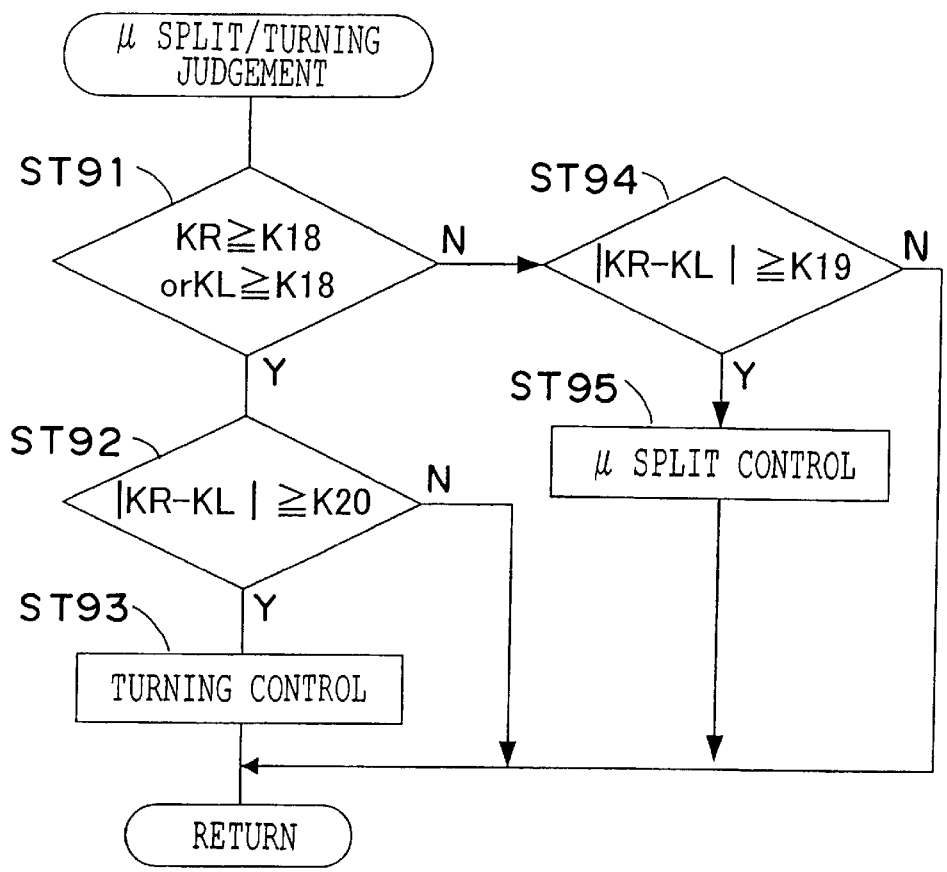
FIG. 24 is a flowchart explaining contents of operation for carrying out μ split/turning judgement.

In the present second embodiment, as shown in FIG. 23, the ABS control device 1 carries out $\mu$ split/turning judgement processing (step ST20) between step ST7 and step ST8. Here, specifically, the subroutine processings from step ST91 through step ST95 shown in FIG. 24 are carried out. Note that these processings may be carried out while ABS control is carried out, or while ABS control is not being carried out.

The correction circuit 63 of the ABS control device 1 judges whether a road surface $\mu$ slope KR of a right wheel, which is estimated by the road surface $\mu$ slope estimating circuit 62, is greater than or equal to a predetermined value K18 (KR≧K18), or whether a road surface $\mu$ slope KL of a left wheel is greater than or equal to the predetermined value K18 (KL≧K18) (step ST91). In the case of $\mu$ split, by lowering the low $\mu$ side road surface $\mu$ slope, a difference in the values of the road surface $\mu$ slopes of the left and right wheels arises. Thus, in step ST91, in order to determine whether there is a turning state or $\mu$ split, it is preferable for the predetermined value K18 to be a value which is slightly larger than the road surface $\mu$ slope at the time the vehicle is traveling in a straight line. When the judgement as to whether or not (KR≧K18 or KL≧K18) is affirmative, the routine proceeds to step ST92, and when this judgement is negative, the routine moves on to step ST94.

Figure 25:
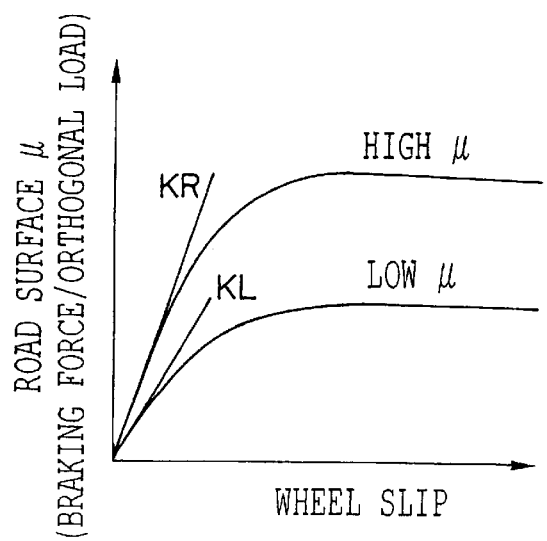
FIG. 25 is a graph showing a characteristic of a road surface μ with respect to wheel slip speed in the cases of high μ and low μ.
Figure 26:
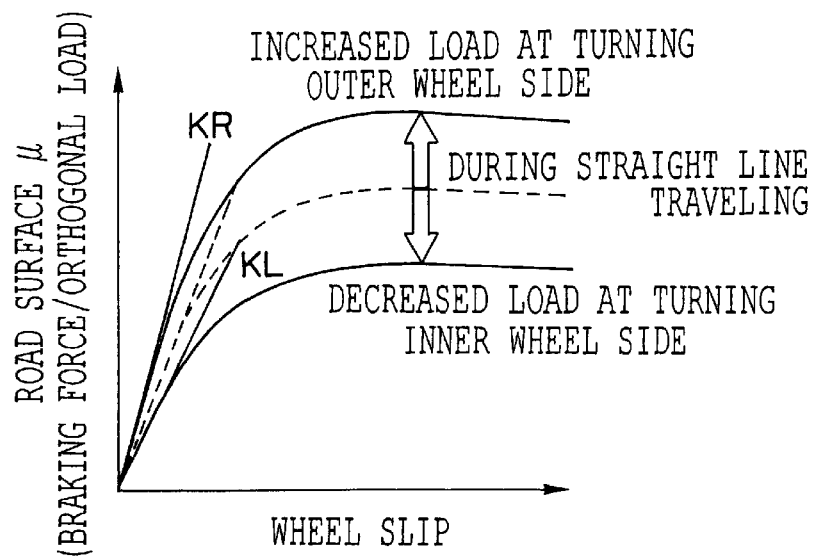
FIG. 26 is a graph showing a characteristic of a road surface μ with respect to wheel slip speed in the cases of high μ and low μ.

The correction circuit 63 judges whether the absolute value of the difference between KR and KL is greater than or equal to a predetermined value K20 (|KR−KL|≧K20) (step ST92). When the judgement is affirmative, turning control is carried out (step ST93). When the judgement is negative, the correction circuit 63 exits the subroutine. Here, for example, when the vehicle turns to the left, the load moves, and as illustrated in FIG. 25, the road surface $\mu$ slope KR of the turning outer wheel (the right wheel) increases, and the road surface $\mu$ slope KL of the turning inner wheel (the left wheel) decreases. As shown in FIG. 26, as compared with the road surface $\mu$ slope at the time of traveling in a straight line, the road surface $\mu$ slope of the turning outer wheel increases, and the road surface $\mu$ slope of the turning inner wheel decreases.

Accordingly, at a time of turning, i.e., in a case in which a slip angle is applied to a wheel, in order to make the wheel slip which generates the $\mu$ peak large, the correction circuit 63 sets the pressure reduction start slip threshold value S1 and the pressure increase start slip threshold value S2 to be large. In this way, correction is carried out such the slip during ABS control becomes large and deceleration can be obtained.

On the other hand, when the judgement in step ST91 as to whether or not (KR≧K18 or KL≧K18) is negative, the correction circuit 63 judges whether the absolute value of the difference between KR and KL is greater than or equal to a predetermined value K19 (|KR−KL|≧K19) (step ST94). When the judgement of (|KR−KL|≧K19) is affirmative, A split control is carried out (step ST95) When this judgement is negative, the control circuit 63 exits the subroutine.

Figure 27:
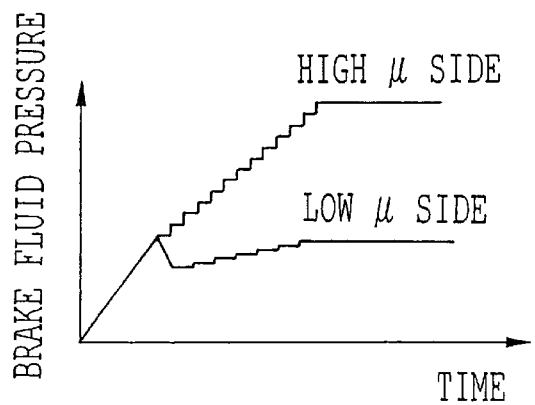
FIG. 27 is a graph explaining correction of an pressure increase time slope in a case in which brake fluid pressure is increased.

In $\mu$ split control, the correction circuit 63 carries out correction such that the pressure reduction start slip threshold value S1 and the pressure increase start slip threshold value S2 are made small, such that the low $\mu$ side wheel slip becomes large and the control stability of the vehicle does not deteriorate. Further, the time slope of pressure increase at the high $\mu$ road side is corrected as shown in FIG. 27 such that stability of the vehicle does not deteriorate due to a yaw moment which is caused by a difference in the left and right braking forces, i.e., such that so-called yaw control is carried out.

The difference in the road surface $\mu$ slopes of the right wheel and the left wheel expresses the difference in braking forces which can be generated on that road surface. Accordingly, the pressure increase time slope at the high $\mu$ road side is determined on the basis of the difference in the road surface $\mu$ slopes. Namely, in a case in which the difference between the road surface $\mu$ slopes of the left and right wheels is large, the pressure increase time constant is made small. In a case in which this difference is small, the pressure increase time slope is set to be large.

As described above, in the ABS control device 1 relating to the present second embodiment, when $\mu$ split or a turning state is detected, the pressure reduction start slip threshold value S1 and the pressure increase start slip threshold value S2 are corrected such that the difference between the road surface $\mu$ slopes of the left and right wheels becomes small. The stability of the running state of the vehicle can thereby be improved.

(Third Embodiment)

Next, a third embodiment of the present invention will be described. Circuits and processings which are the same as those of the previously-described embodiments are denoted by the same reference numerals, and detailed description of these same circuits and processings will be omitted.

Figure 28:
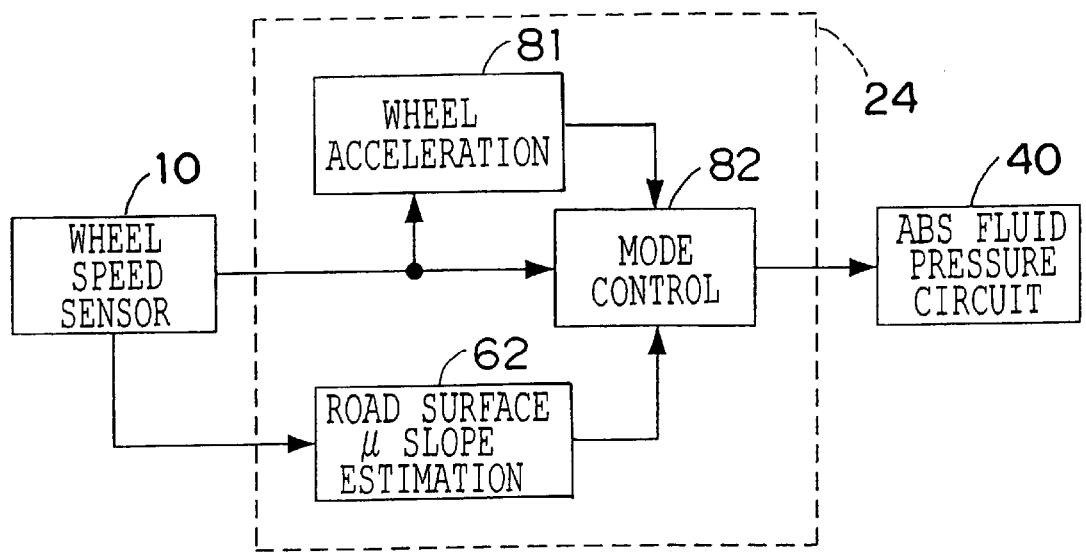
FIG. 28 is a block diagram showing the functional structure of an ABS control device.

The ABS control device 1 relating to the present third embodiment has the structure illustrated functionally in FIG. 28. Namely, the ABS control device 1 includes wheel speed sensors 10 which detect vehicle wheel speeds; a wheel acceleration detecting circuit 81 which detects the wheel acceleration of each wheel on the basis of the wheel speeds from the wheel speed sensors 10; a road surface $\mu$ slope estimating circuit 62 which estimates a road surface $\mu$ slope on the basis of the wheel speeds; a mode control circuit 82 which carries out selection control of the operation mode on the basis of the wheel accelerations or the road surface $\mu$ slopes or the like; and an ABS fluid pressure circuit 40 which brakes each wheel in accordance with the control of the brake fluid pressure effected by the mode control circuit 82. Note that the wheel acceleration detecting circuit 81, the road surface $\mu$ slope estimating circuit 62, and the mode control circuit 82 correspond to the CPU 24.

The wheel speed sensors 10 detect the wheel speeds of the respective wheels, and supply these detected wheel speeds to the wheel acceleration detecting circuit 81, the road surface $\mu$ slope estimating circuit 62, and the mode control circuit 82. The wheel acceleration detecting circuit 81 detects the wheel acceleration of each wheel on the basis of the wheel speed, and supplies the detected wheel accelerations to the mode control circuit 82.

The road surface $\mu$ slope estimating circuit 62 estimates the road surface $\mu$ slopes of the respective wheels on the basis of the wheel speeds of the respective wheels detected by the wheel speed sensors 10, and supplies the road surface $\mu$ slopes to the mode control circuit 82. Note that the road surface $\mu$ slope estimating circuit is structured in the same way as in the first embodiment.

The mode control circuit 82 selects an operation mode which is one of a "pressure reduction mode", a "pulse pressure reduction mode", and a "pulse pressure increase mode" on the basis of the wheel accelerations and the road surface $\mu$ slopes. The mode control circuit 82 carries out, with respect to the ABS fluid pressure circuit 40, fluid pressure control of the brake fluid corresponding to the operation mode, such that the braking torque is thereby decreased or increased.

In the ABS control device 1 having such a structure, when ABS control is carried out, specifically, the processings from step ST101 through ST113 in FIG. 29 are carried out.

As shown in FIG. 29, at each circuit, first, initialization is carried out (step ST101). Then, when signals are inputted to the respective sensors (step ST102), the wheel speed sensors 10 compute the wheel speeds (step ST103). The wheel acceleration detecting circuit 81 computes the wheel accelerations DVw on the basis of these wheel speeds (step ST104). Further, the estimated vehicle speed is computed (step ST105), and the actual slip ratio is also computed (step ST106).

On the basis of the wheel speeds of the respective wheels from the wheel speed sensors 10, the road surface μ slope estimating circuit 62 estimates the road surface μ slope of each wheel (step ST107), and supplies these road surface μ slopes to the mode control circuit 82.

After the processing of step ST107, the mode control circuit 82 carries out initial setting of the ABS control parameters (step ST108). Then, the mode control circuit 82 judges whether or not ABS control is currently being carried out (step ST109). When ABS control is currently being carried out, it is judged whether ABS control has been completed (step ST110). When ABS control has been completed, the routine returns to step ST102. If ABS control is not completed, the routine proceeds to step ST112.

Further, if the mode control circuit 82 determines in step ST109 that ABS control is currently not being carried out, the mode control circuit 82 judges whether ABS control has been started (step ST111). When the mode control circuit 82 judges that ABS control has been started, the routine proceeds to step ST112. If ABS control has not been started, the routine returns to step ST102.

When ABS control has been started or when ABS control is currently being carried out, the mode control circuit 82 carries out control mode selection processing (step ST112). Here, specifically, the mode control circuit 82 executes the processings from step ST121 through step ST128 in FIG. 30.

The mode control circuit 82 judges whether the road surface μ slope K of the wheel which is the object of control is less than a threshold value K31 (K<K31) (step ST121). When the judgement as to whether (K<K31) is affirmative, the mode control circuit 82 judges whether the road surface μ slope K is less than a threshold value K32 (K<K32) (step ST122). If the determination as to whether (K<K31) in step ST121 is negative, the routine moves on to step ST128.

When the judgement as to whether (K<K32) in step ST122 is affirmative, the mode control circuit 82 judges whether a vehicle acceleration DVw is greater than a threshold value G31 (DVw>G31) (step ST123). If the determination in step ST122 as to whether (K<K2) is negative, the routine moves on to step ST125.

When the judgement in step ST123 as to whether (DVw>G31) is affirmative, the mode control circuit 82 judges whether the wheel acceleration DVw is greater than a threshold value G32 (DVw>G32) (step ST124). When the determination in step ST123 as to whether (DVw>G31) is negative, the routine moves on to step ST126. When the judgement of the mode control circuit 82 in step ST124 as to whether (DVw>G32) is affirmative, the routine proceeds to step ST128, and when the judgement as to whether (DVw>G32) is negative, the routine proceeds to step ST127.

On the other hand, when the judgement in step ST122 as to whether (K<K32) is negative, the mode control circuit 82 judges whether (DVw>G31) (step ST125). If the judgement as to whether (DVw>G31) is affirmative, the routine moves on to step ST128, and when this judgement is negative, the routine proceeds to step ST126.

When DVw>G31 is judged to be negative in step ST123 or step ST125, the mode control circuit 82 selects the pressure reduction mode, and carries out pressure reduction control of the control fluid pressure for the wheel which is the object of control of the ABS fluid pressure circuit 40 (step ST126).

When the judgement in step ST124 as to whether DVw>G23 is negative, the mode control circuit 82 selects the pulse pressure reduction mode, and carries out pulse pressure reduction control of the brake fluid pressure for the wheel which is the object of control of the ABS fluid pressure circuit 40 (step ST127).

Moreover, when (K<K31)in step ST121 is negative or when (DVw>G32) in step ST124 is affirmative or when (DVw>G31) in step ST125 is affirmative, the mode control circuit 82 selects pulse pressure increase mode, and carries out pulse pressure increase control of the brake fluid pressure for the wheel which is the object of control of the ABS fluid pressure circuit 40 (step ST128).

When the processing of any of steps ST126 through ST128 is completed, the processing of step ST113 of the main routine shown in FIG. 29 is completed, and the routine returns to step ST102.

By carrying out the processings from step ST121 through step ST128, the relationship of the brake fluid pressure corresponding to the road surface μ slope and the wheel acceleration is as per the selection map shown in FIG. 31. In other words, the mode control circuit 82 always selects the optimal operation mode by judging which position in the selection map of FIG. 31 the relationship between the successively detected road surface μ slope K and wheel acceleration DVw, is at. Due to the mode control circuit 82 controlling the brake fluid pressure in accordance with the operation mode, the braking torque can be controlled.

For example, in accordance with the selection map shown in FIG. 31, in a case in which the wheel acceleration DVw is from 0 to the threshold value G31, when the road surface μ slope K is from 0 to the threshold value K31, the mode control circuit 82 reduces the brake fluid pressure, and when the road surface μ slope is greater than or equal to the threshold value K31, the mode control circuit 82 pulse increases the brake fluid pressure. Further, in a case in which the vehicle acceleration DVw is from the threshold value G31 to the threshold value G32, when the road surface μ slope K is from 0 to the threshold value K32, the mode control circuit 82 pulse reduces the brake fluid pressure, and when the road surface μ slope is greater than or equal to the threshold value K32, the mode control circuit 82 pulse increases the brake fluid pressure. Moreover, in a case in which the vehicle acceleration DVw is greater than the threshold value G32, the mode control circuit 82 pulse increases the brake fluid pressure regardless of the value of the road surface μ slope K.

As described above, the ABS control device 1 selects the operation mode on the basis of the road surface μ slope and the wheel acceleration, and increases or reduces the brake fluid pressure in accordance with the operation mode, and controls the braking torque amount. In this way, optimal braking corresponding to the state of the road surface and the wheel can be carried out. In particular, on the basis of the road surface μ slope, it can be judged whether the tire is tending toward locking. Thus, it suffices to not provide a G sensor or a G switch, and the system can be simplified.

Further, the ABS control device 1 carries out ABS control by estimating the road surface μ slope of the tire which is actually used. Thus, the responsiveness is improved over a case in which ABS control is carried out in accordance with a characteristic of a general tire, and the vehicle state can be stabilized.

Further, the ABS control device 1 sets the upper limit value and the lower limit value of the of the wheel slip speed as a guard, and selects the operation mode on the basis of these set values. Thus, even in a case in which the road surface μ slope cannot be estimated accurately, braking can be carried out appropriately, and thus, stability can be improved.

Note that the mode control circuit 82 is not limited to the above-described selection map, and the control mode can be selected in accordance with selection maps such as the following.

At the time when the vehicle is travelling on a low μ road and control stability is required more than deceleration at the time of ABS control, the mode control circuit 82 may select an operation mode in accordance with, for example, the selection map shown in FIG. 32.

Further, as shown in FIG. 33, the mode control circuit 82 may carry out control of the brake fluid pressure in accordance with the selection table which sets a lower limit value S1 and an upper limit value S2 of the wheel slip speed. At this time, for example, even if there is an error in the estimation of the road surface μ slope K31 or K32, guarding is provided at the wheel slip speeds S31 and S32, and thus, fail safe is ensured. Note that it is not absolutely necessary to set both the vehicle slip speeds S31, S32, and it suffices to set either one of these values.

Moreover, in contrast to the selection table shown in FIG. 33, the mode control circuit 82 may control the brake fluid pressure in accordance with a selection table guarded by the upper limit value K31 and the lower limit value K32 of the road surface μ slope, as shown in FIG. 34. This case is suitable for a vehicle in which a trend toward simultaneous locking of the four wheels occurs easily, such as in the case of a four wheel drive vehicle. Namely, by using road surface μ slopes which are control parameters which are different than the wheel slip speed, the trend toward simultaneous locking of the four wheels can be prevented. A G sensor or a G switch, which is provided in conventional systems to prevent simultaneous locking of the four wheels, can be omitted, and the system can be simplified.

The mode control circuit 82 can carry out control of the brake fluid pressure by setting the pressure increase start to S31 and setting the pressure reduction start to K32, in accordance with the selection table shown in FIG. 35. Further, the mode control circuit 82 may control the brake fluid pressure by setting the pressure increase start to K31 and setting the pressure reduction start to S32, in accordance with the selection table shown in FIG. 36. Note that, although the selection maps shown in FIGS. 33 through 36 use the wheel slip speeds, the wheel slip ratios may be used instead.

(Fourth Embodiment)

A fourth embodiment of the present invention will be described hereinafter.

The structure of an ABS control device relating to the present embodiment is shown in FIG. 37. As shown in FIG. 37, an ABS control device 100 relating to the present embodiment includes a wheel speed detecting sensor 111 which detects a wheel speed each time a predetermined sampling time τ elapses; a braking force slope estimating means 112 which estimates the braking force slope of each wheel from time series data of the wheel speeds detected by the wheel speed detecting sensor 111; an ABS control means 114 which computes an operation signal for each wheel for ABS control on the basis of the braking force slopes estimated by the braking force slope estimating means 112; an ABS valve 116 for carrying out ABS control by applying brake pressure to each wheel on the basis of the operation signal computed by the ABS control means 114; a target braking force slope computing means 118 for computing a target braking force slope; and a steering angle sensor 120.

The wheel speed detecting sensor 111 can be realized by, for example, the structure shown in FIG. 38A. As shown in FIG. 38A, the wheel speed detecting sensor 111 is formed by a signal rotor 130 in which a predetermined number of teeth are formed at uniform intervals and which is mounted so as to rotate together with the wheel; a pick up coil 132 which is fixed to the vehicle body; a permanent magnet 134 which is disposed such that magnetic flux passes through the interior of the pick up coil 132; and a frequency detector 136 which is connected to the pick up coil 132 and which detects and outputs a frequency of an alternating current voltage generated at the pick up coil 132 each time the sampling time τ elapses.

When the signal rotor 130 rotates together with the wheel, the air gap between the signal rotor 130 and the pick up coil 132 changes in cycles which correspond to the rotational speed. As a result, the magnetic flux of the permanent magnet 134 which passes through the pick up coil 132 changes, and alternating current voltage is generated at the pick up coil 132. Here, the changes over time in the alternating current voltage generated at the pick up coil 132 are shown in FIG. 38B.

As shown in FIG. 38B, the frequency of the alternating current voltage generated at the pick up coil 132 is low when the rotational speed of the signal rotor 130 is low, and the frequency of the alternating current voltage is high when the rotational speed of the signal rotor 130 is high. The frequency of the alternating current voltage is proportional to the rotational speed of the signal rotor 130, i.e., is proportional to the wheel speed. Thus, the output signal of the frequency detector 136 is proportional to the wheel speed for each sampling time τ.

The wheel speed detecting sensor 111 of FIG. 38A is mounted to each of the first wheel through the fourth wheel. Time series data ω1[k] (k is the sampling time; k=1, 2, 3, . . . ) of the wheel speed of the ith wheel (i is the number of the wheel; i=1, 2, 3, 4) is detected from the output signal of the frequency detector 136 for each wheel.

The braking force slope estimating means 112 estimates the braking force slope of each wheel on the basis of the time series data ω1[k] of the wheel speed. This estimation of the braking force slope can be carried out in accordance with the method disclosed in Japanese Patent Application No. 10-290855 for example.

The ABS control means 114 computes an operation amount u ($u_i$; i=1, 2, 3, 4) for each wheel at each sampling time such that the braking force slope estimated at the braking force slope estimating means 112 follows the target braking force slope computed at the target braking force slope computing means 118, and sets the operation signal of the ABS valve 116 for each wheel, and outputs the operation signals to the ABS valve 116.

At the target braking force computing means 118, the target braking force slope is computed on the basis of the tire generation force direction. The target braking force slope is determined, for example, by using a brush model which is a dynamic model of the tire. Hereinafter, explanation will be given of computation of the target braking force slope using a brush model.

First, the longitudinal direction slip ratio $\kappa_x$ is defined by the following formula.

$$\kappa_x = \frac{u - R\omega}{R\omega} \tag{31}$$

Figure 39:
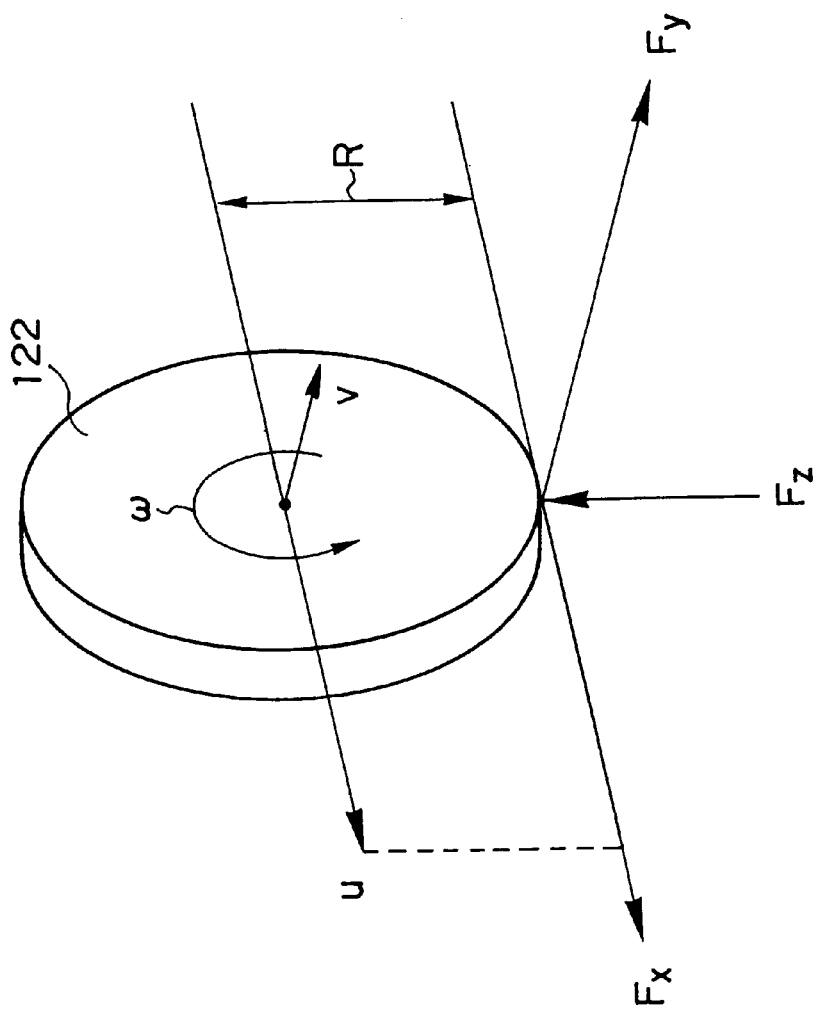
FIG. 39 is a diagram for explaining a dynamic model of a tire.

Here, u is a speed component in a direction of a plane of rotation of the tire 122 as shown in FIG. 39, R is the effective radius of the tire 122, and ω is the angular speed of the tire 122. Further, v shown in FIG. 39 is a speed component which is orthogonal with respect to the direction of the plane of rotation of the tire 122. Forces of Fx, Fy, and Fz act on the tire 122 in the longitudinal direction, the lateral direction, and the as longitudinal direction, respectively.

The lateral direction slip ratio $\kappa_y$ is defined by the following formula.

$$\kappa_y = \frac{K_\beta v}{K_s R \omega} \quad (32)$$

$K_\beta$, $K_s$ are defined by the following formulas at the time when the ground contact surface length of the tire 122 is l and width is b.

$$K_s = \frac{bl^2}{2}\kappa_x \quad (33)$$

$$K_\beta = \frac{bl^2}{2}\kappa_y \quad (34)$$

Further, the combined slip ratio is defined by the following formula, wherein $\kappa_x$, $\kappa_y$ are the longitudinal and lateral direction rigidities of the tire tread rubber per unit width and length.

$$\kappa = \sqrt{\kappa_x^2 + \kappa_y^2} \quad (35)$$

The direction $\theta$ of the tire generation force can be approximated to the slip direction of the tire 122 as per the following formula.

$$\tan\theta = \frac{\kappa_y}{\kappa_x} \quad (36)$$

The region other than the total slip region, i.e., the non total slip region including the adhesion region and the slip region, is defined as a region which satisfies the following formula.

$$\xi_s = 1 - \frac{K_s}{3\mu F_z}\kappa > 0 \quad (37)$$

Here, $\mu$ is the coefficient of friction. The longitudinal direction braking force Fx and the lateral braking force Fy in the non total slip region are defined by the following formulas.

$$Fx = -\mu Fz \cos\theta(1-\xi_s^3) \quad (38)$$

$$Fy = -\mu Fz \sin\theta(1-\xi_s^3) \quad (39)$$

Further, the total slip region is defined as a region satisfying the following formula.

$$\xi_s = 1 - \frac{K_s}{3\mu F_z}\kappa < 0 \quad (40)$$

The braking force Fx and the lateral force Fy in the total slip region are defined by the following formulas.

$$Fx = -\mu Fz \cos\theta \quad (41)$$

$$Fy = -\mu Fz \sin\eta \quad (42)$$

Figure 40:
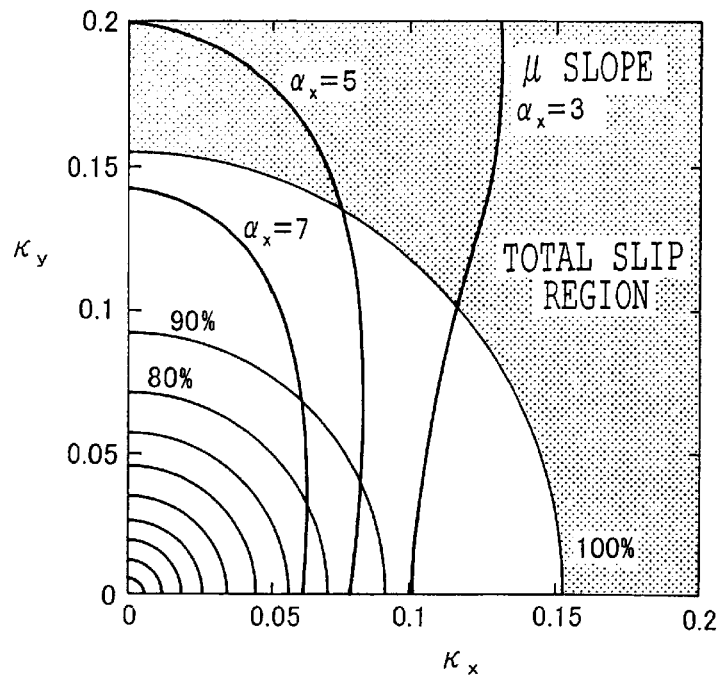
FIG. 40 is a graph for explaining a relationship between a slip ratio and a braking force slope.

FIG. 40 shows the relation among, the longitudinal direction slip ratio $\kappa_x$, the lateral direction slip ratio $\kappa_y$, and the composite force. Further, the $\mu$ slope, i.e., the braking force slope, may be expressed by a constant curve.

The composite force of the braking force Fx and the lateral force Fy, i.e., the tire generation force, is, as shown in FIG. 40, drawn in a curve which is concentric around the origin at which both the longitudinal direction slip ratio $\kappa_x$ and the lateral direction slip ratio $\kappa_y$ are zero. The region in which the composite force exceeds 100% is the total slip region. Further, in a region in which the composite force is 90%, i.e., a region in which the rate of utilization of the tire generation force is 90%, there is a leeway of 10% in the tire generation force.

Here, if control is carried out such that the composite slip ratio slope of the tire generation force is constant, control is realized along the concentric curve shown in FIG. 40. However, if, as in the conventional art, the value of the target braking force slope $\alpha_x$ is not made to gradually increase in accordance with the lateral direction slip ratio $\kappa_y$ as shown in FIG. 40 in a case in which the braking force slope is controlled to follow the constant target braking force slope, the total slip region will be reached. Accordingly, it is necessary to correct the target braking force slope in accordance with the direction of the tire generation force.

The braking force slope in the non total slip region is expressed by the following formula which is obtained from above formulas (35) through (38).

$$\frac{\delta Fx}{\delta \kappa_x} = -Ks\left[\xi_s^2 \cos^2\theta + \frac{1}{3} \cdot \frac{1-\xi_s^3}{1-\xi_s}\sin^2\theta\right] \quad (43)$$

When the target utilization rate of the tire generation force is $\gamma$ ($0 \leq \gamma \leq 1$), from the relation:

$$F = -\mu Fz(1-\xi_s^3) = -\mu Fx\gamma \quad (44)$$

it can be understood that $\xi$ at the time when the utilization rate is $\gamma$ is:

$$\xi_s = (1-\gamma)^{1/3} \quad (45)$$

Accordingly, the target braking force slope needed in order to make the utilization rate be $\gamma$ is expressed by the following formula.

$$\frac{\delta Fx}{\delta \kappa_x} = -Ks\left[(1-\gamma)^{2/3}\cos^2\theta + \frac{1}{3} \cdot \frac{\gamma}{1-(1-\gamma)^{1/3}}\sin^2\theta\right] \quad (46)$$

In accordance with formula (46), by changing the target braking force slope in accordance with the direction $\theta$ of the tire generation force, the total slip region can be prevented from being reached, and appropriate brake control can be carried out.

Figure 41:
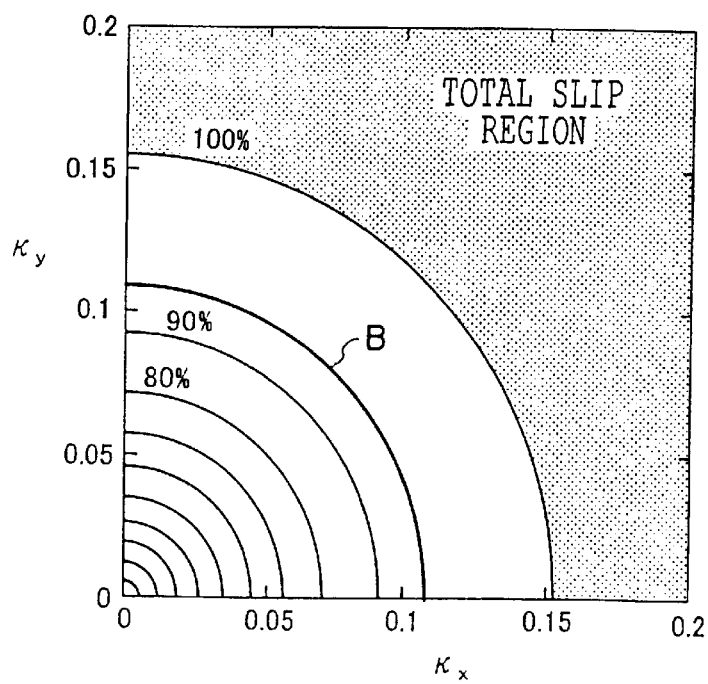
FIG. 41 is a graph for explaining a relationship between a slip ratio and a braking force slope.

Curve B in FIG. 41 is a curve which satisfies formula (46) in a case in which the utilization rate $\gamma=0.95$, i.e., 95%. Curve B is shaped as a concentric circle, and it can be understood that the utilization rate is substantially constant at 0.95.

Figure 42:
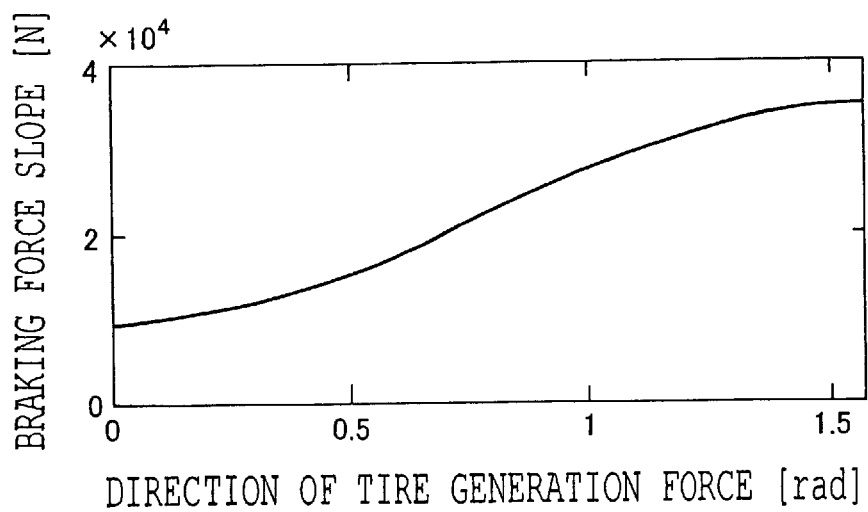
FIG. 42 is a graph for explaining a relationship between a direction of tire generation force and a braking force slope.

FIG. 42 is a graph corresponding to formula (46), i.e., is a graph showing the relationship between the direction $\theta$ of the tire generation force and the braking force slope. FIG. 42 shows that, when the direction $\theta$ of the tire generation force is 0 (rad), tire generation force is generated only the direction of advancing straight forward, and when the direction $\theta$ of the tire generation force is $\pi/2 \approx 1.57$ (rad), tire generation force is only generated in the lateral direction.

As shown in FIG. 42, as the direction $\theta$ of the tire generation force increases, i.e., as the lateral slippage increases, the braking force slope increases. In this way, by changing the target braking force slope in accordance with the direction $\theta$ of the tire generation force, the total slip region can be prevented from being reached. However, in actuality, it is difficult to determine the direction $\theta$ of the tire generation force. As a result, the present embodiment focuses on the fact that, as the steering angle of the steering wheel of the vehicle increases, the direction of the tire generation force also increases, and the present embodiment uses the steering angle as a parameter corresponding to the direction θ of the tire generation force. Namely, the target braking force is corrected in accordance with the steering angle (deg) detected from the steering angle sensor 120 which is shown in FIG. 37 and which detects the steering angle of the steering wheel of the vehicle.

Figure 43:
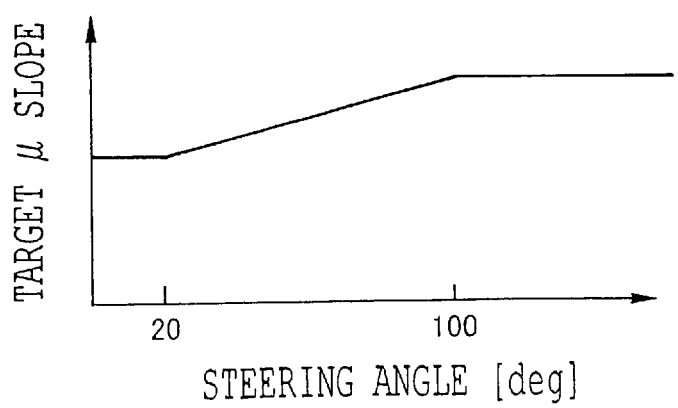
FIG. 43 is a graph for explaining a relationship between a steering angle and a target braking force slope.

For example, as shown in FIG. 43, a relationship which approximates the relationship shown in FIG. 42 between the direction θ of the tire generation force and the braking force slope, i.e., a relationship between the steering angle and the target braking force slope, is set in advance in accordance with data of a table or the like, and in accordance therewith, the target braking force slope is corrected in accordance with the steering angle (deg) detected from the steering angle sensor 120. Note that in the present embodiment, the target braking force slope is corrected by using the output value of the steering angle sensor. However, provided that a parameter is used which corresponds to the direction θ of the tire generation force, the present embodiment is not limited to use of the output value of the steering angle sensor, and the target braking force slope may be corrected by using the output value of a yaw sensor or an acceleration sensor or the like. Further, the lateral direction slip ratio may be estimated from the output value of the steering angle sensor and the vehicle speed on the basis of a vehicle motion model, and correction may be carried out on the basis of this estimated value.

Next, the structure of the ABS valve 116 will be described with reference to FIG. 44.

The ABS valve 116 is formed to include a control solenoid valve 232 for the front right wheel (hereinafter, "valve SFR"), a control solenoid valve 234 for the front left wheel (hereinafter, "valve SFL"), a control solenoid valve 240 for the rear right wheel (hereinafter, "valve SRR"), and a control solenoid valve 242 for the rear left wheel (hereinafter, "valve SRL").

The valve SFR, the valve SFL, the valve SRR, and the valve SRL are equipped with pressure increase side valves 232a, 234a, 240a, 242a and pressure reduction side valves 232b, 234b, 240b, 242b, respectively. The valves are connected to front wheel cylinders 244, 246 and rear wheel cylinders 248, 250.

The pressure increase side valves 232a, 234a, 240a, 242a and pressure reduction side valves 232b, 234b, 240b, 242b are connected to SFR controller 231, SFL controller 233, SRR controller 239, SRL controller 241, respectively, which control the opening and closing of the respective valves.

The SFR controller 231, SFL controller 233, SRR controller 239, SRL controller 241 control the opening and closing of the pressure increase side valves and the pressure reduction side valves of the respective control solenoid valves, on the basis of operation signals for the respective wheels which are sent from the ABS control means 114.

Figure 45:
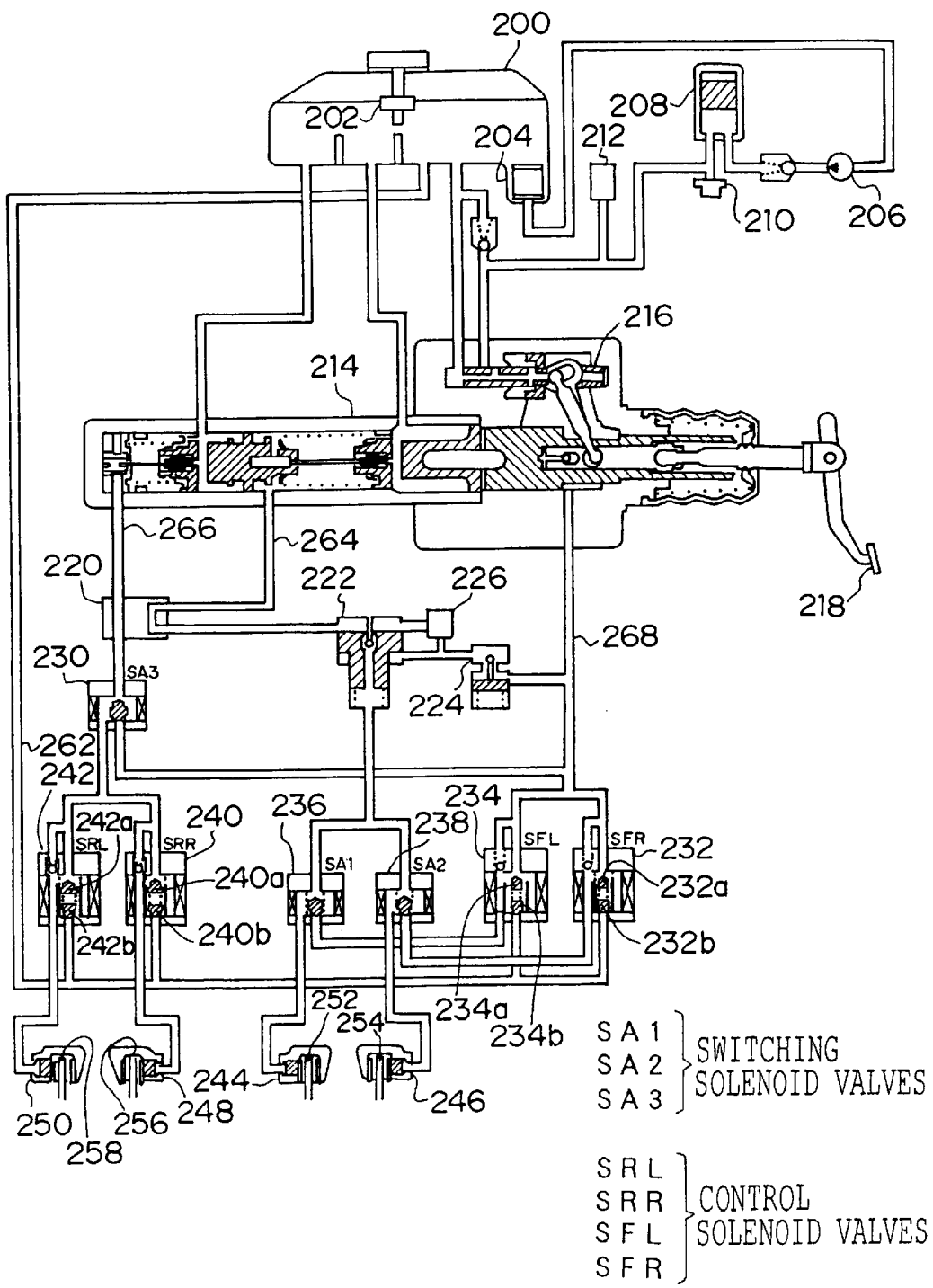
FIG. 45 is a diagram showing a structure of a system oil pressure circuit including the ABS valve.

The structure of a system oil pressure circuit including the ABS valve 116 will be described in detail with reference to FIG. 45.

The system oil pressure circuit is provided with a reservoir 200 which stores master cylinder system and power supply system brake fluid. The reservoir 200 is provided with a level warning switch 202 which detects a drop in the fluid surface of the brake fluid stored in the interior of the reservoir 200, and a relief valve 204 for relieving the brake fluid to the reservoir 200 at the time of abnormally high pressure of the power supply system.

Further, a pump 206, which draws up brake fluid from the reservoir 200 and discharges high oil pressure fluid, is provided at a pipe which is disposed from the relief valve 204 side of the reservoir 200. At the fluid discharge side, an accumulator 208 which accumulates oil pressure (power supply system) generated at the pump, and a pressure sensor 210 which detects the oil pressure of the accumulator 208, are provided. The pressure sensor 210 outputs a control signal of the pump 206 on the basis of the oil pressure of the accumulator 210, and outputs a warning signal (an ABS, TRC control prohibiting signal) at the time of low pressure.

A pressure switch 212 is provided at a high oil pressure side pipe of the accumulator 208. The pressure switch 212 outputs a control signal of the pump 206 at the time of low oil pressure of the accumulator 210, and outputs a warning signal (an ABS, TRC control prohibiting signal) at the time of low oil pressure.

A master cylinder 214 is connected to another pipe which extends from the reservoir 200. The master cylinder 214 generates oil pressure corresponding to the depressing force applied to a brake pedal 218. A brake booster 216, which adjusts and introduces high oil pressure of the accumulator 210 to an oil pressure corresponding to the depressing force and generates an additional force, is disposed between the master cylinder 214 and the brake pedal 218.

The pipe at the high oil pressure side of the accumulator and the pipe which extends directly from the reservoir 200 are connected to the brake booster 216. In a case in which the amount by which the brake pedal 218 is depressed is a given value or less, regular oil pressure is introduced from the reservoir 200. When the amount by which the brake pedal 218 is depressed exceeds a given value, high oil pressure from the accumulator 208 is introduced.

Further, a front master pressure pipe 264 and a rear master pressure pipe 266 are provided for supplying oil pressure of the master cylinder (master pressure) from the master cylinder 214 to the front and rear wheels. A P&B valve 220, which adjusts the brake oil pressure of the rear system such that an appropriate distribution of braking force is achieved at the front and rear wheels, is interposed at the front master pressure pipe 264 and the rear master pressure pipe 266. Note that the P&B valve 220 stops pressure adjustment of the rear system at a time when the front system is defective.

An pressure increase device 222 is provided at the front master pressure pipe 264 which extends from the P&B valve 220. In a case in which the oil pressure of the power supply system drops, the pressure increase device 222 increases the front wheel cylinder oil pressure so as to ensure a high braking force. A booster pipe 268, which is connected to the booster chamber of the brake booster 216, is connected to the pressure increase device 222. A pressure limiter 224 and a differential pressure switch 226 are interposed between the booster pipe 268 and the pressure increase device 222.

The pressure limiter 224 closes the path to the booster chamber such that the pressure increase device 222 and the differential pressure switch 226 are not operated, with respect to application of input which is greater than or equal to an additional force limit of the brake booster 216 at the time the system is operating normally. The differential pressure switch 226 detects the difference in oil pressures between the master cylinder 214 and the booster chamber.

An pressure increase side valve 232a, of the control solenoid valve 232 for the front right wheel ("valve SFR"), and an pressure increase side valve 234a, of the control solenoid valve 234 for the front left wheel ("valve SFL"), are connected to the booster pipe 268. Further, a lower pressure pipe 262, which extends directly from the reservoir 200, is connected to a pressure reduction side valve 232b of the valve SFR and a pressure reduction side valve 234b of the valve SFL.

A switching solenoid valve 236 (hereinafter, "valve SA1") and a switching solenoid valve 238 (hereinafter, "valve SA2") are respectively connected to the lower pressure supply side pipes of the valve SFR and the valve SFL. An pressure increase side pipe of the pressure increase device 222 is connected to the valve SA1 and the valve SA2. The pressure supply side pipe of the valve SA1 is connected to a front wheel cylinder 244 which applies brake pressure to a brake disc 252 of the front left wheel. The valve SA2 is connected to a front wheel cylinder 246 which applies brake pressure to a brake disc 254 of the front right wheel.

At the time of the ordinary brake mode, the valve SA1 and the valve SA2 switch the valve such that the pressure from the pressure increase device 222 is applied to the front wheel cylinders 244, 246. At the time of ABS control mode, the valve SA1 and the valve SA2 switch the valve such that the pressure from the valve SFR and the valve SFL is applied to the front wheel cylinders 244, 246. Namely, at the front wheels, the switching between the ordinary brake mode and ABS control mode can be carried out independently for the left wheel and the right wheel.

An pressure increase side valve 240a of the control solenoid valve 240 ("valve SRR") for the rear right wheel and an pressure increase side valve 240b of the control solenoid valve 242 ("valve SRL") for the rear left wheel are connected, via a switching solenoid valve 230 (hereinafter, "SA3") to the booster pipe 268. A lower pressure pipe 262, which extends directly from the reservoir 200, is connected to the pressure reduction side valve 240b of the valve SRR and the pressure reduction side valve 242b of the valve SRL.

The lower pressure supply side pipe of the valve SRR is connected to the rear wheel cylinder 248 which applies brake pressure to a brake disc 256 for the rear right wheel. The valve SRL is connected to a rear wheel limiter 250 which applies brake pressure to a brake disc 258 for the rear left wheel.

At the time of the ordinary brake mode, the valve SA3 switches the valve such that the master pressure from the rear master pressure pipe 266 is applied to the valve SRL and the valve SRR. At the time of ABS control mode, the valve SA3 switches the valve such that the high oil pressure from the booster pipe 268 is applied to the valve SRL and the valve SRR. Namely, at the rear wheels, the switching between the ordinary brake mode and ABS control mode is carried out collectively for the left and right.

Next, operation of the present embodiment will be described. Note that, in the ABS mode, the valve SA1 and the valve SA2 shown in FIG. 45 close the valve at the pressure increase device 222 side and open the valve at the valve SFR and the valve SFL side. Further, the valve SA3 closes the valve at the rear master pressure pipe 266 side, and opens the valve at the booster pipe 268 side.

First, the wheel speed detecting sensor 111 detects the wheel speed for each wheel each time the sample time τ elapses, and outputs time series data $\omega_i[k]$ of the wheel speed for each wheel.

Next, the braking force slope estimating means 112 estimates the braking force slope of each wheel on the basis of the time series data $\omega_i[k]$ of the wheel speeds.

In accordance with the relationship shown in FIG. 43, the target braking force slope computing means 118 determines a target braking force slope which corresponds to the steering angle of the steering wheel which is outputted from the steering angle sensor 120.

The ABS control means 114 computes an operation amount u ($u_i$; i=1, 2, 3, 4) of each wheel at each sampling time and sets the operation signal of the ABS valve 116 of the respective wheels, such that the braking force slope at each sampling time estimated by the braking force slope estimating means 112 follows the target braking force slope determined by the target braking force slope computing means 118. Then, the set operation signals are sent to the ABS valve 116.

Figure 44:
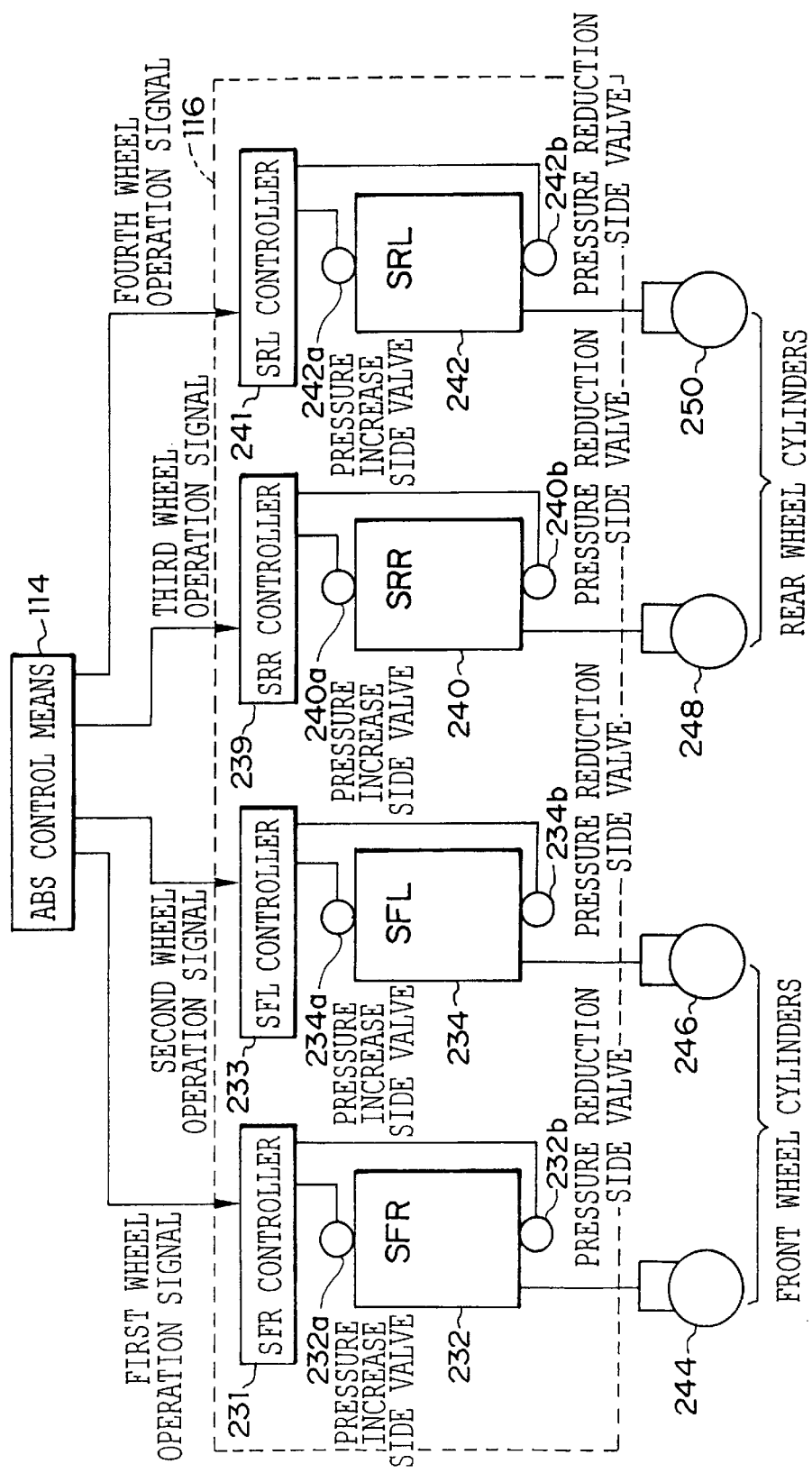
FIG. 44 is a diagram showing a structure of an ABS valve.

When the operation signals for the respective wheels are sent, at the ABS valve 116, the SFR controller 231, the SFL controller 233, the SRR controller 239 and the SRL controller 241 of FIG. 44 effect control to open and close the valve SFR, the valve SFL, the valve SRR, and the valve SRL in accordance with the respective operation signals.

Namely, when there is an pressure increase signal, the pressure increase side valve is opened and the pressure reduction side valve is closed. In this way, high oil pressure of the booster pipe 268 of FIG. 45 is applied to the corresponding wheel cylinder and the braking force is increased. Conversely, when there is a pressure reduction signal, the pressure increase side valve is closed and the pressure reduction side valve is opened. In this way, the low oil pressure of the low pressure pipe 262 of FIG. 45 is applied to the corresponding wheel cylinder and the braking force is decreased. Further, when there is a maintain signal, the pressure increase side valve and the pressure reduction side valve are simultaneously closed. In this way, the oil pressure applied to the corresponding wheel cylinder is maintained, and the braking force is maintained.

In this way, at the ABS control means 114, the ABS valve 116 is controlled such that the estimated braking force slope follows the target braking force slope.

Figure 47A:
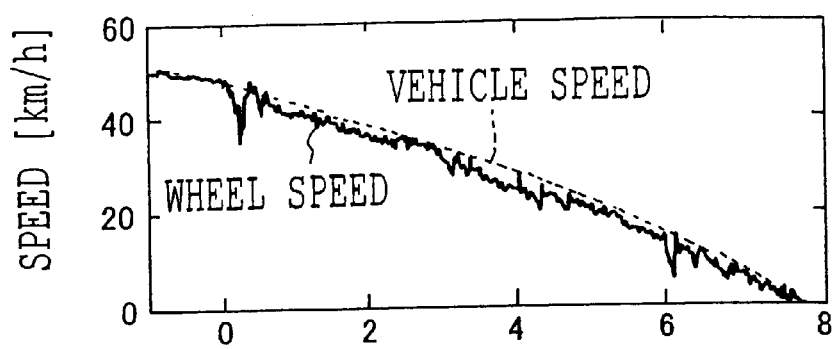
Figure 47B:
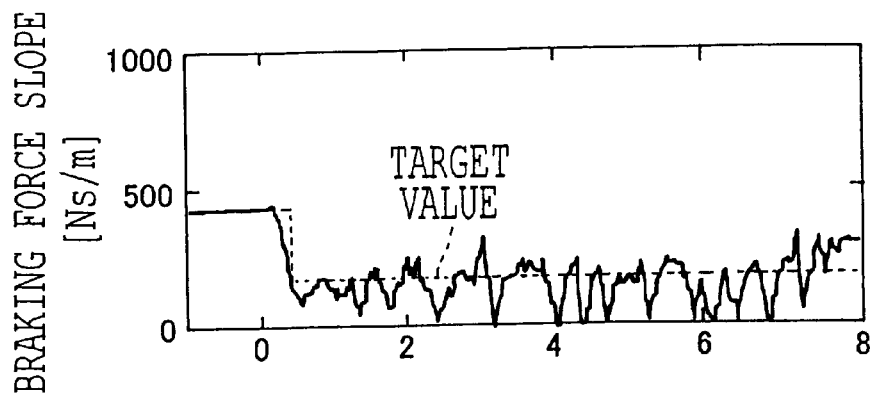
Figure 47C:
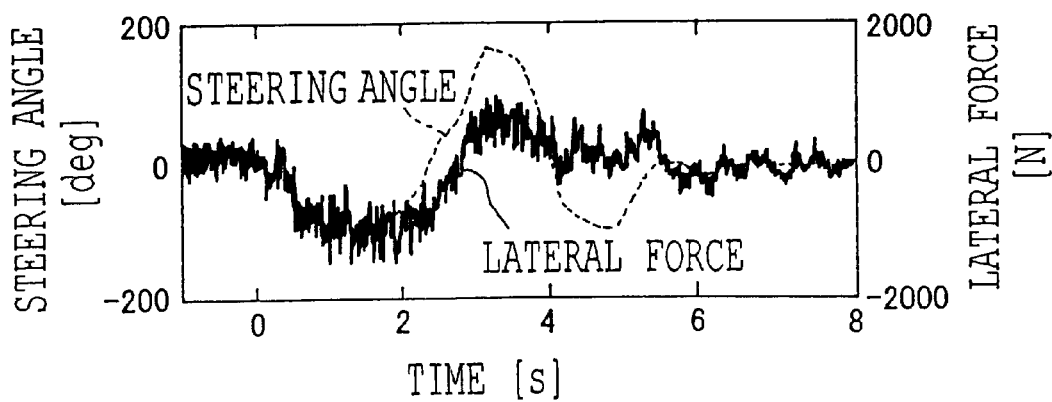

FIGS. 46A through 46C are graphs showing the results at the time when a vehicle, which is equipped with the ABS control device 100 having the above-described structure, braked while changing lanes on a low μ road, i.e., a road surface having a low coefficient of friction. FIGS. 47A through 47C are graphs showing the results at the time when a vehicle, which is equipped with a conventional ABS control device, braked while changing lanes on a low μ road, i.e., a road surface having a low coefficient of friction.

FIGS. 46A and 47A show the wheel speed and vehicle speed [km/h] with respect to time [s]. FIGS. 46B and 47B show the braking force slope target value and the actual braking force slope [Ns/m] with respect to time [s]. FIGS. 46C and 47C show the steering angle [deg] and lateral force [N] with respect to time [s].

As can be seen from FIG. 46C, in the ABS control carried out by the ABS control device 100 of the present embodiment, a lateral force (shown by the dotted line in the figure) corresponding to the steering angle (shown by the solid line in the figure) was obtained.

In this way, by correcting the target braking force slope in accordance with the steering angle, the lateral force is not reduced needlessly. Thus, a total slip region can be prevented from being reached, and the control stability of the vehicle at the time of braking while turning can be improved.

In contrast, in the ABS control carried out by the conventional ABS control device, as shown in FIG. 47C, a lateral force corresponding to the steering angle could not be obtained within three seconds. Namely, the lateral force was small with respect to the steering angle. Thus, if the steering angle is not increased (if the steering wheel is not turned greatly), the vehicle cannot change lanes.

In this way, it was confirmed that the correction of the target braking force slope greatly contributed to ensuring the lateral force and to an improvement in control stability accompanying this ensuring of the lateral force.

Note that, in the present embodiment, a brush model is used to determined the target braking force slope. However, the present invention is not limited to the same, and another model may be used.

What is claimed is:

1. A braking force control device comprising:
   wheel speed detecting means for detecting a wheel speed of each wheel of a vehicle;
   road surface $\mu$ slope estimating means for, on the basis of the detected wheel speed, estimating, for each wheel a slope of a coefficient of friction $\mu$ between the wheel and a road surface as a road surface $\mu$ slope; and
   control means for, on the basis of the road surface $\mu$ slope estimated for each wheel by the road surface $\mu$ slope estimating means, adjusting a braking force for each wheel by controlling the braking force of each wheel.

2. A braking force control device according to claim 1, further comprising:
   control parameter generating means for generating a control parameter for braking force control; and
   control parameter correcting means for, on the basis of the road surface $\mu$ slope estimated by the road surface $\mu$ slope estimating means, correcting the control parameter generated by the control parameter generating means,
   wherein the control means controls the braking force of each wheel on the basis of the control parameter corrected by the control parameter correcting means.

3. A braking force control device according to claim 2, wherein at a time of increasing brake fluid pressure, in a case in which the road surface $\mu$ slope estimated by the road surface $\mu$ slope estimating means is greater than a first predetermined value, the control parameter correcting means corrects the control parameter to make a pressure increase amount of the brake fluid pressure large.

4. A braking force control device according to claim 2, wherein at a time of increasing brake fluid pressure, in a case in which the road surface $\mu$ slope estimated by the road surface $\mu$ slope estimating means is smaller than a second predetermined value, the control parameter correcting means corrects the control parameter to make a pressure increase amount of the brake fluid pressure small.

5. A braking force control device according to claim 4, wherein the control parameter correcting means corrects the control parameter such that the brake fluid pressure is maintained in a case in which the road surface $\mu$ slope estimated by the road surface $\mu$ slope estimating means is smaller than a third predetermined value.

6. A braking force control device according to claim 2, wherein at a time of reducing brake fluid pressure, in a case in which the road surface $\mu$ slope at a start of pressure reduction estimated by the road surface $\mu$ slope estimating means is greater than a predetermined value, the control parameter correcting means corrects the control parameter to make a pressure reduction amount of the brake fluid pressure small or to make a pressure reduction time short.

7. A braking force control device according to claim 2, wherein at a time of reducing brake fluid pressure, in a case in which the road surface $\mu$ slope at a start of pressure reduction estimated by the road surface $\mu$ slope estimating means is smaller than a predetermined value, the control parameter correcting means corrects the control parameter to make a pressure reduction amount of the brake fluid pressure large or to make a pressure reduction time long.

8. A braking force control device according to claim 2, wherein on the basis of the road surface $\mu$ slope at a start of pressure reduction estimated by the road surface $\mu$ slope estimating means, the control parameter correcting means corrects a slip threshold value which expresses a start of pressure reduction of the brake fluid pressure.

9. A braking force control device according to claim 8, wherein when the road surface $\mu$ slope at a start of pressure reduction estimated by the road surface $\mu$ slope estimating means is larger than a predetermined value, the control parameter correcting means effects correction such that the slip threshold value which expresses a start of pressure reduction of the brake fluid pressure is made large.

10. A braking force control device according to claim 8, wherein when the road surface $\mu$ slope at a start of pressure reduction estimated by the road surface $\mu$ slope estimating means is smaller than a predetermined value, the control parameter correcting means effects correction such that the slip threshold value which expresses a start of pressure reduction of the brake fluid pressure is made small.

11. A braking force control device according to claim 8, wherein the control parameter correcting means corrects the slip threshold value which expresses a start of pressure reduction of the brake fluid pressure, and on the basis of this correction amount, corrects a slip threshold value which expresses a start of pressure increase of the brake fluid pressure.

12. A braking force control device according to claim 2, wherein the control parameter correcting means corrects a slip threshold value which expresses a start of pressure increase of the brake fluid pressure, on the basis of the road surface $\mu$ slope at a start of pressure increase estimated by the road surface $\mu$ slope estimating means.

13. A braking force control device according to claim 12, wherein when the road surface $\mu$ slope at a start of pressure increase estimated by the road surface $\mu$ slope estimating means is greater than a predetermined value, the control parameter correcting means effects correction such that the slip threshold value which expresses a start of pressure increase of the brake fluid pressure is made large.

14. A braking force control device according to claim 12, wherein when the road surface $\mu$ slope at a start of pressure increase estimated by the road surface $\mu$ slope estimating means is less than a predetermined value, the control parameter correcting means effects correction such that the slip threshold value which expresses a start of pressure increase of the brake fluid pressure is made small.

15. A braking force control device according to claim 12, wherein the control parameter correcting means corrects the slip threshold value which expresses a start of pressure increase of the brake fluid pressure, and on the basis of this correction amount, corrects a slip threshold value which expresses a start of pressure reduction of the brake fluid pressure.

16. A braking force control device according to claim 2, wherein on the basis of a road surface $\mu$ slope, which is before start of braking force control and which is estimated by the road surface $\mu$ slope estimating means, the control parameter correcting means corrects a control parameter generated at the control parameter generating means.

17. A braking force control device according to claim 16, wherein when the road surface $\mu$ slope, which is before start of braking force control and which is estimated by the road surface $\mu$ slope estimating means, is smaller than a predetermined value, the control parameter correcting means makes the pressure reduction amount of the brake fluid pressure large and/or makes the pressure increase amount small, and when the road surface $\mu$ slope, which is before start of braking force control, is greater than a predetermined value, the control parameter correcting means makes the pressure reduction amount of the brake fluid pressure small and/or makes the pressure increase amount large.

18. A braking force control device according to claim 1, wherein the control means controls a braking torque amount of each wheel on the basis of the road surface $\mu$ slope estimated for each wheel by the road surface $\mu$ slope estimating means.

19. A braking force control device according to claim 18, further comprising:
   wheel acceleration detecting means for detecting a wheel acceleration on the basis of the wheel speed detected by the wheel speed detecting means,
   wherein the control means controls a braking torque amount on the basis of a relationship between the road surface $\mu$ slope estimated by the road surface $\mu$ slope estimating means and the wheel acceleration detected by the wheel acceleration detecting means.

20. A braking force control device according to claim 19, wherein the control means controls at least one of an amount of increase in braking torque and an amount of decrease in braking torque, on the basis of one of a wheel slip speed and a wheel slip ratio.

21. A braking force control device according to claim 18, wherein when the road surface $\mu$ slope estimated by the road surface $\mu$ slope estimating means is less than or equal to a predetermined value, the control means effects control to decrease the braking torque.

22. A braking force control device according to claim 1, further comprising:
   lateral slip information detecting means for detecting lateral slip information of the wheel,
   wherein the control means controls a braking force of each wheel on the basis of the road surface $\mu$ slope estimated for each wheel by the road surface $\mu$ slope estimating means and the lateral slip information detected by the lateral slip information detecting means.

23. A braking force control means according to claim 22, wherein the control means is formed by a target value computing means for computing a target value of a friction state on the basis of the lateral slip information, and a braking force control means for controlling the braking force of the wheel such that the road surface $\mu$ slope detected by said road surface $\mu$ slope estimating means follows the target value.

24. A braking force control means according to claim 23, wherein, as the lateral slip of the wheel increases, the target value computing means makes the target value larger, and as the lateral slip of the wheel decreases, the target value computing means makes the target value smaller.

25. A braking force control device according to claim 22, wherein the lateral slip information detecting means detects a steering angle of the vehicle.

* * * * *